(12) United States Patent
Grip et al.

(10) Patent No.: US 8,387,917 B1
(45) Date of Patent: Mar. 5, 2013

(54) SUPPORT STRUCTURE FOR A CARGO AIRCRAFT

(75) Inventors: Robert Erik Grip, Rancho Palos Verdes, CA (US); Blaine Knight Rawdon, San Pedro, CA (US)

(73) Assignee: The Boeing Company, Chicago, IL (US)

( * ) Notice: Subject to any disclaimer, the term of this patent is extended or adjusted under 35 U.S.C. 154(b) by 383 days.

(21) Appl. No.: 12/731,261

(22) Filed: Mar. 25, 2010

Related U.S. Application Data

(63) Continuation-in-part of application No. 11/743,929, filed on May 3, 2007, now Pat. No. 7,891,608.

(51) Int. Cl.
*B64C 1/00* (2006.01)

(52) U.S. Cl. .................. 244/119; 244/118.1; 244/137.1; 244/137.3

(58) Field of Classification Search .............. 244/118.1, 244/119, 137.1, 137.3, 4 A
See application file for complete search history.

(56) References Cited

U.S. PATENT DOCUMENTS

| | | | |
|---|---|---|---|
| 4,161,301 A * | 7/1979 | Beardsley et al. ......... | 244/137.3 |
| 4,256,012 A * | 3/1981 | Cowart et al. ............... | 89/1.816 |
| 6,547,181 B1 | 4/2003 | Hoisington et al. | |
| 6,722,610 B1 | 4/2004 | Rawdon et al. | |
| 6,848,650 B2 * | 2/2005 | Hoisignton et al. .......... | 244/13 |
| 7,095,364 B1 | 8/2006 | Rawdon et al. | |
| 7,261,257 B2 * | 8/2007 | Helou, Jr. .................. | 244/137.1 |
| 7,467,783 B2 | 12/2008 | Rawdon | |
| 7,534,082 B2 | 5/2009 | Rawdon et al. | |
| 7,641,177 B2 | 1/2010 | Rawdon | |
| 7,699,267 B2 * | 4/2010 | Helou, Jr. .................. | 244/137.1 |
| 2006/0108477 A1 * | 5/2006 | Helou, Jr. .................. | 244/137.1 |
| 2008/0272236 A1 * | 11/2008 | Rawdon et al. ........... | 244/118.1 |

* cited by examiner

*Primary Examiner* — Isam Alsomiri
*Assistant Examiner* — Justin Benedik
(74) *Attorney, Agent, or Firm* — Yee & Associates, P.C.

(57) ABSTRACT

A method and apparatus for transporting containers in an aircraft. A number of containers is loaded into the aircraft. The aircraft is comprised of first and second outer planar structures, a number of planar structures located between the first outer planar structure and the second outer planar structure, a wing, and a support structure. The first outer planar structure, the second outer planar structure, and the number of planar structures are substantially parallel to each other, are coupled to each other to form a fuselage structure, and are configured to receive the number of containers. The support structure connects the wing to a first bottom end of the first outer planar structure, a second bottom end of the second outer planar structure, and a number of bottom ends of the number of planar structures. The aircraft is operated to transport the number of containers to a destination.

21 Claims, 35 Drawing Sheets

US 8,387,917 B1

SUPPORT STRUCTURE FOR A CARGO AIRCRAFT

CROSS-REFERENCE TO RELATED APPLICATION

This application is a continuation-in-part of patent application U.S. Ser. No. 11/743,929, filed May 3, 2007, entitled "Space Frame Fuselage Structure and Related Methods", which is incorporated herein by reference.

BACKGROUND INFORMATION

1. Field

The present disclosure relates generally to transportation of cargo by aircraft and, more particularly, to fuselage structures in cargo aircraft.

2. Background

The statements in this section merely provide background information related to the present disclosure and may not constitute prior art.

When cargo is transported via aircraft, small, specialized pallets and/or cargo containers are generally used in loading the cargo, supporting the cargo during flight, and unloading the cargo at its destination. Many, if not most, of these pallets and/or containers are used only for air transport and are not used in connection with other modes of cargo transport. The cost of transferring cargo between surface transport modes (truck, trains, etc.) and the foregoing aircraft pallets and containers can add substantially to the total cost of transport.

Generally, when aircraft pallets and containers are loaded into an aircraft fuselage, the fuselage structure must support each pallet at small, approximately regular intervals across the length and breadth of its underside. In addition to providing support, existing cargo airplane fuselage structures need to provide structural stability. Most aircraft fuselage structures of the commonly-used "semi-monocoque" type have a skin forming the outer surface of the aircraft. Stringers and frames are typically added to stabilize the skin. Also, the skin itself typically is thickened, or stiffened, to avoid buckling under some load conditions. Adding stabilizing elements and/or stiffeners, however, adds weight to a fuselage structure and is expensive and time-consuming.

Therefore, it would be desirable to have a method and apparatus that may overcome one or more of the issues described above, as well as other possible issues.

SUMMARY

In one advantageous embodiment, an aircraft comprises a first outer planar structure, a second outer planar structure, a number of planar structures, a wing, and a support structure. The number of planar structures is located between the first outer planar structure and the second outer planar structure. The first outer planar structure, the second outer planar structure, and the number of planar structures are substantially parallel to each other. The first outer planar structure, the second outer planar structure, and the number of planar structures are coupled to each other to form a fuselage structure. The first outer planar structure, the second outer planar structure, and the number of planar structures are configured to receive a number of containers. The support structure connects the wing to a first bottom end of the first outer planar structure, a second bottom end of the second outer planar structure, and a number of bottom ends of the number of planar structures.

In another advantageous embodiment, a method is present for transporting containers in an aircraft. A number of containers are loaded into the aircraft. The aircraft is comprised of a first outer planar structure, a second outer planar structure, a number of planar structures located between the first outer planar structure and the second outer planar structure, a wing, and a support structure. The first outer planar structure, the second outer planar structure, and the number of planar structures are substantially parallel to each other, are coupled to each other to form a fuselage structure, and are configured to receive the number of containers. The support structure connects the wing to a first bottom end of the first outer planar structure, a second bottom end of the second outer planar structure, and a number of bottom ends of the number of planar structures. The aircraft is operated to transport the number of containers to a destination.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
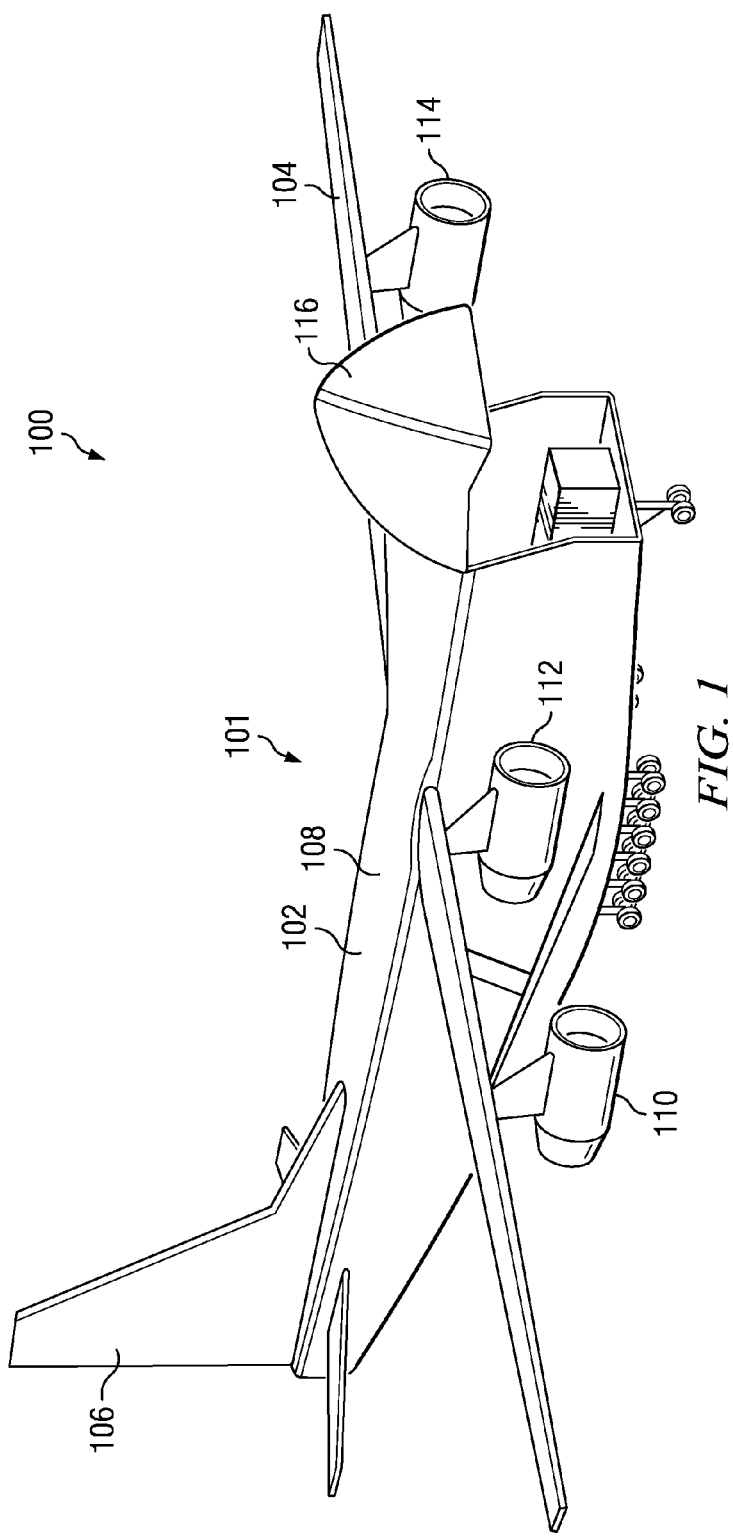
FIG. 1 an illustration of a cargo loading environment in accordance with an advantageous embodiment.

With reference now to FIG. 1, an illustration of a cargo loading environment is depicted in accordance with an advantageous embodiment. In this illustrative example, cargo loading environment 100 includes aircraft 101 and cargo 103. As depicted, cargo 103 is loaded into aircraft 101.

Aircraft 101 has fuselage 102, wing 104, and tail 106. Wing 104 of aircraft 101 is attached to top 108 of fuselage 102. Further, wing 104 is positioned substantially perpendicular to fuselage 102. As depicted, aircraft 101 also has engine 110, engine 112, engine 114, and another engine (not shown) attached to wing 104.

In this illustrative example, nose 116 of aircraft 101 is opened to allow cargo 103 to be loaded into fuselage 102 of aircraft 101. Cargo 103 takes the form of intermodal containers 118. Intermodal containers 118 are manufactured to International Organization for Standardization (ISO) specifications in this illustrative example.

Figure 2:
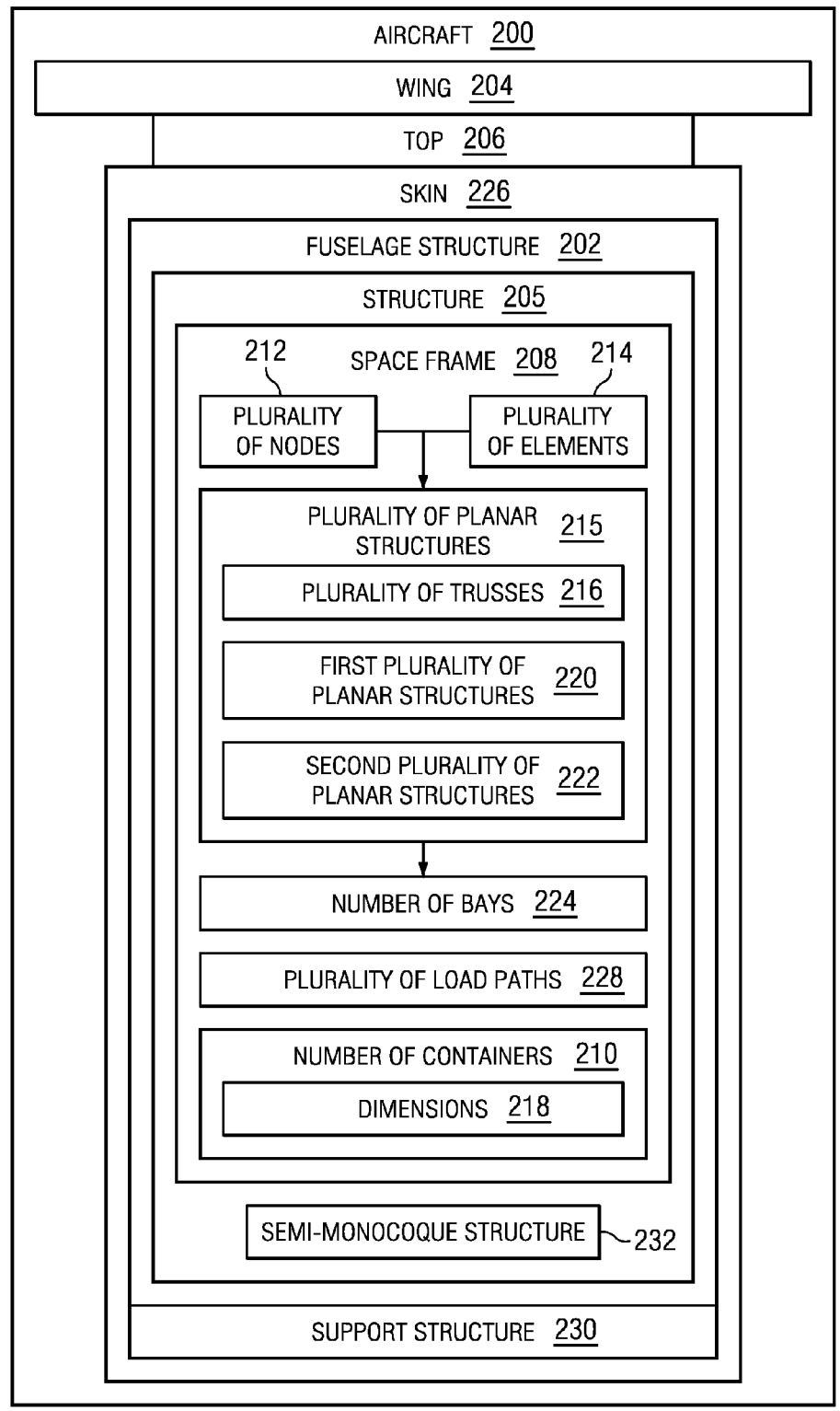
FIG. 2 is an illustration of a block diagram of an aircraft in accordance with an advantageous embodiment.

With reference now to FIG. 2, an illustration of a block diagram of an aircraft is depicted in accordance with an advantageous embodiment. In this illustrative example, aircraft 200 is an example of one implementation for aircraft 101 in FIG. 1. Aircraft 200 may be used for loading and unloading cargo. As depicted, aircraft 200 includes fuselage structure 202 and wing 204.

In these illustrative examples, wing 204 is attached to top 206 of fuselage structure 202. Further, wing 204 is positioned substantially perpendicular to fuselage structure 202 in these examples.

Fuselage structure 202 includes structure 205. Structure 205 takes the form of space frame 208 in these illustrative examples. Space frame 208 is configured to receive number of containers 210. Number of containers 210, in these examples, takes the form of intermodal containers. In particular, number of containers 210 may be intermodal containers manufactured to International Organization for Standardization (ISO) specifications.

In these illustrative examples, space frame 208 is comprised of plurality of nodes 212 and plurality of elements 214 connecting plurality of nodes 212. In these depicted examples, wing 204 of aircraft 200 is attached to fuselage structure 202 using at least a portion of plurality of nodes 212. Further, space frame 208 also includes plurality of planar structures 215. Plurality of planar structures 215 is formed by at least a portion of plurality of nodes 212 and at least a portion of plurality of elements 214.

In these depicted examples, plurality of planar structures 215 takes the form of plurality of trusses 216. Each truss in plurality of trusses 216 is comprised of triangular units formed by at least a portion of plurality of nodes 212 and at least a portion of plurality of elements 214.

Plurality of nodes 212 is positioned in space frame 208 based on dimensions 218 for one or more of number of containers 210. More specifically, plurality of nodes 212 is spaced based on dimensions 218 for one or more of number of containers 210.

In these illustrative examples, plurality of trusses 216 includes first plurality of planar structures 220 and second plurality of planar structures 222. First plurality of planar structures 220 and second plurality of planar structures 222 may be substantially perpendicular to each other. Further, first plurality of planar structures 220 and second plurality of planar structures 222 may be configured to define number of bays 224 in space frame 208. Number of bays 224 extends through space frame 208. Number of bays 224 is configured to hold one or more of number of containers 210 in space frame 208.

Space frame 208 is configured to support loading by number of containers 210. This loading is supported independent of skin 226 of aircraft 200. In other words, space frame 208 is configured to carry loads caused by number of containers 210 to reduce and/or prevent skin 226 carrying the loads. Skin 226 is an outer skin of fuselage structure 202 in these illustrative examples. Further, the configuration of plurality of trusses 216 in space frame 208 provides plurality of load paths 228 in space frame 208 for one or more of number of containers 210.

In these illustrative examples, fuselage structure 202 also includes support structure 230. Support structure 230 connects wing 204 to the bottom of space frame 208 in fuselage structure 202. Support structure 230 is configured to carry vertical loads extending through load paths in space frame 208.

The illustration of aircraft 200 in FIG. 2 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, structure 205 may take the form of semi-monocoque structure 232. Semi-monocoque structure 232 is constructed such that both skin 226 and semi-monocoque structure 232 support loading by number of containers 210. In other advantageous embodiments, aircraft 200 may have two wings that are attached to each other at fuselage structure 202 in the place of wing 204.

The following description is merely exemplary in nature and is not intended to limit the present disclosure, application, or uses.

The present disclosure, in various implementations, is directed to an aircraft for carrying cargo in one or more containers. A fuselage structure of the aircraft includes a plurality of nodes and a plurality of elements connecting the nodes to form a space frame in which to carry cargo. At least some of the nodes are positioned in the space frame based on dimensions of the container(s). More specifically, and as further described below, at least some of the nodes may be generally located for attachment with corners of ISO containers. It should be noted, however, that although implementations are described with reference to ISO containers and/or with reference to containers having specific dimensions, the disclosure is not so limited. The disclosure may be implemented in relation to many different types and/or sizes of containers.

In various configurations of the disclosure, a fuselage structure may accommodate inter-modal containers conforming to ISO specification 1496. ISO specification 1496 describes a family of inter-modal containers. The inventors have observed that containers conforming to the foregoing specification have been commonly accepted throughout the world for surface vehicle use, e.g., to transport cargo on large ships, trucks, and trains. A related specification, 8323, describes an air-compatible, lightweight container. Collectively, the foregoing containers may be referred to as "ISO containers".

An ISO container is equipped with a standard attachment fitting at each of its eight corners. Typically, external loads imposed on the container from transport and handling are imposed on the corner fittings. The container does not need to be supported along its bottom surface. Indeed, the bottoms of most ISO containers are not flat and are not intended to accept external loads. ISO containers are configured to be supported and restrained only at the corner fittings. Accordingly, various configurations of cargo aircraft in accordance with the disclosure include fittings that engage the containers' corners.

The ISO container family includes containers of different lengths and/or heights. The widths of the containers are the same, e.g., eight feet. It has been observed that the most popular lengths may be about 40 feet and about 20 feet. The ISO specification permits two 20-foot containers to fit in the same length as a 40-foot container. Accordingly, in some aircraft configurations and as further described below, fittings are provided and spaced to accommodate a full load of 20-foot containers. The same fittings, or a subset of the same fittings, would also accommodate 40-foot containers.

Compared with typically diffuse loads imposed on a conventional cargo aircraft floor by small, flat-bottomed pallets, an ISO container restrained at its corners would typically impose heavy, concentrated loads on the fittings and structure of an aircraft carrying the container. These loads could be compounded if containers were stacked. Use of 40-foot containers can further concentrate such loads, since the total weight of a 40-foot container would be about twice that of a comparably loaded 20-foot container with the same type of corner fittings.

Figure 3:
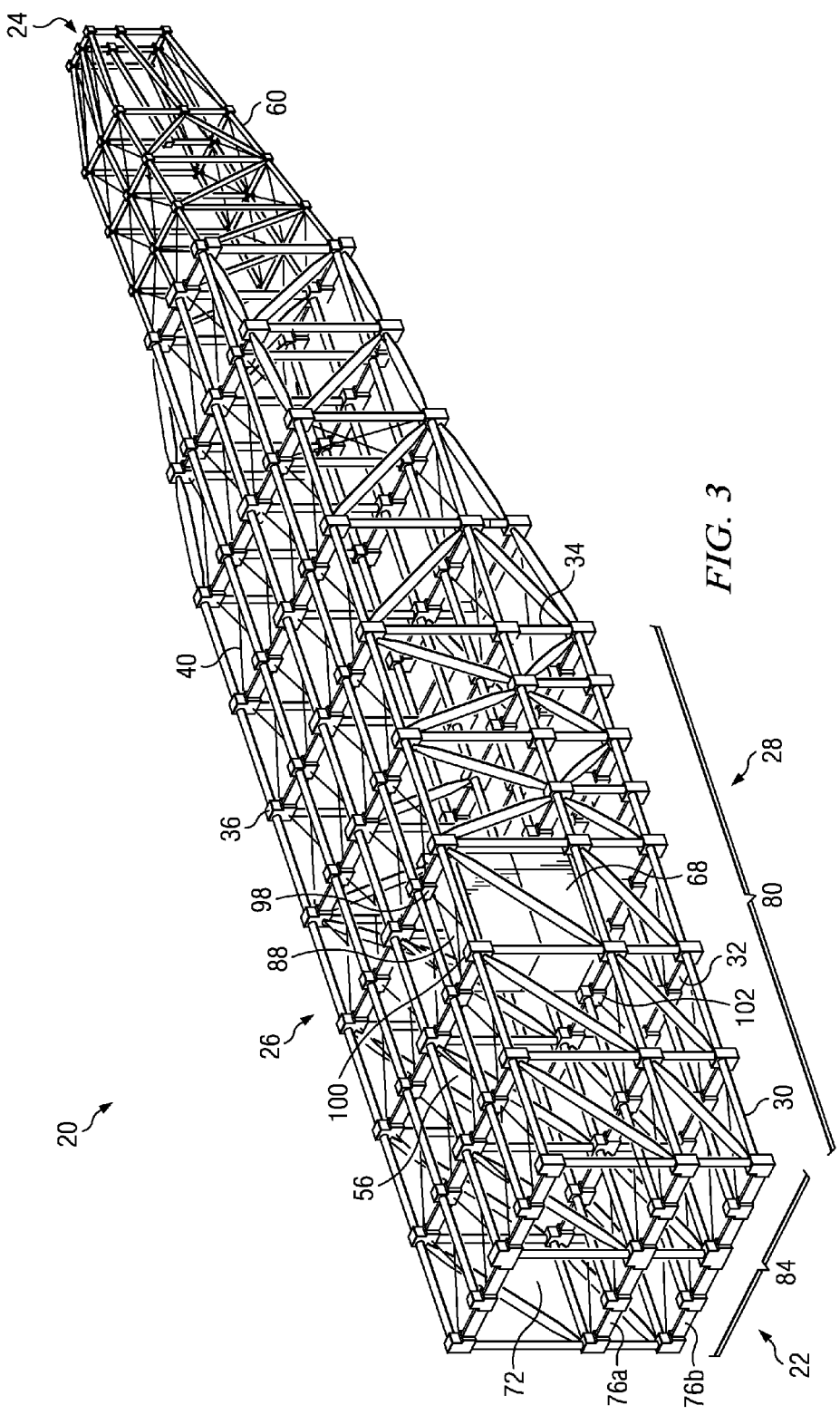
FIG. 3 is an illustration of a perspective view of an aircraft fuselage space frame in accordance with one implementation of the disclosure, the view taken from the left side of the space frame.
Figure 4:
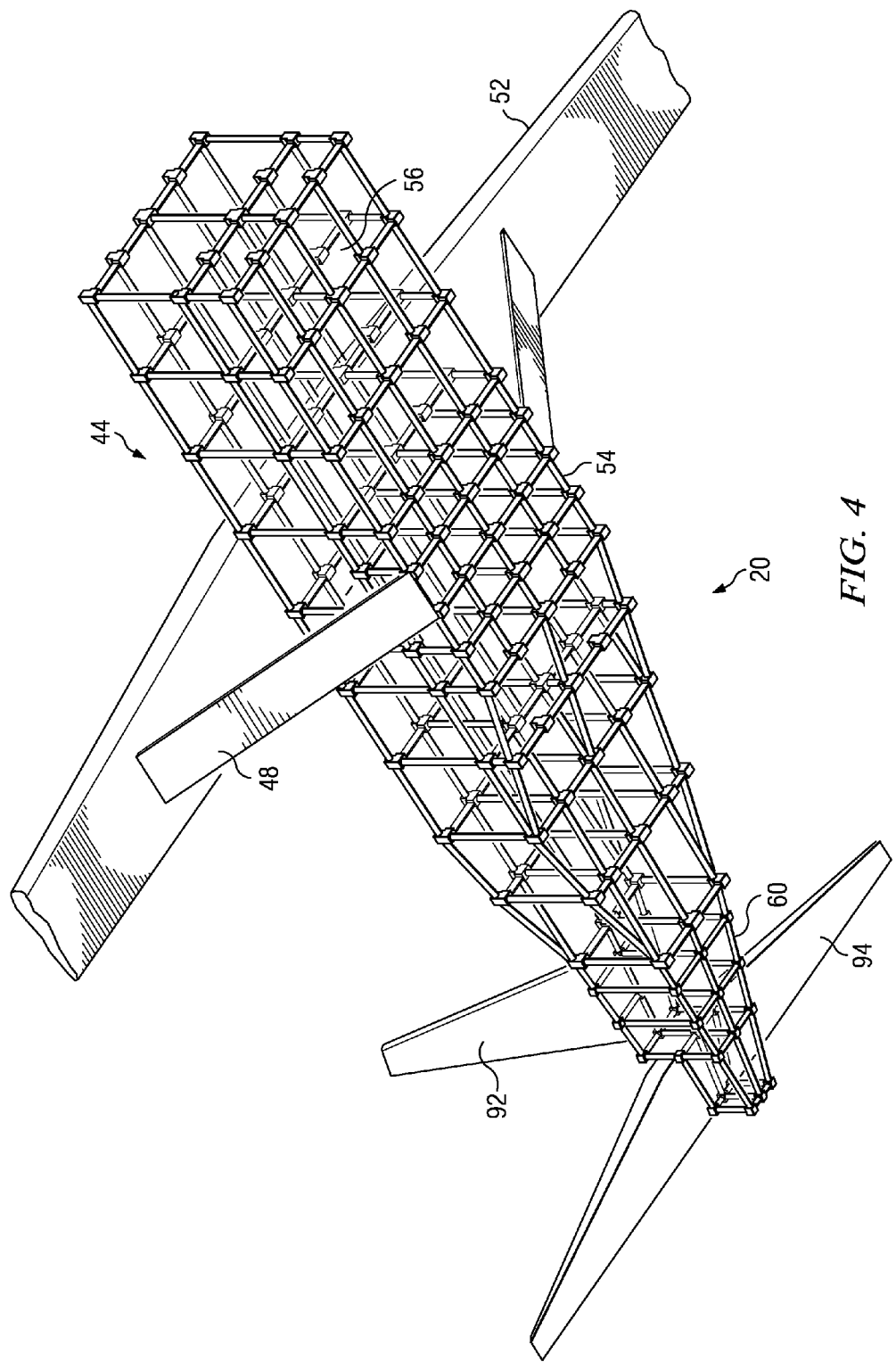
FIG. 4 is an illustration of a perspective view of portions of an aircraft having a fuselage structure in accordance with one implementation of the disclosure, the view taken from beneath and to the right of the aircraft.

One implementation of a fuselage space frame is indicated generally in FIGS. 3 and 4 by reference number 20. Space frame 20 has a front, rear, and right and left sides indicated generally by reference numbers 22, 24, 26, and 28, respectively. Space frame 20 includes plurality of longitudinal elements 30, lateral elements 32, and vertical elements 34 joined at a plurality of nodes 36. Plurality of diagonal elements 40 are connected between some of the nodes 36. Space frame fuselage structure 20 is included in aircraft 44, parts of which are shown schematically in FIG. 4. External struts 48 may optionally be used to link wings 52 of aircraft 44 with portion 54 of the fuselage in the vicinity of landing gear (not shown). The terms "wing" and "wings" may be used interchangeably. Other portions of space frame 20 include cargo hold 56 and aft fuselage portion 60.

Cargo hold 56 is configured to hold one or more cargo containers 68 in one or more generally rectangular bays 72 defined by one or more decks 76, a plurality of longitudinal columns 80, and a plurality of transverse rows 84. For example, as shown in FIG. 3, a two-high stack or block 88 of 20-foot long ISO containers is in the left-most column 80 in the third 20-foot long row 84 of deck 76a of the frame. It should be noted that a space frame may have columns of different lengths. For example, as shown in FIG. 3, space frame 20 has four columns 80: two outer columns and two center columns 80, which are longer than the outer columns 80 by the length of two bays 72.

It also should be noted that the term "deck" does not necessarily denote the presence of a "floor" on which one may walk. In the present embodiment, decks 76 do not include floor surfaces (except, e.g., for such surface areas as may be provided by longitudinal and lateral elements 30 and 32.) Rather, "deck" refers to a level of aircraft 44 that supports cargo containers 68 from below. Thus, in aircraft 44, deck 76a is an upper deck on which containers 68 are supported above lower deck 76b. Space frame 20 is open at front end 22 to permit full-width loading of cargo hold 56 as further described below. It should be noted that the open nature of space frame structure 20 allows it to be non-pressurized during flight.

Space frame 20 also may support landing gear (not shown in FIG. 3 or 4), wing struts 48, and vertical and horizontal tails 92 and 94. In cargo hold 56, nodes 36 are configured to connect to corner fittings 98 on 20-foot long containers. It should be noted that nodes 36 may connect to different numbers of container corner fittings 98, depending on the nodes' locations in space frame 20. For example, node 36 at an outside corner 100 of container block 88 may be connected with corner fittings 98 of up to two containers 68.

Node 36 essentially in the middle of the upper deck 76a, e.g., node 102 connected to block 88, could be connected to as many as eight different containers 68: up to four containers on upper deck 76a, and up to four containers on lower deck 76b. If 40-foot long containers were used instead of 20-foot long containers for a given flight, some of the nodes 36 (e.g., approximately half) would not be connected to the containers. Referring again to the container arrangement shown in FIG. 3, the two-high container stack 88 is connected to space frame 20 only at the bottom four fittings 98 of bottom container 68 and the top four fittings 98 of top container 68. The two containers are stacked one atop the other and secured to each other as known in the art, e.g., by twist locks (not shown).

The ISO containers 68 may be arranged so as to provide aerodynamic and structural balance resulting, e.g., in a general form similar to that of many, if not most, airplane fuselages. In the embodiment shown in FIG. 3, containers 68 may be arranged on the upper and lower decks 76. On upper deck 76a, containers may be positioned in parallel four-wide and may be stacked two-high. The length of the two central longitudinal columns 80 is essentially equal to the length of nine 20-foot long containers 68. The length of the two outer longitudinal columns 80 is essentially equal to the length of seven 20-foot long containers 68. On lower deck 76b, 20-foot long containers 68 may be positioned one-high by four-wide by three-long. Containers on lower deck 76b would be located under the three most forward rows 84 of containers on upper deck 76a.

It should be noted that numerous other container types, stacking arrangements, numbers of decks, numbers of bays for holding containers, and arrangements of other or additional types of containers are feasible and contemplated. For example, the disclosure could be implemented in connection with a flying wing and/or a blended-wing body. In such implementations, containers might extend primarily in a span-wise direction, rather than along a longitudinal axis.

Figure 5:
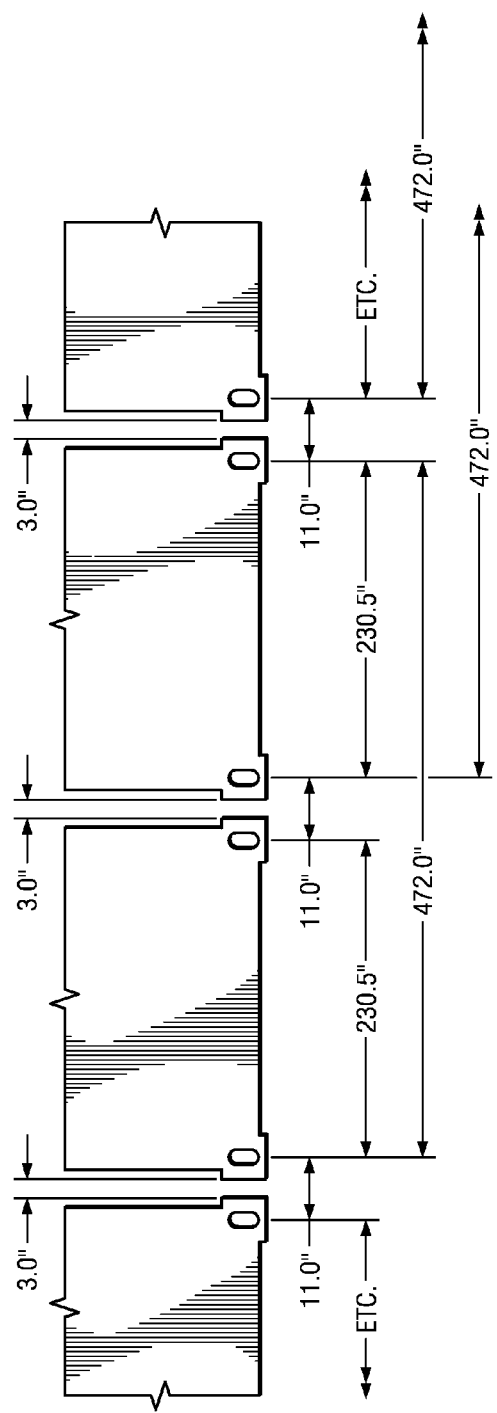
FIG. 5 is an illustration of a side view of longitudinal spacing of container fittings in accordance with one implementation of the disclosure.

As previously discussed, ISO containers are specified such that (a) two 20-foot containers may fit in the same space as a single 40-foot container; and (b) a 40-foot container may fit at any incremental 20-foot position along a column of 20-foot connections. Accordingly, container corner fittings 98 may be spaced as described in FIG. 5. Although a 40-foot ISO container is 40 feet long (480.0 inches), a 20-foot ISO container is slightly shortened to 238.5 inches. These dimensions result in a clearance of about 3.0 inches between containers. Nodes 36 of space frame 20 used for securing cargo containers thus may be spaced, e.g., as illustrated in FIG. 5, so as to accept 20 and 40-foot containers with the same restraint fittings as further described below.

It is generally desirable for loads placed on elements of a space frame to be at least substantially tension and/or compression loads and for bending loads on the elements to be minimal or non-existent. In such manner, a constant distribution of stress might be promoted along the length and across the cross section of an element. Thus, an element might be highly loaded, while overloading of any portion of the element would be minimal or non-existent. Additionally, a purely axial load on a compression element would increase a minimum force at which the element would buckle. In practice, however, it is difficult to achieve pure axial loads on space frame elements, since all loads imposed at nodes of a space frame would need to be symmetrical about the axes of the space frame elements. This is typically impractical if not impossible.

In various configurations of the present disclosure, when non-aligned or asymmetrical loads are imposed on space frame nodes, some space frame elements may oppose such loads with bending moment. Thus, in the present exemplary embodiment, the longitudinal, lateral, and vertical elements 30, 32 and 34 of space frame 20 generally have moment connections to nodes 36. That is, rotation of node 36 about its longitudinal axis may be controlled by the bending rigidity of lateral and vertical elements 32 and 34. Rotation about the node's lateral axis may be resisted by bending rigidity of longitudinal and vertical elements 30 and 34. Rotation about the node's vertical axis may be resisted by bending rigidity of lateral and longitudinal elements 32 and 30.

Figure 6:
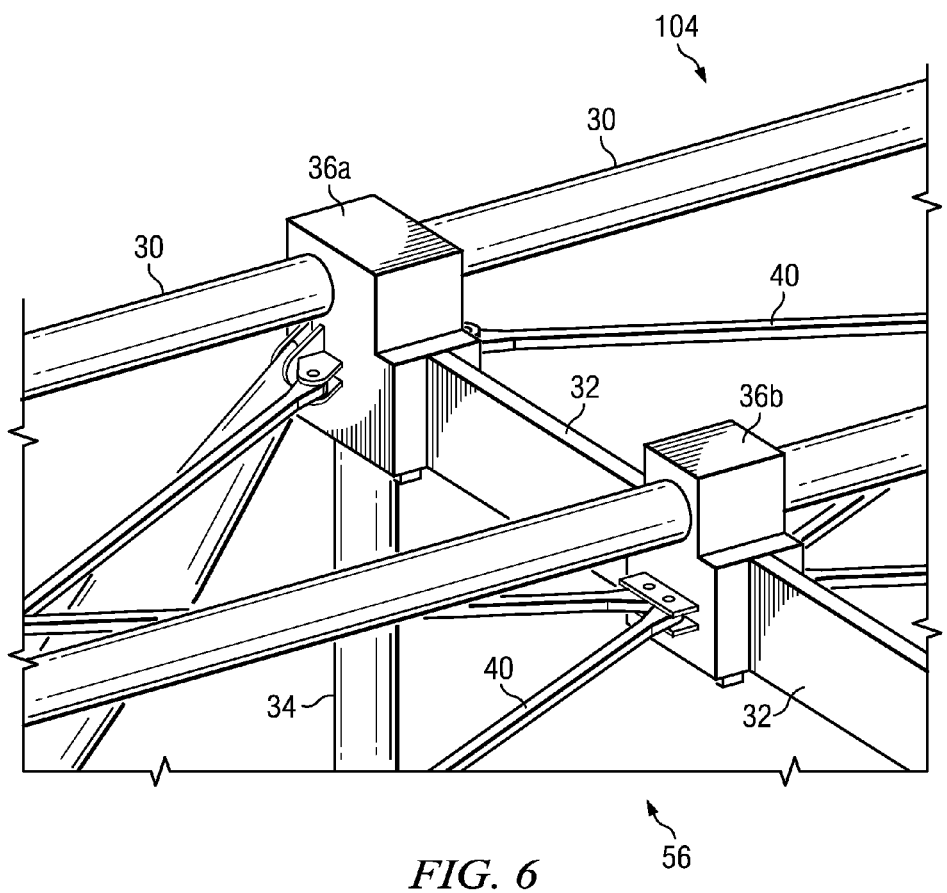
FIG. 6 is an illustration of a partial perspective view of an upper right edge of a cargo hold portion of a fuselage structure in accordance with one implementation of the disclosure.

Two nodes, nodes 36a and 36b, are shown in FIG. 6. Node 36a is located on upper right edge 104 of cargo hold 56 of the fuselage. Generally, longitudinal elements 30 span between nodes 36. Longitudinal elements 30 generally are connected so as to help prevent rotation of a node 36 about its lateral and vertical axes. The form of longitudinal element 30 may be a cylindrical tube, e.g., that may be plugged over a cylindrical tube extension (not visible in FIG. 6) of a node 36. For example, an extension of a node 36 may be fitted into an inside diameter of longitudinal element 30. In some implementations, one or more vertical and/or longitudinal elements may be at least partially solid.

Vertical elements 34 typically span between nodes 36. Vertical elements 34 generally are connected to help prevent rotation of a node 36 about its longitudinal and lateral axes. The form of vertical element 34 may be a cylindrical tube, e.g., that may be plugged over a cylindrical tube extension (not visible in FIG. 6) of a node 36. For example, an extension of a node 36 may be fitted into an inside diameter of vertical elements 34. Lateral elements 32 generally span between nodes 36. Lateral elements 32 generally are connected to help prevent rotation of a node 36 about its longitudinal and vertical axes. Lateral element 32 generally may be plugged into a cavity (not visible in FIG. 6) provided in a node 36.

The form of lateral elements 32 may be a rectangular section tube, an I-beam, or some other form that efficiently resists bending in a vertical axis of the lateral element. It should be noted, however, that although using a lateral element having a cross section that resists bending may be appropriate where lateral elements 32 are placed in bending, the disclosure is not so limited. Where, for example, a fuselage has two or three columns for cargo and three or four longitudinal-vertical trusses respectively making up the sides and center webs, then cargo containers would be supported at nodes that are supported by a full lateral-longitudinal truss.

Figure 7:
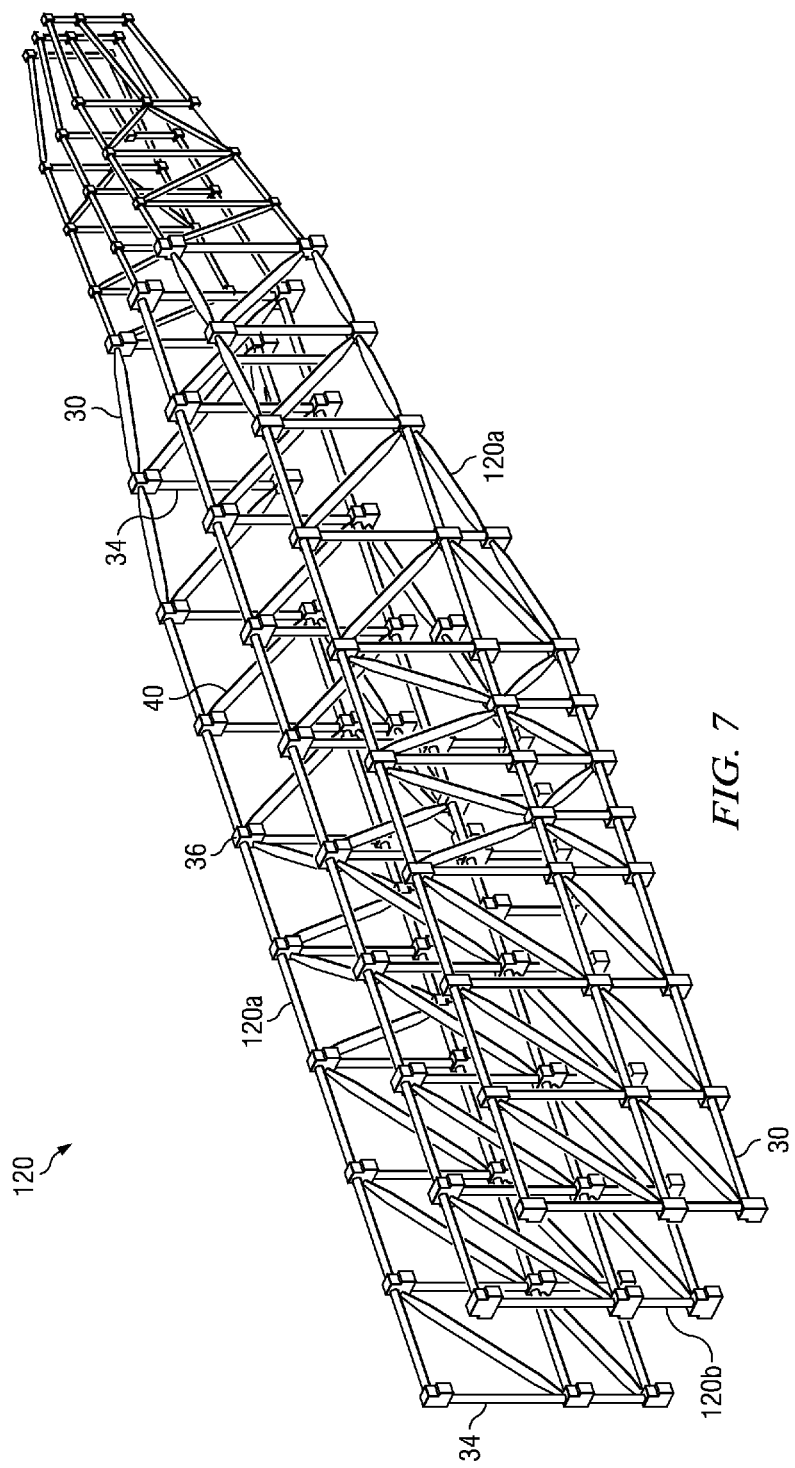
FIG. 7 is an illustration of a perspective view of load-carrying vertical-longitudinal trusses in accordance with one implementation of the disclosure, the view taken from in front of the trusses.
Figure 8:
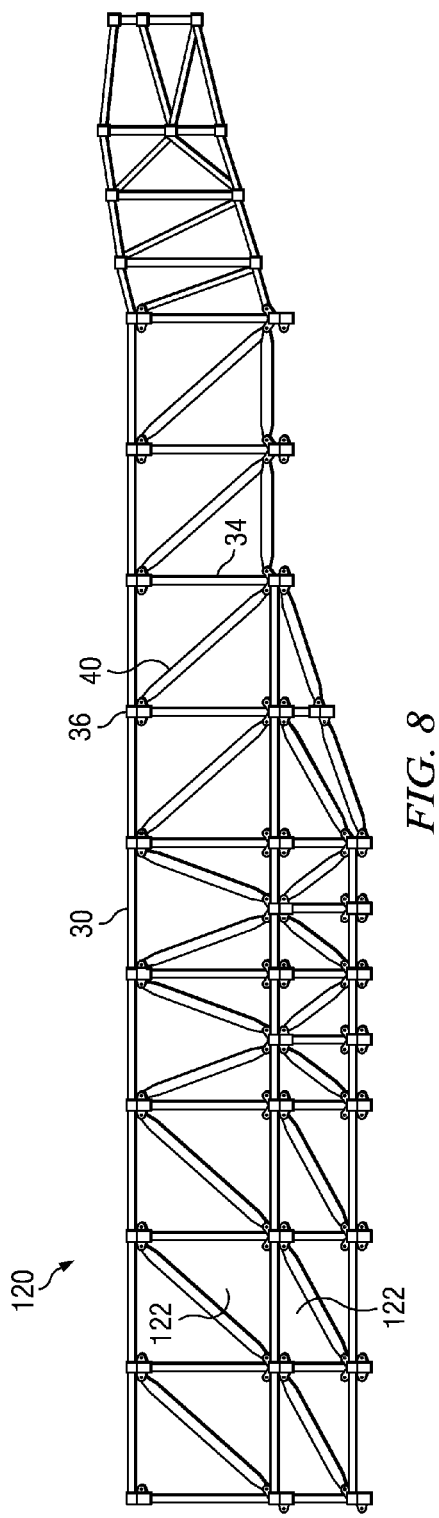
FIG. 8 is an illustration of a left side view of the load-carrying vertical-longitudinal trusses shown in FIG. 5.
Figure 9:
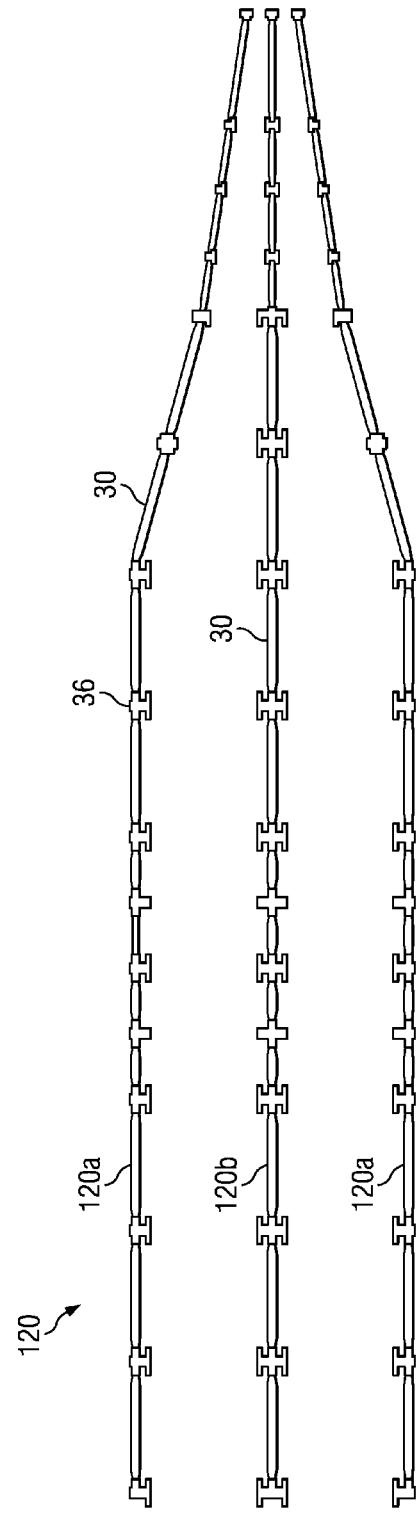
FIG. 9 is an illustration of a top view of the load-carrying vertical-longitudinal trusses shown in FIG. 5.

Accordingly, lateral elements 32 would not need to beam the loads laterally. Thus, lateral elements 32 would not be in significant bending, so elements 32 would not need to be shaped in a form that efficiently resists bending. In such embodiments, lateral element 32 may be, e.g., circular in cross section.

Where (as in the present exemplary embodiment) it is desired to accommodate four columns 80 of containers, five vertical-longitudinal planes of nodes and elements may be provided. In the vicinity of bays 72 for holding containers, two types of vertical-longitudinal planes may be provided. Three exemplary load-carrying vertical-longitudinal trusses included in space frame 20 are indicated generally in FIGS. 7-9 by reference number 120. Load-carrying vertical-longitudinal trusses 120 carry vertical load and include two outboard trusses 120a and center truss 120b. The three trusses 120 include diagonal elements 40. As shown in FIGS. 7-9, diagonal elements 40 are rigid and operate in tension or compression according to the direction of loading. Diagonal elements 40 are connected to nodes 36 via connectors that do not transfer moment. Such connectors may include, but are not limited to, pin joints and/or bolt connections. Instead of a single rigid diagonal element 40, two diagonal tension-only elements 40 could be used that form an "X" within rectangular cells 122 formed by vertical and longitudinal elements 34 and 30. A tension-only element need not resist buckling and could have a small, solid cross section.

Figure 10:
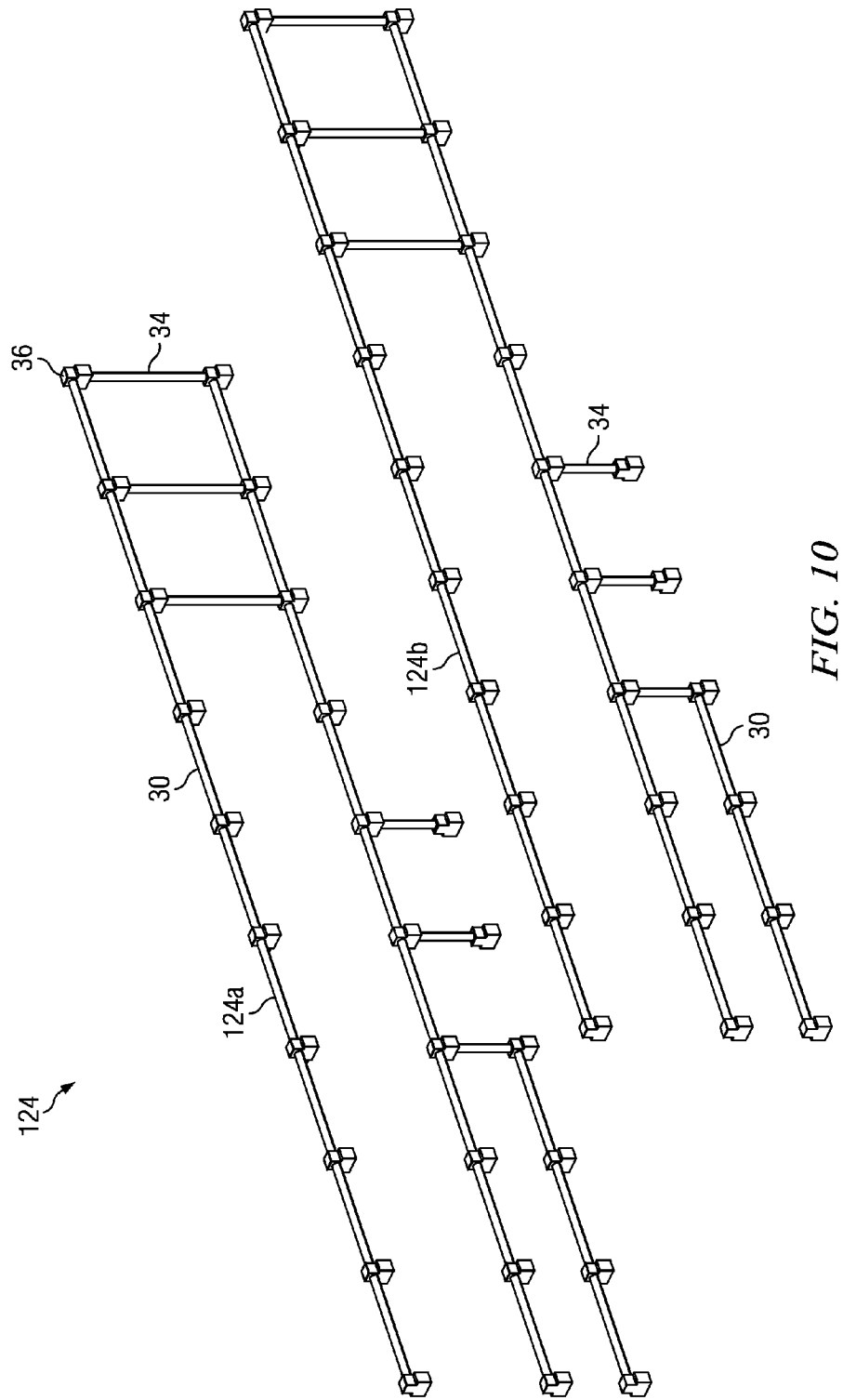
FIG. 10 is an illustration of a perspective view of vertical-longitudinal planes in accordance with one implementation of the disclosure, the view taken from in front of the planes.
Figure 11:
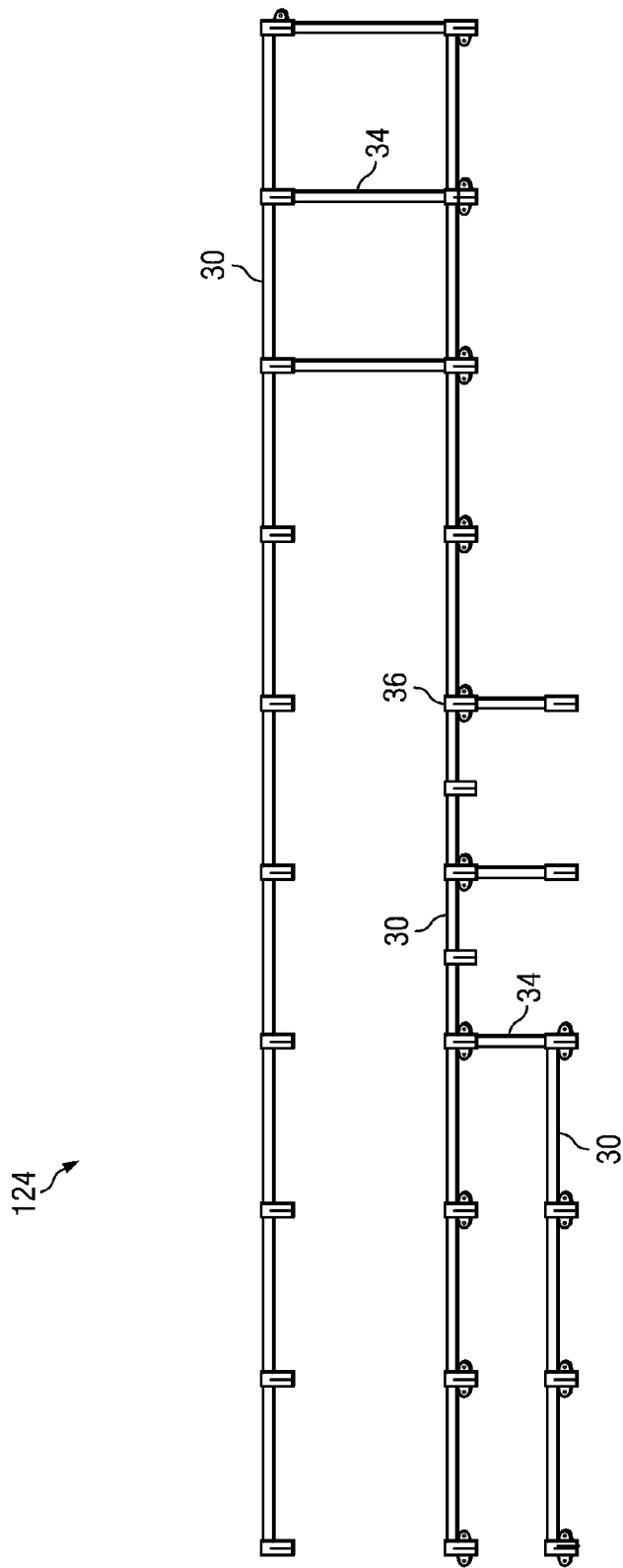
FIG. 11 is an illustration of a left side view of the vertical-longitudinal planes shown in FIG. 5.

Two vertical-longitudinal planes that are at least substantially non-load-carrying are indicated generally in FIGS. 10-11 by reference number 124. The terms "plane" and "truss" may be used interchangeably in this disclosure and the claims. "Plane" may be used in some instances to refer to a truss structure that includes elements 30, 32, and/or 34 and that has a generally non-curved profile. Two vertical-longitudinal planes 124a and 124b include nodes 36, longitudinal elements 30, and several vertical elements 34 outside container bays 72. Vertical elements 34 may be located in the vicinity of landing gear and in the portion of cargo hold 56 in which the two center columns 80 extend beyond the outboard columns 80.

Figure 12:
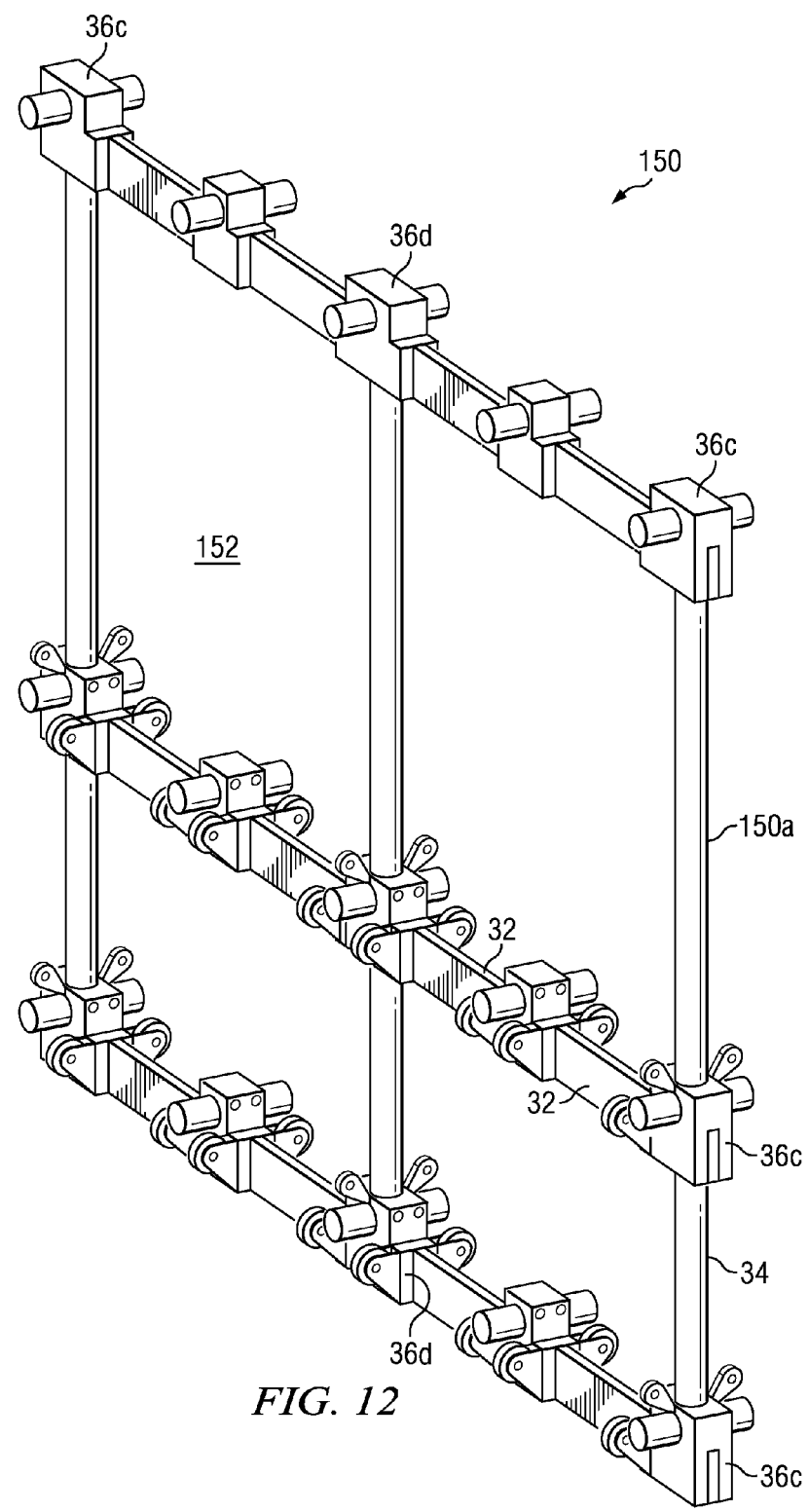
FIG. 12 is an illustration of a perspective view of a vertical-lateral plane in accordance with one implementation of the disclosure, the view taken from the front and left of the plane.
Figure 13:
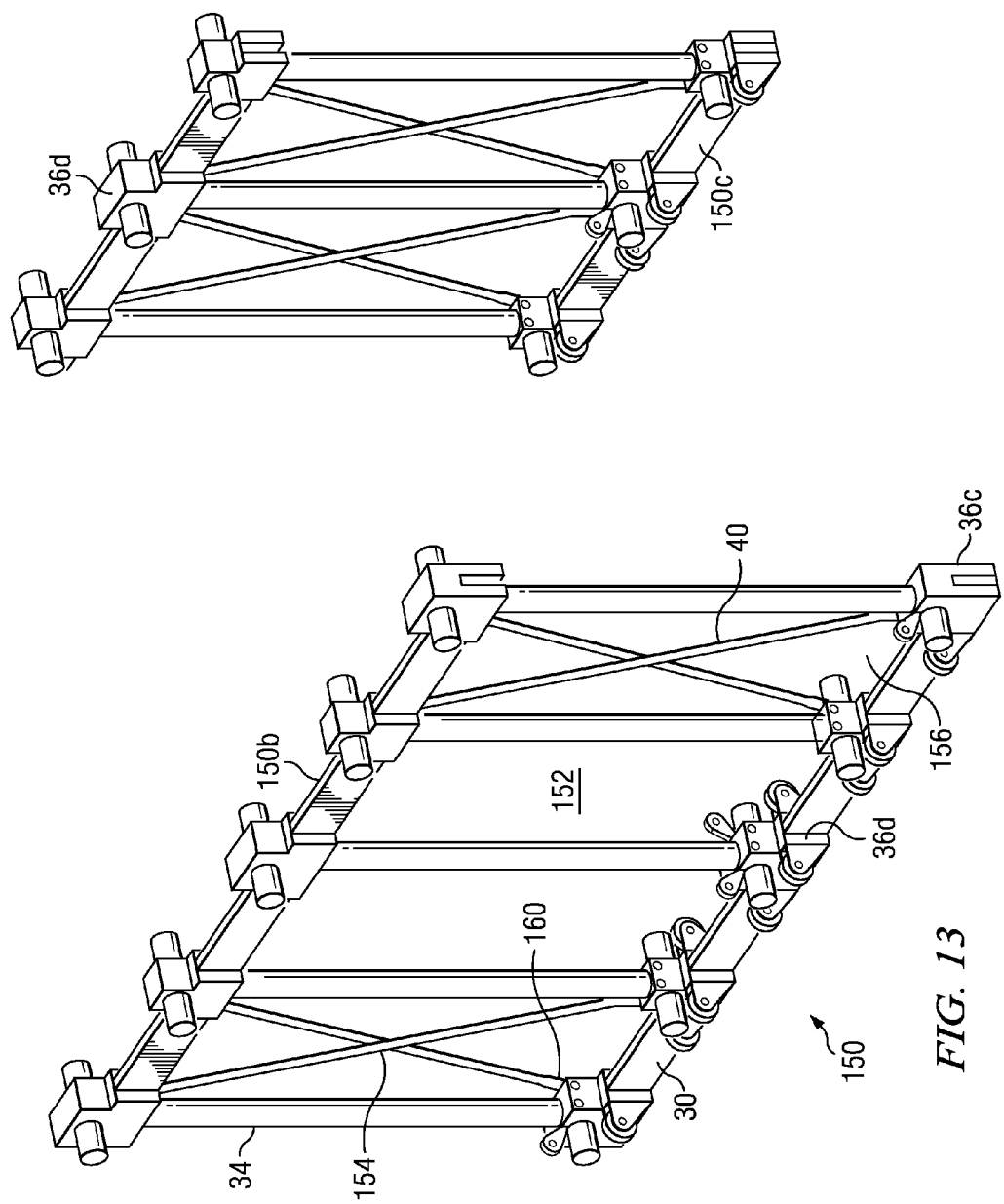
FIG. 13 is an illustration of a perspective view of vertical-lateral planes in accordance with one implementation of the disclosure, the view taken from the front and left of the planes.

Vertical-lateral planes of space frame 20 are indicated generally in FIGS. 12-13 by reference number 150. Where (as in the present exemplary embodiment) it is desired to accommodate nine rows of 20-foot containers, 10 or more lateral-vertical planes of nodes and elements may be provided. Vertical-lateral planes 150a (shown in FIG. 12) are formed by nodes 36, vertical elements 34, and lateral elements 32. Vertical-lateral planes 150a are provided in cargo hold 56. Vertical elements 34 may be connected between outboard nodes 36c and between center nodes 36d, leaving spaces 152 in planes 150a for containers. One or more vertical-lateral planes 150b (shown in FIG. 13) may be located at or near the end of outboard columns 80 of cargo hold 56.

The vertical-lateral plane(s) 150b include central container spaces 152 and pairs 154 of diagonal elements 40 spanning outboard spaces 156. At least one vertical-lateral plane 150c is located in or near aft portion 60, e.g., at or near the end of central columns 80 of cargo hold 56. In trusses 150b and 150c, diagonal tension elements 40 connect diagonally opposed nodes 36. Diagonal elements 40 are attached, e.g., by connectors 160 that do not transfer moment. Such connectors may include, but are not limited to, pin joints and/or bolt connections. In some configurations, at least some of the pairs of diagonal tension elements 40a could be replaced by single tension-compression diagonal elements.

Where (as in the present exemplary embodiment) it is desired to provide two cargo decks 76, three horizontal trusses of nodes and elements may be provided. A horizontal truss is indicated generally in FIG. 14 by reference number 200. Horizontal truss 200 shown in FIG. 14 contributes to upper deck 176a of space frame 20 and extends beyond cargo hold 56 to lower aft fuselage 60. Horizontal trusses 200 include nodes 36, longitudinal elements 30, and lateral elements 32. Diagonal, tension-only elements 40 link a plurality of the nodes 36 and diagonally cross substantially rectangular spaces 208 formed by longitudinal and lateral elements 30 and 32. Diagonal elements 40 are connected to the nodes 36 by connectors 212 that do not transfer moment. Such connectors may include, but are not limited to, pin joints and/or bolt connections.

Figure 15:
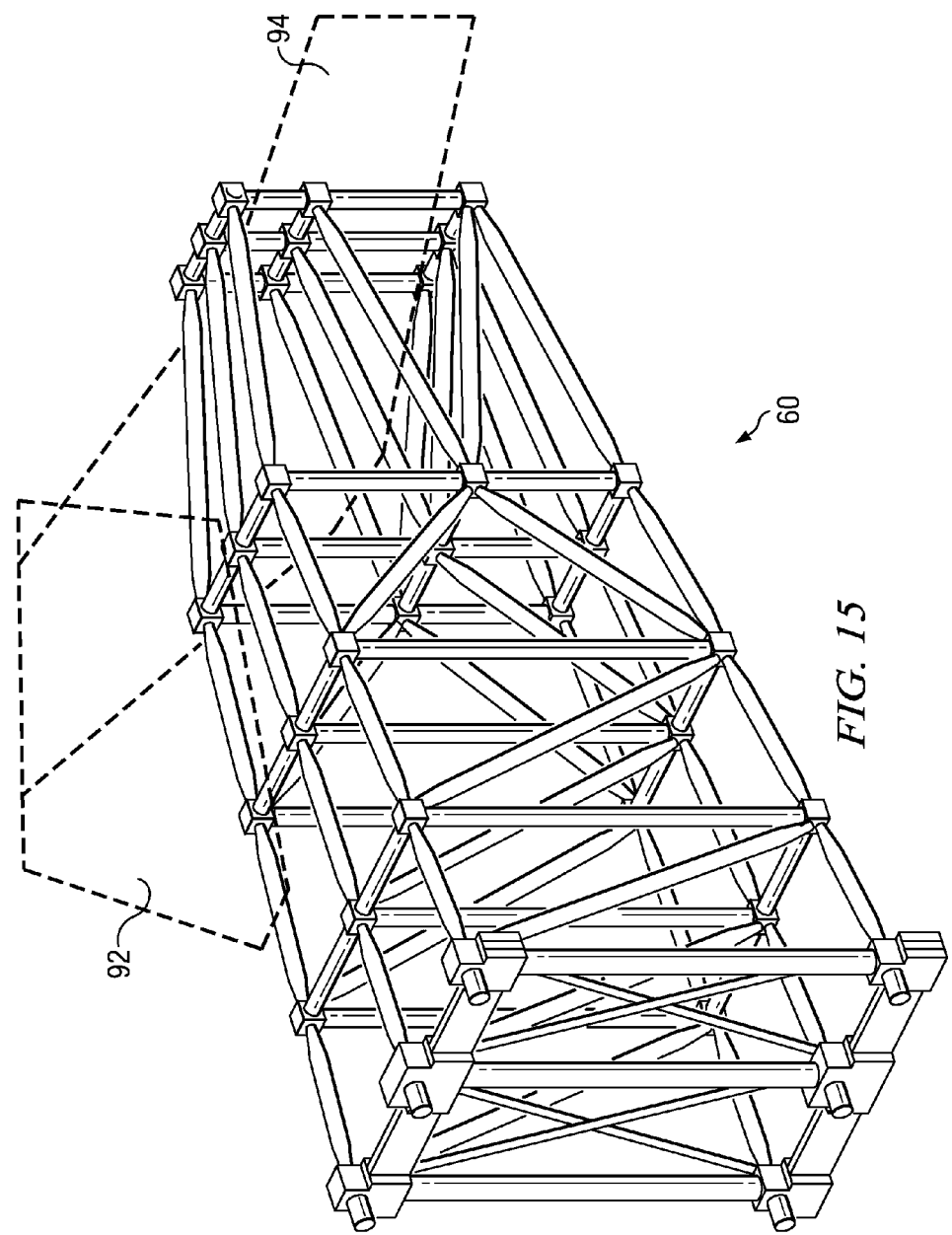
FIG. 15 is an illustration of a perspective view of an aft fuselage structure in accordance with one implementation of the disclosure, the view taken from the front and left of the structure.
Figure 16:
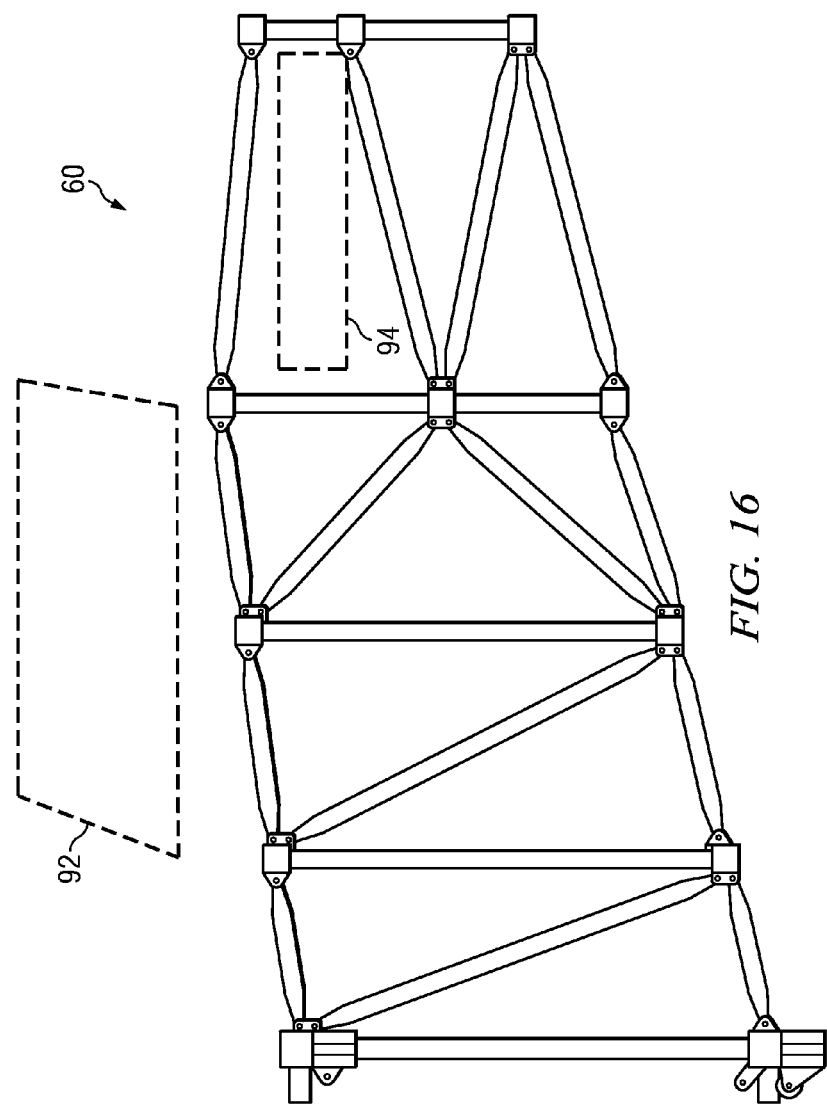
FIG. 16 is an illustration of a left side view of the aft fuselage structure shown in FIG. 14.
Figure 17:
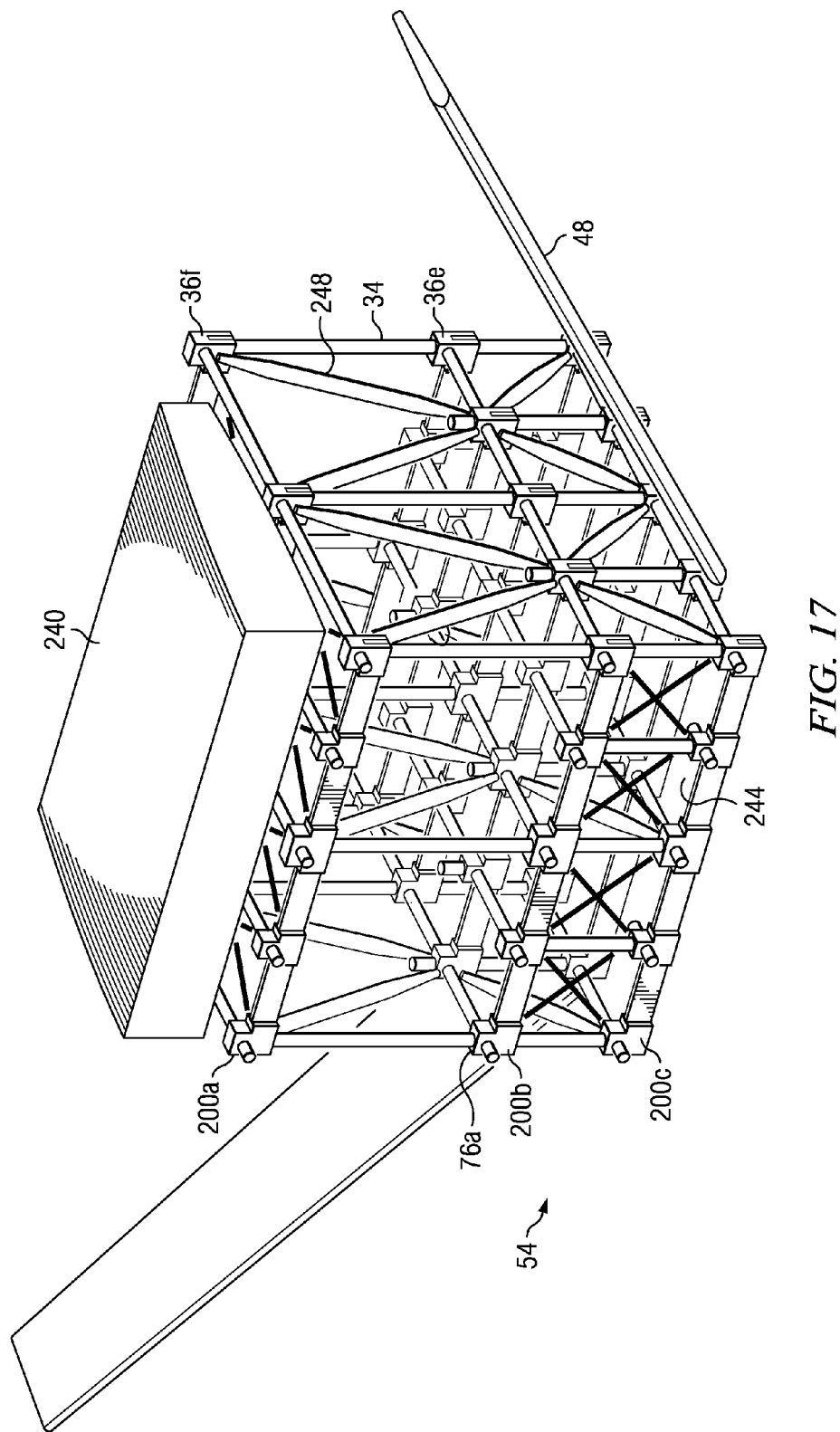
FIG. 17 is an illustration of a perspective view of a fuselage structure near a wing, wing strut, and landing gear in accordance with one implementation of the disclosure, the view taken from the front and left of the structure.

In portions of the space frame 20 outside cargo hold 56, e.g., in aft fuselage structure 60 and fuselage structure 54 near wings 52, wing struts 48 and landing gear, nodes 36 may be included that are different from those in cargo hold 56. In fuselage structure 54, nodes 36 may be connected to the landing gear. Aft of cargo hold 56, nodes 36 may be simpler, and lateral elements 32 may be tubular to save weight. Aft fuselage structure 60 is shown in greater detail in FIGS. 15-16.

Fuselage structure 54 in the area of wings 52, wing struts 48, and landing gear is shown in FIGS. 17-23. Three horizontal trusses are indicated by reference numbers 200a-200c. Wings 52 are represented in FIGS. 17-22 by center wing box 240. In fuselage structure 54, a standard approximately 20-foot module length may be reduced, e.g., divided in half, to provide appropriately sized bays 244 for landing gear (not shown). Landing gear bays 244 may be provided as rectangular bays below upper deck 76. Vertical elements 34 and diagonal bracing 248 connect landing gear bay nodes 36e to upper nodes 36f of the fuselage structure.

Figure 18:
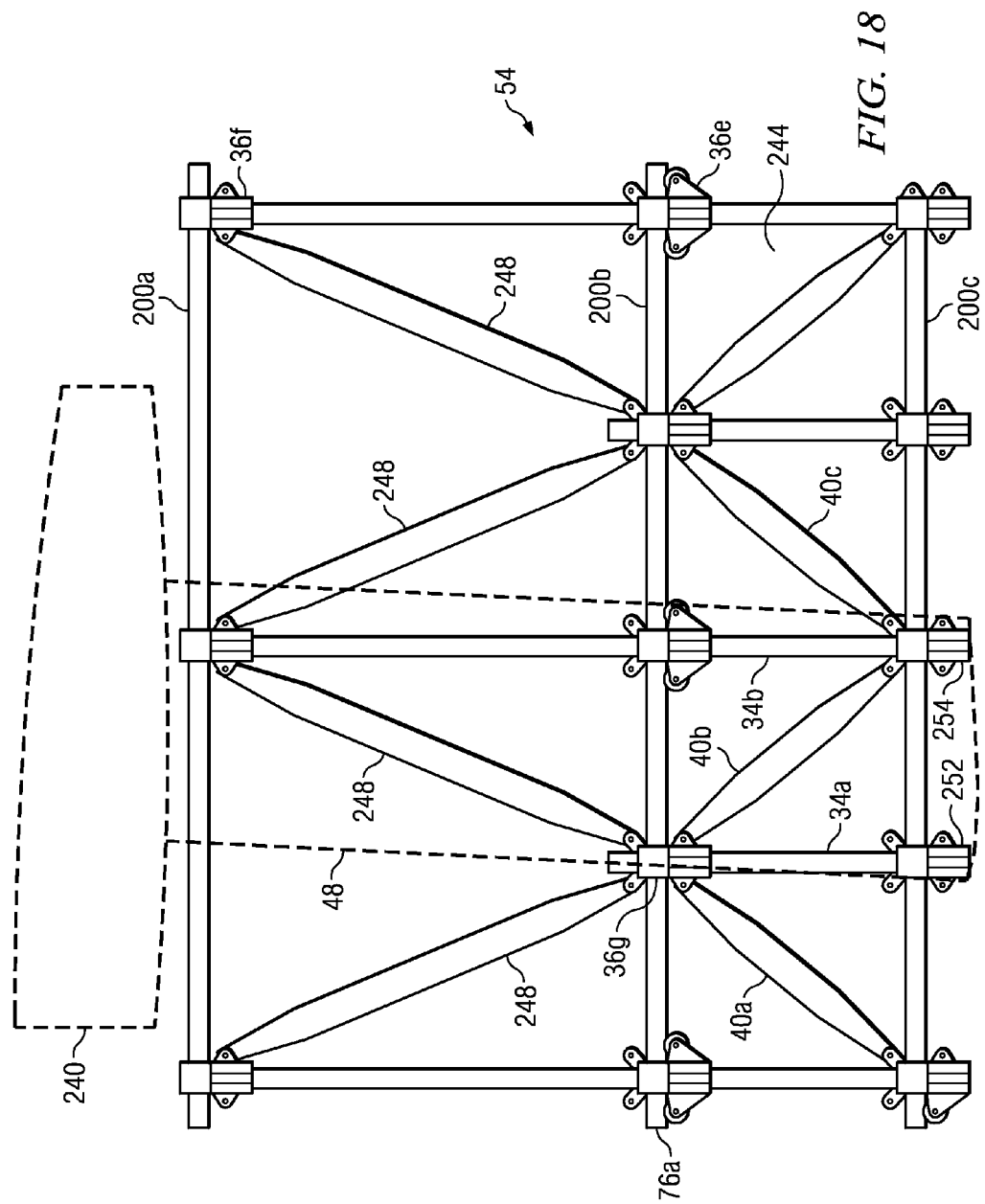
FIG. 18 is an illustration of a left side view of the fuselage structure shown in FIG. 15.
Figure 23:
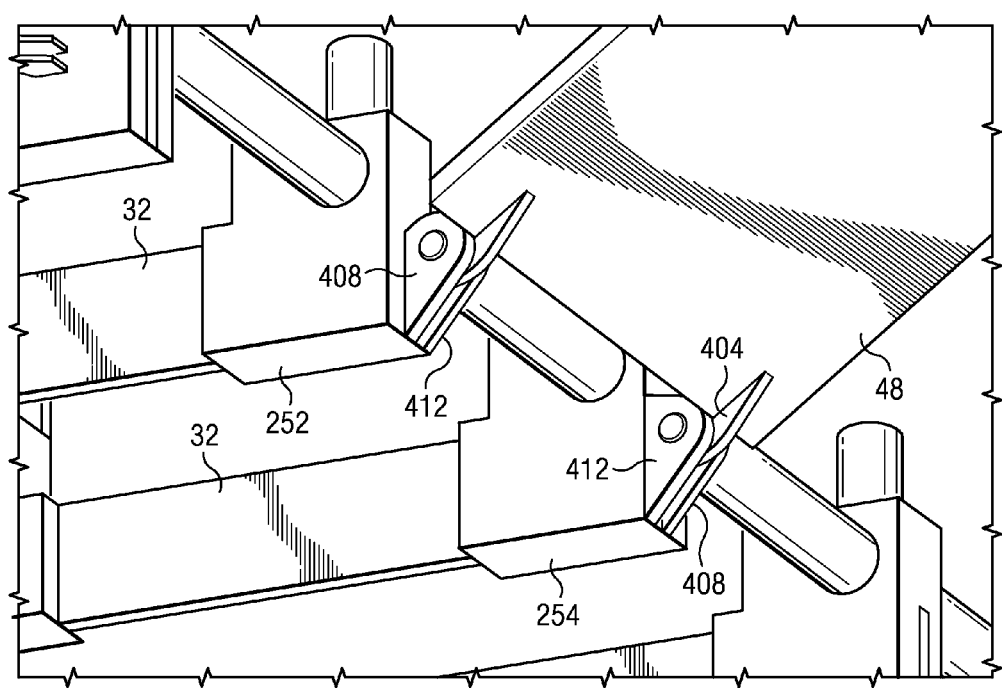
FIG. 23 is an illustration of a perspective view of a left-side wing strut-to-fuselage connection in accordance with one implementation of the disclosure, the view taken looking up from in front, below, and to the left of the aircraft.

Loads of wing struts 48 may be carried through to fuselage structure 54 as shown in FIGS. 18 and 23. Such loads may be taken, e.g., by lateral elements 32 in bottom horizontal truss 200c at forward and aft nodes 252 and 254 connecting a strut 48 and fuselage frame 54. Vertical elements 34 and diagonal elements 40 also meet node connections 252 and 254 between strut 48 and fuselage frame 54. Specifically, a vertical element 34a extends from forward node 252 to a node 36g in upper deck 76a. Vertical element 34a is also connected with two diagonals 40a and 40b in upper deck 76a. Two diagonal elements 40b and 40c and a vertical element 34b are connected to aft node 254. Each of the two diagonal elements 40b and 40c is continued above upper deck 76a by two diagonal elements 248.

Wing box 240 may be connected to the upper fuselage structure 54 at fuselage nodes as shown in FIGS. 19-22. Parts of fuselage structure 54 are omitted for clarity. These connections are similar on forward side 272 and aft side 274 of wing box 240 and are transversely symmetrical. It should be noted that in various implementations, wing 240 is connected with fuselage structure 54 only at fuselage nodes. Such node connections are in contrast to many existing wing-fuselage connections, which are continuous along the active skin of a semi-monocoque fuselage. It also should be noted that, in various implementations, a pressure vessel (e.g., cockpit) of the fuselage does not need to be sealed by wing 240.

Figure 20:
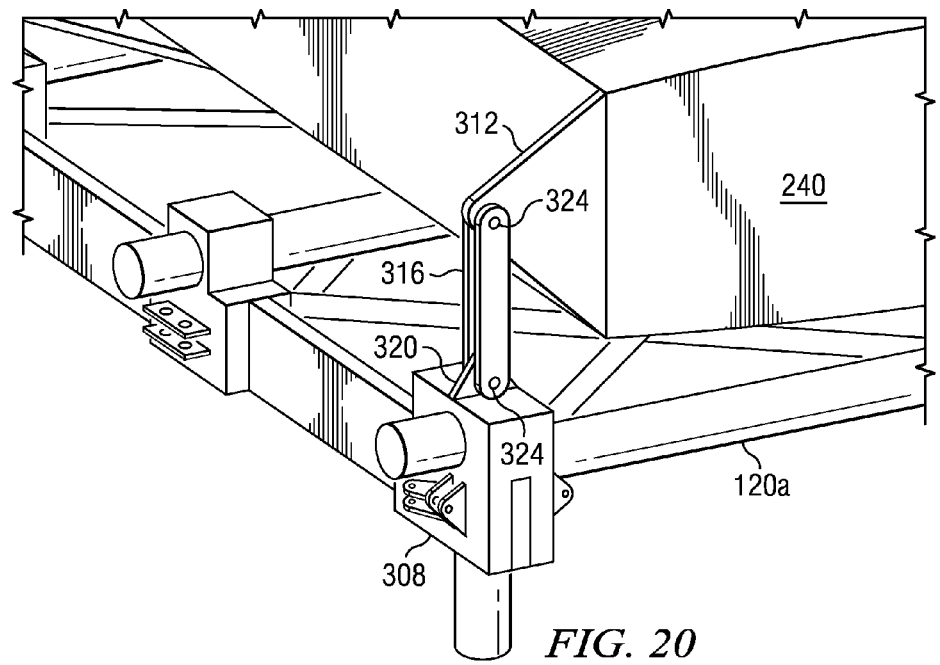
FIG. 20 is an illustration of a partial perspective view of portions of an upper fuselage structure connected with a wing box in accordance with one implementation of the disclosure, the view taken from the front and left of the structure.

FIG. 20 illustrates one of four nodes 308 connecting the center wing box 240 to the outer longitudinal fuselage trusses 120a. A triangular element 312 extends from wing box 240. Two oval links 316 connect wing box extension 312 to a fitting 320 on the space frame node 308. Wing box extension 312 and node fitting 320 both have spherical bearings 324. Bearings 324 permit links 316 to rotate about lateral, longitudinal, and/or vertical axes to account for relative movement between wing box 240 and fuselage structure 54. Links 316 prevent, however, any relative vertical movement between wing box extension 312 and the space frame node 308.

Figure 21:
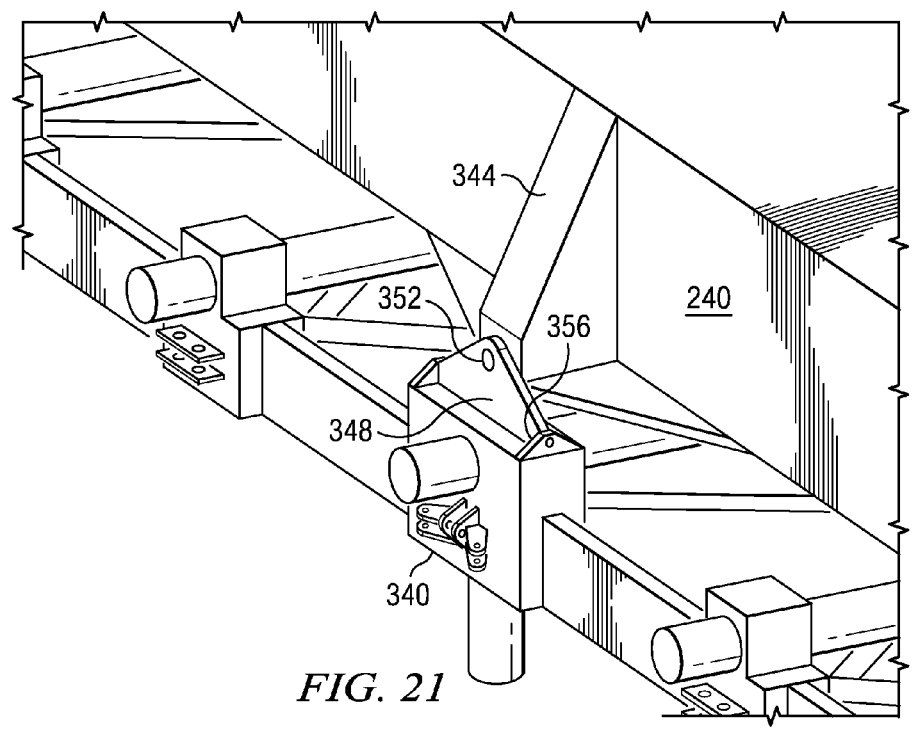
FIG. 21 is an illustration of a partial perspective view of portions of an upper fuselage structure connected with a wing box in accordance with one implementation of the disclosure, the view taken from the front and left of the structure.

FIG. 21 illustrates one of two nodes 340 connecting the center forward wing box 240 to the central longitudinal truss 120b of the fuselage. A triangular fitting 344 extends wing box 240 structure toward a triangular fitting 348 extending from the central node 340. Fitting 348 links wing box extension 344 to the central node 340 via spherical bearing 352 in triangular fitting 348. Bearing 352 allows rotation about longitudinal and/or lateral axes. Triangular link 348 is spaced from triangular fitting 344 by a projection of spherical bearing 352 so that link 348 can rotate freely about a lateral axis. The triangular node fitting 348 is connected to fittings 356 on the central node 340 that allows rotation of link 348 about a lateral axis. Thus, the center of wing box 240 can be restrained relative to fuselage structure 54 in the vertical and lateral directions.

Figure 19:
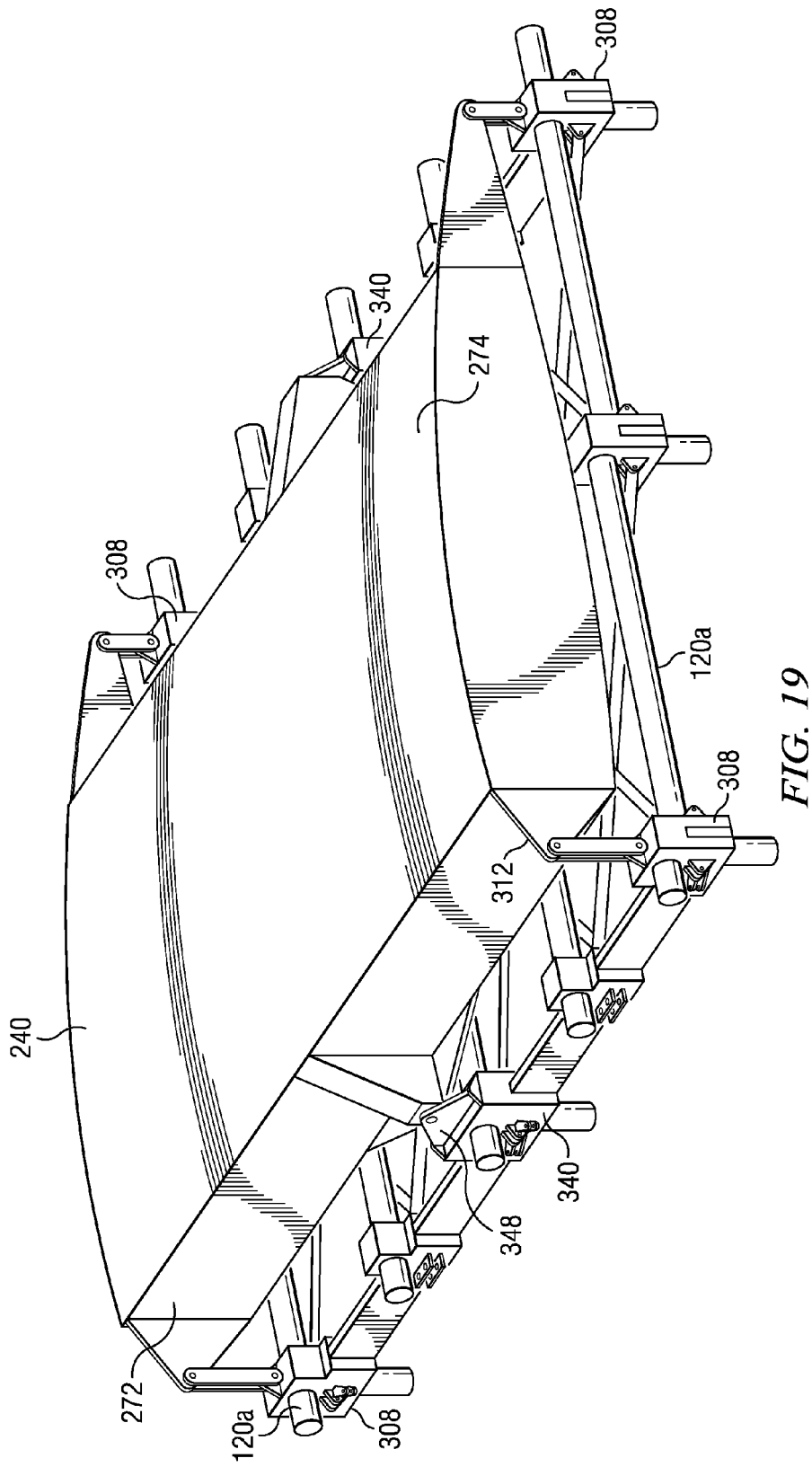
FIG. 19 is an illustration of a partial perspective view of portions of an upper fuselage structure connected with a wing box in accordance with one implementation of the disclosure, the view taken from the front and left of the structure.

Referring to FIGS. 19-21, vertical loads may be imposed at six points: through the four outboard nodes 308 into the outboard longitudinal trusses 120a immediately ahead of and behind wing box 240, and at central fuselage longitudinal truss 120b node points 340 immediately ahead of and behind wing box 240. Lateral loads may be transferred at the two central nodes 340 ahead and behind wing box 240 as shown in FIGS. 19 and 21.

Figure 22:
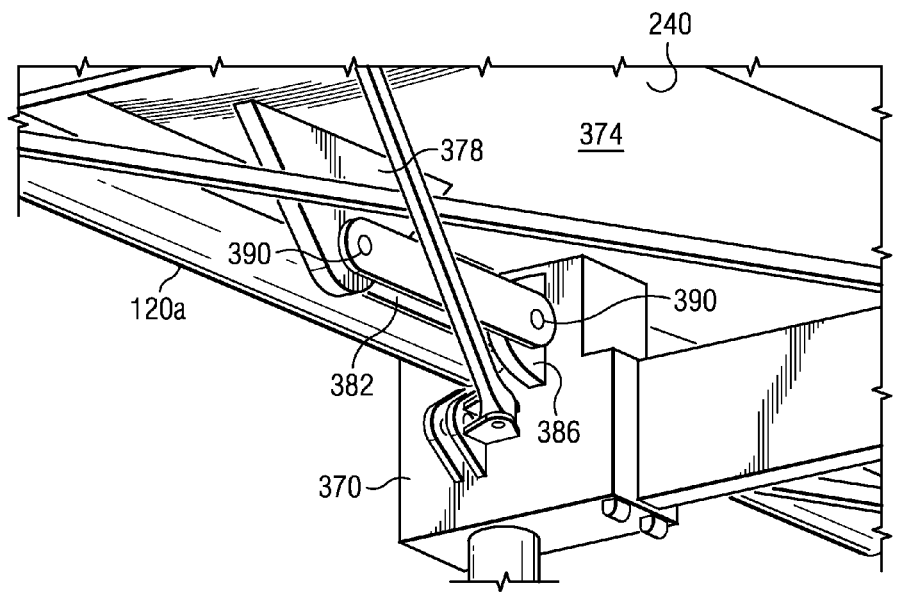
FIG. 22 is an illustration of a perspective view of a starboard outboard fuselage node at a longitudinal center of a wing box in accordance with one implementation of the disclosure, the view taken looking up, aft, and to the right.

FIG. 22 is a view, taken looking up, aft and to the right of aircraft 44, of one of two outboard fuselage nodes 370 at longitudinal center 374 of wing box 240. Triangular element 378 extends downward from wing box 240. Two oval links 382 connect the wing box extension 378 to a fitting 386 on the space frame node 370. Wing box extension 378 and the node fitting 386 both have spherical bearings 390. Links 382 may be similar to the vertical links 316 shown in FIG. 20. Links 382, however, provide for longitudinal fixity, while permitting vertical and lateral motion. Thus, longitudinal loads may be transferred to the two outboard nodes 370.

Lateral location of the wing is provided by the two central links 348. Any relative change in lateral dimension between wing box 240 and the fuselage may be accommodated by a change in angle of the four links 316 and of the two mid-outboard links 382. Longitudinal location of the wing is provided by the two mid-outboard links 382. Any relative change in longitudinal dimension between wing box 240 and the fuselage may be accommodated by a change in angle of the two central links 348 and the four outboard links 316.

Redundant load paths may be provided for vertical, lateral, longitudinal, pitch, roll, and/or yaw loading between the wing and fuselage. Six links, e.g., central links 348 and outboard links 316, may transfer vertical loads. A failure in any one link 348 or 316 may be compensated by a redistribution of the load among the remaining five links. Two links, e.g., the central links 348, may transfer lateral loads. A failure in one of links 348 may result in the transfer of lateral load to the remaining central link 348. A resulting yaw moment may be resolved by the two mid-outboard links 382.

Two links, e.g., the two mid-outboard links 382, may transfer longitudinal loads. A failure of one of links 382 may result in the transfer of longitudinal load through the remaining mid-outboard link 382. A resulting yaw moment may be resolved by the two central links 348. Pitching moments may be resolved by differences in loading between the forward three vertical links (e.g., two outboard links 316 and one central link 348) and the aft three vertical links (e.g., two outboard links 316 and one central link 348). A failure in any one of the links may result in a redistribution of the loads among the remaining five links.

Roll moments may be resolved by differences in loading between the two left outboard links 316 and the two right outboard links 316. A failure of one of these links may be accommodated by a redistribution of the load among the remaining three links as well as the two central links 348. Yaw moments may be resolved by the two central links 348 and the mid-outboard links 382. A failure in one of these links may result in a redistribution of the loads into the remaining three links 348 and/or 382.

In addition to the foregoing redundant paths, it is possible to incorporate a measure of redundancy in some or all of the links. For example, outboard links 316 and mid-outboard links 382 are shown in FIGS. 20-22 as having two separate links for an additional degree of redundancy. Those skilled in the art know of other or additional methods of increasing redundancy in a link system. It also should be noted that although specific numbers of links have been described above in connection with various types of loading, embodiments also are possible, which include different numbers and/or locations of links.

The left-hand wing strut-to-fuselage connection nodes 252 and 254 are shown in greater detail in FIG. 23. Fittings 404 are extensions of the structure of strut 48. Fittings 408 and 412 are extensions of the lateral elements 32 and nodes 252 and 254, respectively. Fittings 404 extend from the strut structure 48 to engage fittings 408 and 412 on fuselage structure 54.

Figure 24:
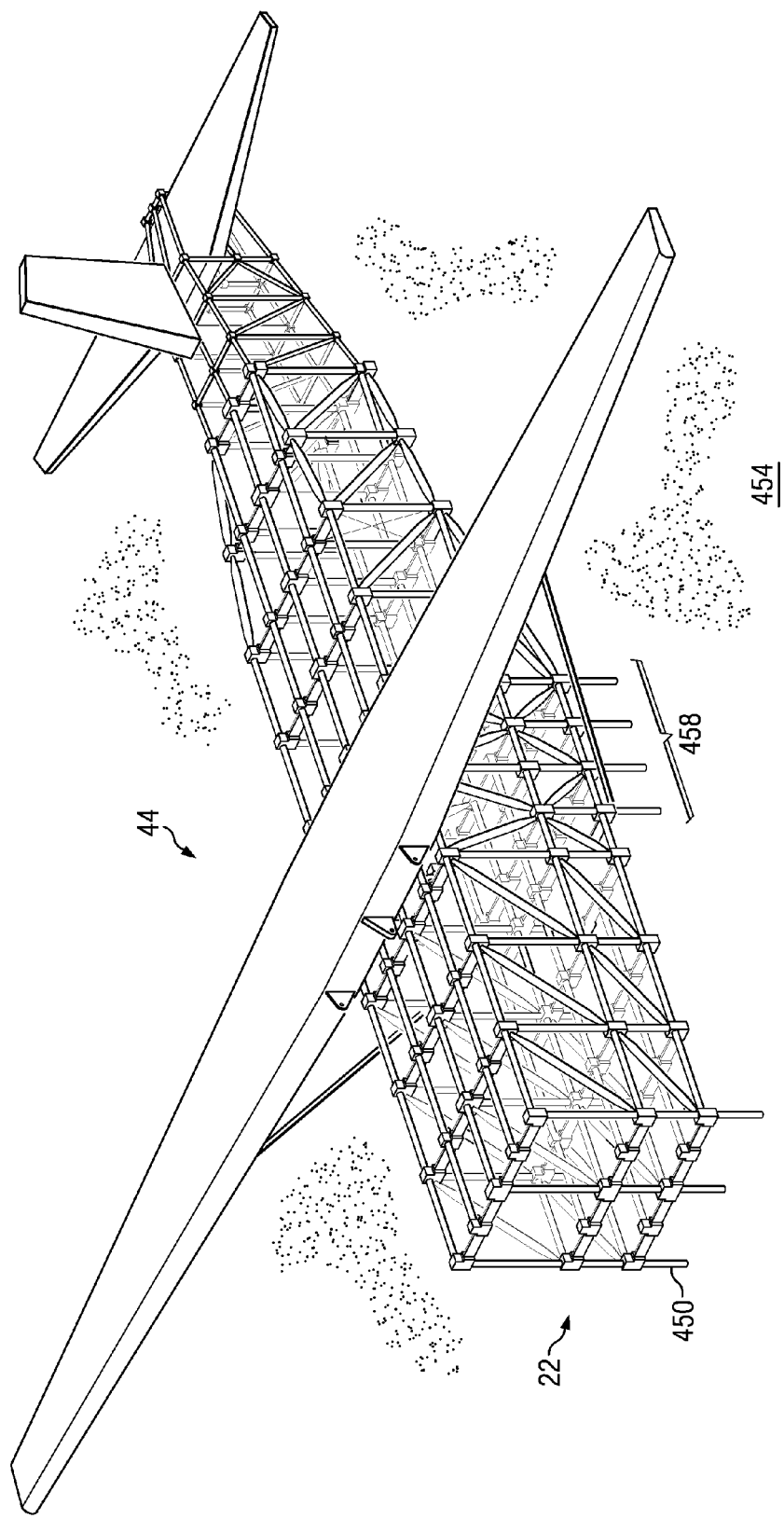
FIG. 24 is an illustration of a perspective view of portions of an aircraft having a fuselage space frame supported by stabilizing jacks in accordance with one implementation of the disclosure, the view taken from the left side.

In some implementations, stabilizing jacks may be provided, e.g., as shown in FIG. 24. A plurality of jacks 450 may be extended, e.g., from pavement 454 underlying aircraft 44, to engage the lower forward fuselage 22 at predetermined nodes 36 in accordance with the center of gravity of aircraft 44 during a loading process. Three longitudinal lines 458 of jacks 450 also may be used, e.g., in alignment with the three longitudinal trusses 120a and 120b.

Other or additional connections between fuselage structure 20 and components of aircraft 44 include, e.g., connections of fuselage 20 to the horizontal tail 94, vertical tail 92, crew compartment (not shown), landing gear (not shown), cargo door (not shown), and cargo door actuator (not shown). Such connections may be made in various ways. For example, a connection could be made directly to one or more fuselage nodes 36. Additionally or alternatively, a sub-frame could be used to serve as an interface between a component and a plurality of fuselage nodes 36. Another option would be to replace one or more portions of space frame 20 with more conventional skin-stringer-frame construction. One portion in which such replacement could be performed is in lateral bays 244 housing the landing gear. Vertical-lateral planes 150 of lateral bays 244 may be suitable for conventional construction, e.g., in order to provide irregular connection points consistent with the geometric demands of the landing gear.

Cargo containers may be loaded and/or unloaded relative to fuselage structure 20 on one or more support pallets. A support pallet is preferably sufficiently strong and rigid to span from one node 36 to the next. Configurations of structures for supporting and lifting cargo containers are described in co-pending U.S. patent application Ser. No. 11/190,675 entitled "Cargo Container Handling System and Associated Method," filed Jul. 27, 2005, the disclosure of which is incorporated herein by reference. In various implementations of the present disclosure, actuators and/or other lift mechanisms are provided in the pallets whereby a container 68 may be raised in bay 72 to secure the container as further described below. Support pallets are longer than one container and could be as long as an entire column of containers.

As previously discussed, at least some nodes 36 are configured to facilitate loading and/or unloading of cargo relative to cargo hold 56. One such node, e.g., node 102 in the center of upper deck 76a, is shown in greater detail in FIG. 25. Node 102 may be fastened to up to eight containers 68, although, as previously mentioned, other nodes could provide fastening arrangements for fewer than eight containers. Node 102 includes four restraining pins 504 near top 508 of the node, two of which are visible in FIG. 25. Each of restraining pins 504 is configured to laterally engage a lower corner fitting 98 of container 68 on upper deck 76a. Four pins 512 are provided at bottom 516 of node 102. Each of pins 512 is configured to engage an upper corner fitting 98 of container 68 on lower deck 76b from above. Four flanged wheels 520 having flanges 524 are provided to support one or more pallets being rolled longitudinally into and/or out of aircraft 44. Flanges 524 can provide lateral guidance to the pallets as they are moved. In some configurations, flanging may not be provided.

In some implementations, the disclosure is directed to a method of loading and/or unloading cargo relative to space frame structure 20. A pallet may be rolled across wheels 520 on successive nodes 36 until one or more containers 68 supported by the pallet have reached their destination in cargo hold 56, e.g., adjacent to and in longitudinal and lateral alignment with nodes 36 to which the container corners are to be fastened. Because wheels 520 are located at nodes 36, loading forces are placed directly into the existing structure. A mechanism in the pallet may be activated to raise the container(s) toward restraining pins 504 and 512, which may be extended to engage the container corners. The pallet mechanism may be lowered clear of container(s) 68, and the pallet may be removed, leaving the container(s) restrained in the fuselage.

It should be noted that the lower restraining pins 512 do not have to be actively extended. If, for example, a frame accommodates 20 foot containers 68 exclusively such that container fitting 98 is always present at node 36, then the lower restraining pins 512 could be fixed. In such case, pins 512 may engage the container fitting as the container is raised. For example, where some containers span across a node (such as at the middle of a 40-foot container), the lower restraining pins 512 could be spring-loaded to the extended position. In such manner, pins 512 would engage a raised container fitting or could be raised out of the way by a container middle structure (not the fitting).

Various embodiments of the present fuselage structure can provide strong, rigid inter-linkage among various major components of an aircraft. The fuselage structure is designed to resolve various external and internal loads on the fuselage. Vertical loads from wings 52, landing gear, horizontal stabilizer 94, wing struts 48, stabilizer jacks 450, containers 68, and so on are resolved by longitudinal trusses 120, e.g., as shown in FIGS. 7, 8, and 9. Longitudinal trusses 120 can resolve loads into nearly pure tension and compression in longitudinal elements 30° (carrying the bending moment) and also in tension and compression in vertical elements 34 and diagonal elements 40 (taking the shear loads). Vertical loads imposed directly on intermediate longitudinal planes 124 (shown in FIGS. 10 and 11) are distributed laterally to longitudinal trusses 120 by lateral elements 32.

Figure 14:
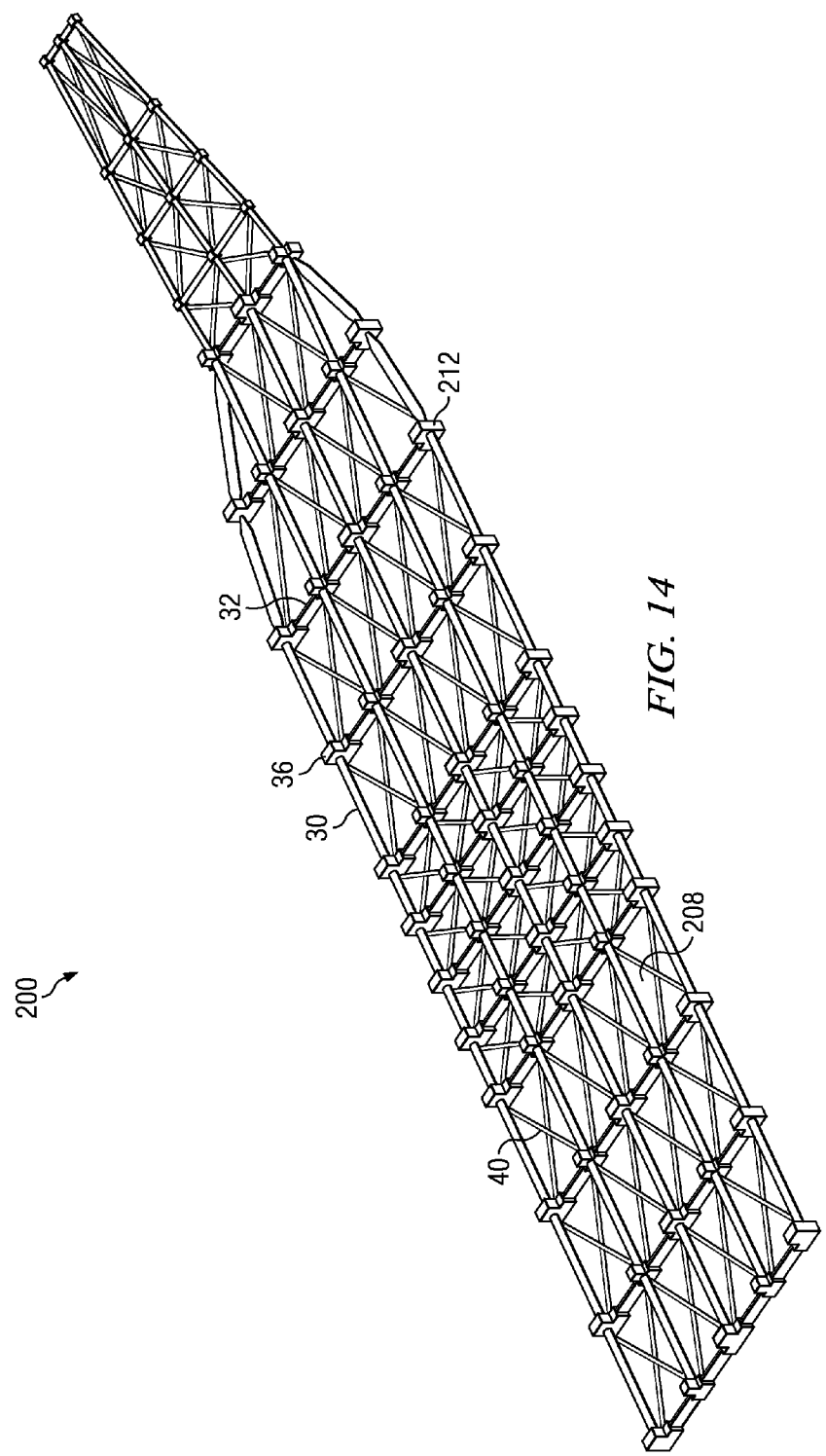
FIG. 14 is an illustration of a perspective view of a horizontal truss in accordance with one implementation of the disclosure, the view taken from the front and left of the plane.

Longitudinal loads from wings 52 may enter into outboard longitudinal trusses 120a as illustrated in FIG. 22. Elements of the space frame structure 20 may distribute such loads throughout longitudinal trusses 120a. From there, such loads may move laterally through horizontal trusses 200 of the structure as illustrated in FIG. 14.

Yawing of the wing box 240 is distributed to upper horizontal truss 200a. Yaw of upper horizontal truss 200a can tend to twist fuselage 20 about a vertical axis so that the cross section of the fuselage tends toward becoming a parallelogram. Such twisting is resisted by cross bracing 40 in the aft fuselage 60 as illustrated in FIG. 13. It is also resisted by triangulation formed by wing strut 48, fuselage 20 side, and wing box 240. It can also be resisted by a structural nose cargo door and/or by the moment capacity of horizontal elements 30 and 32, vertical elements 40, and nodes 36. These elements also resist lateral loads on the fuselage arising from the wing or landing gear. Pitch loads from wing 52 in the vertical plane may be resolved by longitudinal trusses 200.

Lateral loads from vertical stabilizer 92 can be much the same as yaw loads imposed by wing 52 with an additional component of torsion provided by the vertical stabilizer's vertical offset. This torsional component can be primarily resolved by the shear capacity of the outer surface of space frame 20, i.e., upper and lower horizontal trusses 200a and 200c and outboard longitudinal trusses 120a. Crash loads may impose substantial inertial loads on cargo. In the horizontal plane, such forces may be resolved by horizontal trusses 200. In the vertical direction, loads may be handled by longitudinal trusses 120.

It can be highly advantageous in various implementations of the present space frame 20 that longitudinal elements 30, lateral elements 32, vertical elements 34, and diagonal elements 40 of the space frame do not all intersect at focused points. As a result, and as previously discussed, the three orthogonal axes of space frame 20 generally carry moment to stabilize node 36. In some configurations, in the aft fuselage 60 behind cargo hold 56, only lateral and vertical elements 32 and 34 carry moment. Furthermore, pins 504 and 512 that engage cargo containers 68 are also offset from the center of a node 36, imposing further moment on the frame elements.

Figure 25:
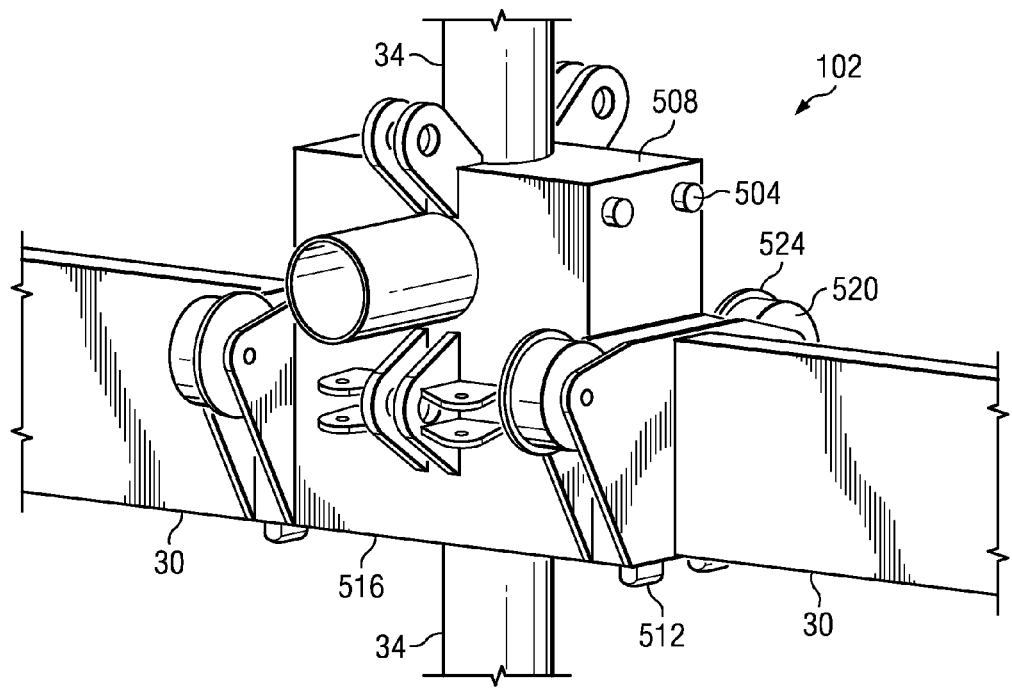
FIG. 25 is an illustration of a perspective view of a node in accordance with one implementation of the disclosure.

Restraining pins 504 and 512 illustrated in FIG. 25 engage cargo container corner fittings 98. The lower fittings 98 are supported vertically and longitudinally by pins 504. Lateral support is provided by direct contact with the node 36 surface (on the compression side only). Upper container corner fittings 98 are supported by pins 512 laterally and longitudinally. Vertical restraint may be provided by the upper nodes 36 in the upward direction only. Flanged wheels 520 support and guide a support pallet as it moves into and out of aircraft 44. Because a pallet is not carried during flight, its weight is not critical. Accordingly, a pallet can be very strong and rigid and can span from one wheel 520 to the next wheel 520 in cargo hold 56, thereby obviating any need for additional wheels or rollers.

Resistance to structural failure that might result from failure of a single element is provided by redundancy in the space frame arrangement. For vertical loads, a plurality of longitudinal trusses 120 (e.g., the three trusses shown in FIGS. 7-9) are redundant. A failure in any one of trusses 120 can be temporarily absorbed by an increased load in other truss(es) 120. Furthermore, in much of fuselage 20, longitudinal trusses 120 provide, in essence, a double-truss with an upper, middle, and lower chord connected by an upper and lower web. A failure in one of these elements may result in the load finding another path. Similarly, in much of the fuselage, a plurality of (e.g., three) substantially horizontal planes of structure are provided. A failure in any one would tend to distribute loads, e.g., to the other two. Several mechanisms may prevent the fuselage cross section from becoming a parallelogram when side-loaded. Such mechanisms may include, e.g., two aft fuselage braced frames 150c, two diagonal wing struts 48, and moment capacity of node joints and frame elements.

Various implementations of the disclosure make it possible to provide structural systems composed essentially of simple elements with minimal numbers of stabilizing elements. Generally, tubular columns in pure axial compression have two potential failure modes: buckling and crippling. Such a structural element may be designed to avoid both failure modes at a specified stress level. It can be shown that it is possible to design a simple tube to just meet buckling and crippling criteria at a single specified stress level a when the load on the tube meets or exceeds a certain value P. The minimum value P can be derived as follows.

The load Pc at which a column buckles is defined by:

$$Pc = C*E*I*\pi^2/L^2 \qquad (1)$$

where C represents end fixity, i.e., a non-dimensional factor pertaining to the end condition, Pc represents the critical buckling load in pounds, E represents the material modulus of elasticity in pounds per square inch, I represents the moment of inertia in inches$^4$ and L represents the tube length in inches.

Moment of inertia is determined by tube radius and wall thickness according to the well-known equation for thin wall tubes:

$$I = \pi*R^3* \qquad (2)$$

where R represents the tube radius in inches and t represents the tubing wall thickness in inches.

Cross sectional area for the tube varies according to:

$$A = 2*\pi*R* \qquad (3)$$

where A represents the tube cross-sectional area in square inches. By substituting the expression for 1 from equation (2) into equation (1) and dividing by equation (3), the following equation results:

$$Pc/A = C*E*\pi^2*R^2/(2*L^2) \qquad (4)$$

where Pc/A represents the material stress in pounds per square inch. Solving equation (4) for R gives the following:

$$R = ((2*Pc/A*L^2)/(C*\pi^2*E))^{0.5} \qquad (5)$$

Since Pc/A is the stress in the tube and is a specified value, it may be noted that the minimum radius R of the tube is independent of the load Pc on the tube and is proportional to length squared, $L^2$.

The structure may also resist a second type of instability, i.e., "crippling". Crippling is a localized unstable deformation that occurs in circular cross section tubes according to the following approximate equation:

$$P/A = 0.605*E*t/R \qquad (6)$$

where P/A represents the critical stress at which crippling occurs in pounds per square inch. It can be observed from equation (6) that crippling stress P/A increases with increasing wall thickness t and decreasing tube radius R.

By setting equations (4) and (6) equal, one can obtain the relationship that is obtained when critical buckling and crippling stresses are equal:

$$t = 0.826*R^3*C*\pi^2/L^2 \qquad (7)$$

where σ is used to represent the stress in the component at the coincident buckling and crippling limit:

$$\sigma = P/A \qquad (8)$$

Equation 8 may be rearranged to obtain:

$$P = \sigma*A \qquad (9)$$

Substituting the expression for A from equation (3) into equation (9) obtains the following:

$$P = 2*\pi*R*t*\sigma \qquad (10)$$

Substituting the expression for t from equation (7) into equation (10) obtains the following:

$$P = 1.652*\pi^3*\sigma*C*R^4/L^2 \qquad (11)$$

Substituting the expression for R from equation (5) into equation (11) obtains:

$$P = (6.608\ \sigma^3*L^2)/(\pi*C*E^2) \qquad (12)$$

where P represents the minimum load (in pounds) that permits a buckle and cripple-free un-stiffened tube at the specified stress σ.

Inspection of equation (12) shows that there is a minimum load for a simple tube of a specified length and end condition to achieve a specified stress level and be stable for buckling and crippling. A lesser load would result in a tube that is too thin and that cripples before the specified stress level is reached.

Alternatively, the diameter can be reduced to increase the wall thickness, but such a tube would buckle before the desired stress level is reached. More load results in a greater wall thickness, giving greater crippling resistance, while still meeting the buckling criterion specified in equation (1).

In structures where a minimum load P, as discussed with reference to equation (12), is not reached, the structure is typically stabilized with additional structural elements. These may provide stabilization against buckling, permitting a smaller radius and a thicker, cripple-resistant skin. Alternatively, stabilizing elements may address crippling. Such stabilizing elements tend to add weight, complexity, and cost to the structure.

The inventors have observed that structural elements as contemplated in configurations of container-carrying cargo aircraft in accordance with the present disclosure generally have loads that are near to or exceed the minimum level for the lengths involved, according to equation (12). This means that these elements can be made without additional stabilizing elements, such as stringers or corrugations, that improve crippling resistance but complicate the manufacturing and assembly process.

Although the foregoing discussion refers to circular cross-section tubes of constant, thin wall thickness, it can be shown that the same general phenomenon obtains for compression elements of any general form. That is, for a given set of constraints (stress, length, modulus of elasticity, and end fixity), it can be shown that there is a minimum load P at which additional stabilizing elements are not required. As a result of the above, most of the elements of the space frame fuselage can be made of un-stiffened tubes. This greatly reduces the part count, assembly tooling, and assembly cost. Furthermore, because most of the frame elements can be used at or near their stress limits, the structure is lighter than conventional fuselage structures in which much extra structure is needed to stabilize the primary structural elements.

Elements of space frame 20 can be assembled with little tooling. Longitudinal, lateral, and vertical elements can be "plugged into" nodes to obtain a general space frame form and dimensions. Addition of precise-length diagonal elements 40 can determine a precise alignment of the space frame and can render it rigid. Space frame elements can be pre-assembled in relatively compact layers and then joined to a prior layer. For example, a fuselage can be pre-assembled as vertical-lateral planes 150, which can then be joined together first by longitudinal elements 30 and then stabilized by diagonal elements 40. In such manner, a fuselage can be built outwardly from starting frame 150. Alternatively, the fuselage can be pre-assembled as horizontal trusses 200, which can then be joined together by vertical elements 34. Preferably, all "plug-in" connections are orthogonal and can be made without jamming. Diagonal elements 40 may then be easily placed and pinned.

Individual components of the fuselage, e.g., tubes, beams, tension elements, and nodes, are generally very compact. Such elements are typically short in length and compact in other dimensions. Additionally, such components can be packed together efficiently so that transport can be relatively efficient. This contrasts with the transport of typical aircraft structure, which tends to be dimensionally bulky and very lightweight. In some implementations, a kit may be provided that includes some or all components for making a space frame fuselage.

Most elements of a space frame can be made by substantially simple tooling. For example, cylindrical tubes can be made with a constant inside diameter so that they plug onto stub tubes that project from the nodes. In such case, key dimensions of the tube with respect to assembly would be inside diameter and length, both of which are relatively easy to make accurately. The outside diameter of a tube is not critical from an assembly standpoint and can be varied (by varying wall thickness) to account for different loads at different points on the tube and/or to optimize for resistance to buckling.

Many elements of the space frame structure can be made with dimensional precision. For example, many of the elements can be made to a precise length as noted above. This permits assembly of the structure without laborious trimming, shimming, or adjustment of the parts. There are far fewer parts in various configurations of the present space frame assembly than in a typical semi-monocoque fuselage of equivalent size. This is a result of un-stiffened parts and far fewer connections and fasteners.

In general, diagonal elements 40 of vertical-longitudinal trusses 120 may be arranged so that they experience tension when stressed by a positive pull-up maneuver. Such a maneuver puts greater loads on such trusses than the opposite negative push-over maneuver, according to certification requirements. In such manner, the greatest load on diagonal elements 40 would be in tension, where buckling and crippling are not an issue. This permits a smaller diameter cross section for a diagonal element 40 and provides a diagonal element 40 with a greater margin against structural crippling. In the same positive pull-up maneuver, vertical elements 34 may be compressed. Vertical elements 34, however, are typically considerably shorter than diagonal elements 40, so buckling is less of an issue. Thus, longer diagonal elements 40 see their greatest loads in tension. Shorter vertical elements 34 see their greatest loads in compression but are less susceptible to buckling, because they are shorter. Additionally, the moment connection of a vertical element 34 to a space frame node 36 tends to provide a degree of end fixity that reduces any tendency of the vertical element 34 to buckle.

As previously discussed, a single diagonal element 40 may be used in a rectangular cell to provide shear transfer, e.g., as previously discussed with reference to vertical-longitudinal trusses 120 (shown in FIGS. 7-9). Alternatively, two diagonal elements 40, forming an "X", may be used in a cell, e.g., as shown in FIG. 24. Choices of bracing types and materials may be influenced by various factors. Materials that would operate in compression (such as aluminum and carbon fiber reinforced plastics) tend to have substantially lower stress allowables than materials that operate only in tension (e.g., aramid fibers, such as Dupont Kevlar or Tejin Technora), while elastic moduli are similar. Rigidity, weight, and/or cost could also influence a choice between single-element bracing and X-bracing.

The foregoing fuselage structure can have compact dimensions and can be lighter and less expensive compared to conventional semi-monocoque fuselages, resulting in an airplane for which costs of cargo transport are lower relative to transport costs for other airplane types. Various nodes of the fuselage structure can be located at, and can interconnect, various concentrated loads of the airplane including, e.g., a crew station (cockpit), wings, landing gear, tails, cargo containers, cargo door, external jacks, and wing struts. The foregoing fuselage structure can provide sufficient strength and rigidity under various flight, landing, taxi, and crash loads.

The systems and methods of the present disclosure make it possible for transporting cargo by aircraft at reduced costs, through the use of inter-modal containers that can be loaded at the origin, carried on surface vehicles, carried on airplanes, and delivered to the destination via surface transport, all without intermediate handling of the cargo within the containers. Most existing cargo airplanes are derived from passenger airplanes and/or may be required at times to carry passengers. As a result, almost all existing cargo airplanes have pressurized cargo holds so that passengers may breathe effectively at high cruise altitudes. Where a new, pure-cargo aircraft is provided that includes a configuration of the foregoing space frame structure, a significant constraint for fuselage structure, i.e., a pressurized cargo hold, is removed.

In various implementations, cargo containers can be connected to the fuselage at only a few discrete points. No connections need to be made between a container and the fuselage structure other than the previously described connections with the fuselage structure at corner fittings of the container. Compared to conventional aircraft fuselages, the foregoing fuselage structure has less and lighter structure dedicated to stabilizing the structure against buckling, crippling, and crushing from in-service loads. The fuselage structure can be inexpensive to make as a result of reduced need for trimming of parts during assembly, reduced need for dimensional accuracy of parts, reduced need for tooling for part manufacture and assembly, simple manufacturing processes for components, reduced component size for ease of transportation, and reduced number of parts.

An aircraft having the foregoing fuselage structure can be jacked for cargo loading and unloading operations. The fuselage structure makes it possible for jack points of the fuselage to accept very large, concentrated loads. Various implementations of the disclosure facilitate rapid loading and unloading of cargo, including rapid restraint of the cargo. It should be noted that the present fuselage structure can support the cargo as it is loaded and unloaded.

Various configurations provide structural redundancy in the event of a partial structural failure. The strength of the fuselage can be increased or decreased with little change to the overall form or dimensions of the fuselage. Strengths of many of the fuselage elements can be easily tailored to the loads on specific elements without changing the general form or tooling for a particular element. The size of the fuselage can be enlarged or reduced incrementally with little change to initial structure. Thus, various implementations of the disclosure can facilitate rapid assembly of a fuselage from simple parts using little tooling. By virtue of the easily tailored strength of the components, it may be desirable to create some areas within the airplane where higher weight payload may be carried. Such a payload may impose extra load on some of the structural elements. These elements can be strengthened with little change to tooling or the overall arrangement of the fuselage structure.

Furthermore, this ease of adjustment of component strength may enable a manufacturer to offer specially-tailored structures according to individual customer's needs or to offer a wide range of models with relatively little extra development cost. A fuselage structure can be built in which little, if any, extra structure is required to provide stability against buckling, crippling, and/or crushing. Some implementations work well with a strut-braced wing. Simple, light-weight composite and/or metallic parts can be used effectively in the foregoing fuselage structure, and the span of cargo floor beams can be reduced.

Space frame structural concepts of the present disclosure lend themselves to easy replacement of structural components. Replacement can be easy, e.g., because a space frame component typically is connected to only two other components (i.e., to nodes). Thus, a damaged component typically can be easily and quickly replaced, thereby reducing the economic loss of keeping an airplane out of service and reducing the cost of the actual repair. Ease of replacement can make it possible to replace certain components with stronger components for an individual flight or series of flights with an unusual or special payload that tends to increase loads in those components. This increases the utility of the airplane, while retaining its light weight for typical, less concentrated payloads.

It is a characteristic of various implementations of the space frame fuselage structure that essentially all of the loads flow through space frame linear elements. The number of these elements is small compared to prior art fuselage structures, and the number of connections to each element is small. This means that stresses in each individual component may be obtained from a few sensors.

Furthermore, flow of loads throughout the entire fuselage structure, including the nodes, may be easily calculated from such individual stresses due to the discrete load paths of the space frame. This enables the loads on the structure to be easily monitored over time. For example, a system monitoring a space frame fuselage structure may report if any component has been overloaded. Such a report could trigger an inspection or replacement of the component. A monitoring system could provide a report of loads on each component over a lengthy period of time. Such a report could be used to more accurately size each component in future airplanes and/or could lead to the replacement of in-service components that may be too heavily loaded (with stronger components) or may be too lightly loaded (with lighter components).

A monitoring system could report if there is a relative change in the loading of any component, for example, if a damaged component deflects instead of carrying load and sheds load to other, neighboring components. Accordingly, the damaged component could be replaced. Additionally or alternatively, a monitoring system could record load versus time on each component in the event of a crash. Such a report could provide analysts with a very detailed record of structural dynamics during a crash. This could lead to improved designs and can permit a more accurate analytical reconstruction of a crash occurrence.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

Figure 26:
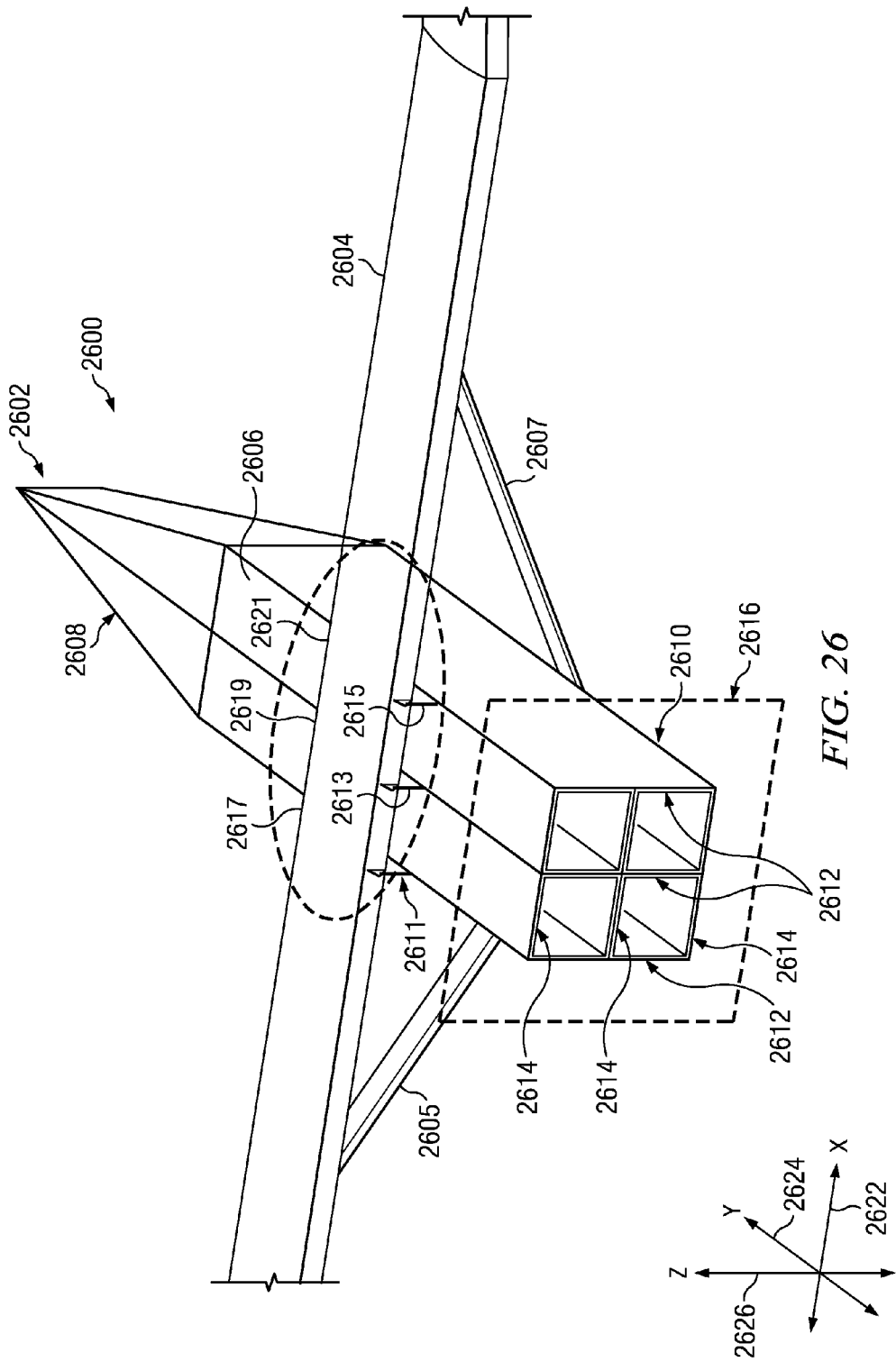
FIG. 26 is an illustration of an aircraft in accordance with an advantageous embodiment.

With reference now to FIG. 26, an illustration of an aircraft is depicted in accordance with an advantageous embodiment. In this illustrative example, aircraft 2600 is an example of aircraft 101 in FIG. 1 and aircraft 200 in FIG. 2. As depicted, aircraft 2600 is comprised of fuselage structure 2602 and wing 2604.

Wing 2604 is attached to top 2606 of fuselage structure 2602. Wing 2604 is attached to top 2606 of fuselage structure 2602 by connection structures 2611, 2613, 2615, 2617, 2619, and 2621. Further, wing 2604 is positioned substantially perpendicular to fuselage structure 2602. Wing 2604 is also attached to fuselage structure 2602 through first outer member 2605 and second outer member 2607. First outer member 2605 and second outer member 2607 are wing struts in these examples.

In this illustrative example, fuselage structure 2602 includes structure 2608. Structure 2608 takes the form of space frame 2610. Space frame 2610 is shown without the nodes and elements that comprise space frame 2610 in vertical-longitudinal planes 2612 and horizontal-longitudinal planes 2614. These nodes and elements may form, for example, trusses, as depicted in space frame 20 in FIG. 3.

Horizontal-longitudinal planes 2614 through space frame 2610 may be substantially formed by x-axis 2622 and y-axis 2624. Horizontal-longitudinal planes 2614 may be substantially horizontal, substantially longitudinal, and substantially parallel to each other in these examples.

Vertical-longitudinal planes 2612 through space frame 2610 may be substantially formed by y-axis 2624 and z-axis 2626. Vertical-longitudinal planes 2612 may be substantially vertical, substantially longitudinal, and substantially parallel to each other in these examples.

Vertical transverse planes 2616 through space frame 2610 may be substantially formed by x-axis 2622 and z-axis 2626. Vertical transverse planes 2616 may be substantially vertical, substantially transverse, and substantially parallel to each other in these examples. Nodes and elements may not be present in vertical transverse planes 2616 in space frame 2610, because the nodes and elements may block the loading of containers into space frame 2610.

Space frame 2610 is configured to carry shear and bending loads. These shear and bending loads are in the directions of vertical-longitudinal planes 2612, horizontal-longitudinal planes 2614, and vertical transverse planes 2616.

The different advantageous embodiments recognize and take into account a number of different considerations. The different advantageous embodiments recognize and take into account that a space frame may have nodes and elements forming trusses in the vertical transverse planes through the space frame. These trusses provide support in the vertical transverse planes. In particular, these trusses support loads carried in the space frame in the direction of the vertical transverse planes.

However, these trusses may block the loading of containers into the space frame when they are permanently fixed in the space frame. The different advantageous embodiments recognize and take into account that having replaceable and/or removable trusses in the vertical transverse planes through the space frame may reduce the reliability of trusses, increase the cost of the aircraft, increase the time spent loading and/or unloading the aircraft, and/or cause issues with flight scheduling.

The different advantageous embodiments also recognize and take into account that trusses in the vertical transverse planes of a fuselage structure may allow trusses in the vertical longitudinal planes of the fuselage structure to be coupled. In this manner, loading in the fuselage structure may be transferred between the trusses in the vertical longitudinal planes that are coupled.

The different advantageous embodiments recognize and take into account that currently, trusses in the vertical transverse planes may only be present at the forward and aft ends of the fuselage structure. However, with this type of configuration, the trusses in the vertical-longitudinal planes may not be coupled along the entire length of the trusses. In other words, a portion of the trusses in the vertical-longitudinal planes between the forward and aft ends of the fuselage structure may not be coupled. As a result, support for this portion of the trusses may decrease along the length of this portion of the trusses from the forward and aft ends towards the center of the trusses.

Further, with this type of configuration, loading in the fuselage structure may be supported by having the trusses in the vertical-longitudinal planes of the fuselage structure connected to the wing. In other words, the wing may be used to support loading in the fuselage structure. However, the different advantageous embodiments recognize and take into account that this type of configuration may cause undesired bending loads on the wing.

By attaching the trusses in the vertical-longitudinal planes to the wing, the loads carried in these trusses can be supported by bending in the center portion of the wing attached to the space frame. However, this bending increases the shear loads and bending moment at the center portion of the wing. The different advantageous embodiments recognize and take into account that bending in the center portion of the wing may increase the weight and/or cost of the wing, and in particular, the center portion of the wing.

Thus, the different advantageous embodiments provide an apparatus and method for transporting containers in an aircraft. In particular, the different advantageous embodiments provide an apparatus for providing support for loading caused by the containers in the aircraft. In one advantageous embodiment, an aircraft comprises a first outer planar structure, a second outer planar structure, a number of planar structures located between the first outer planar structure and the second outer planar structure, a wing, and a support structure. The first outer planar structure, the second outer planar structure, and the number of planar structures are substantially parallel to each other, are coupled to each other to form the fuselage structure, and are configured to receive a number of containers. The support structure connects the wing to a first bottom end of the first outer planar structure, a second bottom end of the second outer planar structure, and a number of bottom ends of the number of planar structures.

Figure 27:
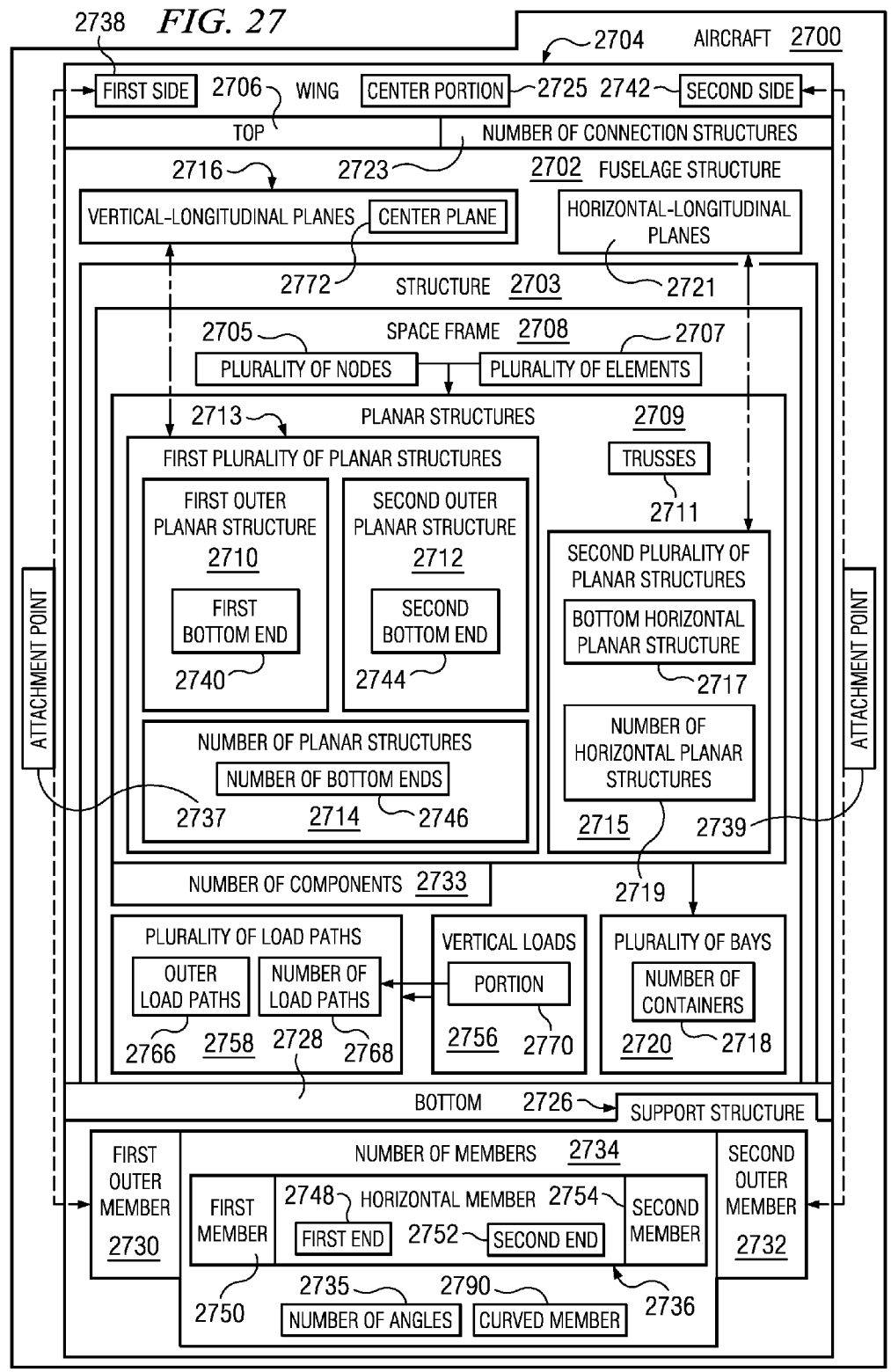
FIG. 27 is an illustration of a block diagram of an aircraft in accordance with an advantageous embodiment.

With reference now to FIG. 27, an illustration of a block diagram of an aircraft is depicted in accordance with an advantageous embodiment. In this illustrative example, aircraft 2700 is an example of one implementation of aircraft 101 in FIG. 1 and aircraft 200 in FIG. 2. As depicted, aircraft 2700 is comprised of fuselage structure 2702 and wing 2704.

Wing 2704 is attached to top 2706 of fuselage structure 2702. Further, wing 2704 is positioned substantially perpendicular to fuselage structure 2702. In this illustrative example, wing 2704 is attached to top 2706 of fuselage structure 2702 through number of connection structures 2723.

In these illustrative examples, fuselage structure 2702 includes structure 2703. Structure 2703 takes the form of space frame 2708 in these examples. Space frame 2708 is an example of one implementation for space frame 208 in FIG. 2. Further, space frame 2708 may be implemented using space frame 20 in FIG. 3. In these depicted examples, space frame 2708 is comprised of plurality of nodes 2705 and plurality of elements 2707 connecting plurality of nodes 2705. Wing 2704 is connected to fuselage structure 2702 using at least a portion of plurality of nodes 2705.

Space frame 2708 also includes planar structures 2709. Planar structures 2709 are formed by at least a portion of plurality of nodes 2705 and at least a portion of plurality of elements 2707. In these depicted examples, planar structures 2709 take the form of trusses 2711. In other illustrative examples, planar structures 2709 may be comprised of at least one of nodes, elements, segments, beams, rods, linkages, and/or other suitable types of structures.

Planar structures 2709 include first plurality of planar structures 2713 and second plurality of planar structures 2715 substantially perpendicular to first plurality of planar structures 2713. First plurality of planar structures 2713 includes first outer planar structure 2710, second outer planar structure 2712, and number of planar structures 2714 coupled together. Number of planar structures 2714 is located between first outer planar structure 2710 and second outer planar structure 2712.

A planar structure, in these examples, is a structure that lies in substantially one plane. First outer planar structure 2710, second outer planar structure 2712, and number of planar structures 2714 each lie substantially in a plane in vertical-longitudinal planes 2716. Vertical-longitudinal planes 2716 may be, for example, vertical-longitudinal planes 2612 in FIG. 26. Vertical-longitudinal planes 2716 are substantially vertical, substantially longitudinal, and substantially parallel to each other. In other words, vertical-longitudinal planes 2716 are substantially perpendicular to wing 2704, extend through the length of fuselage structure 2702, and do not intersect.

In this manner, first outer planar structure 2710, second outer planar structure 2712, and number of planar structures 2714 are substantially parallel to each other. In other words, first outer planar structure 2710, second outer planar structure 2712, and number of planar structures 2714 do not intersect. At least a portion of first plurality of planar structures 2713 is connected to wing 2704 by number of connection structures 2723. In this illustrative example, number of connection structures 2723 connects to center portion 2725 of wing 2704. Center portion 2725 may be, for example, a wing box or some other suitable wing structure.

Second plurality of planar structures 2715 lies in horizontal-longitudinal planes 2721. Horizontal-longitudinal planes 2721 may be, for example, horizontal longitudinal planes 2614 in FIG. 26. Horizontal-longitudinal planes 2721 are substantially horizontal, substantially longitudinal, and substantially parallel to each other. Second plurality of planar structures 2715 includes bottom horizontal planar structure 2717 and number of horizontal planar structures 2719. Bottom horizontal planar structure 2717 and number of horizontal planar structures 2719 are substantially parallel to each other. Further, bottom horizontal planar structure 2717 forms bottom 2728 of space frame 2708. Bottom horizontal planar structure 2717 connects first outer planar structure 2710, second outer planar structure 2712, and number of planar structures 2714.

First outer planar structure 2710, second outer planar structure 2712, and number of planar structures 2714 in space frame 2708 are configured to receive number of containers 2718. Number of containers 2718, in these examples, takes the form of intermodal containers manufactured to International Organization for Standardization (ISO) specifications.

Plurality of bays 2720 may be formed by first plurality of planar structures 2713 and second plurality of planar structures 2715. Plurality of bays 2720 is formed between first outer planar structure 2710, second outer planar structure 2712, and number of planar structure 2714. Plurality of bays 2720 is configured to receive number of containers 2718 in space frame 2708.

Number of containers 2718 in plurality of bays 2720 cause loading in space frame 2708. This loading causes bending loads on wing 2704. These bending loads on wing 2704 may be increased at center portion 2725 of wing 2704 as compared to other portions of wing 2704.

In these illustrative examples, support structure 2726 connects wing 2704 of aircraft 2700 to bottom 2728 of space frame 2708. Support structure 2726 is comprised of at least one of first outer member 2730, second outer member 2732, and number of members 2734.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C, or item B and item C. In other examples, "at least one of" may be, for example, without limitation, two of item A, one of item B, and 10 of item C; four of item B and seven of item C; and other suitable combinations.

First outer member 2730, second outer member 2732, and number of members 2734 are substantially straight members in these illustrative examples. First outer member 2730, second outer member 2732, and number of members 2734 may take the form of, for example, without limitation, struts, rods, segments, beams, elements, cables, plates, and/or other suitable types of members. First outer member 2730 and second outer member 2732 connect wing 2704 to fuselage structure 2702.

In these illustrative examples, first outer member 2730 extends from attachment point 2737 on first side 2738 of wing 2704 to first bottom end 2740 of first outer planar structure 2710. Second outer member 2732 extends from attachment point 2739 on second side 2742 of wing 2704 to second bottom end 2744 of second outer planar structure 2712.

First outer member 2730 and second outer member 2732 provide support for the loading in space frame 2708 and wing 2704 from number of containers 2718 in plurality of bays 2720. In particular, first outer member 2730 and second outer member 2732 reduce the bending loads on wing 2704 at the portions of wing 2704 between attachment point 2737 and attachment point 2739.

Number of members 2734 is associated with first bottom end 2740 of first outer planar structure 2710, second bottom end 2744 of second outer planar structure 2712, number of bottom ends 2746 of number of planar structures 2714, first outer member 2730, and/or second outer member 2732.

A first component may be considered to be associated with a second component by being secured to the second component, bonded to the second component, fastened to the second component, and/or connected to the second component in some other suitable manner. The first component also may be connected to the second component through the use of a third component. The first component may be considered to be associated with the second component by being part of and/or an extension of the second component.

For example, number of members 2734 is connected to first outer member 2730 and second outer member 2732. Number of members 2734 is also connected to first bottom end 2740 of first outer planar structure 2710 and second bottom end 2744 of second outer planar structure 2712. Number of members 2734 is connected to number of planar structures 2714 using number of components 2733. Number of components 2733 also connects number of members 2734 to bottom horizontal planar structure 2717.

Number of components 2733 is associated with planar structures 2709. For example, number of components 2733 may be connected to planar structures 2709 or may be part of planar structures 2709. Number of components 2733 may include, for example, without limitation, longitudinal elements, vertical elements, members, planar members, trusses, linkages, beams, rods, and/or other suitable types of structures.

In these illustrative examples, number of members 2734 may include horizontal member 2736. Horizontal member 2736 is substantially horizontal in these examples. As one illustrative example, horizontal member 2736 may be present whenever number of planar structures 2714 is an even number of planar structures. For example, horizontal member 2736 may be present when number of planar structures 2714 is two planar structures or four planar structures.

Horizontal member 2736 may be associated with other members in number of members 2734. For example, without limitation, first end 2748 of horizontal member 2736 may be connected to first member 2750 in number of members 2734. Second end 2752 of horizontal member 2736 may be connected to second member 2754 in number of members 2734.

Support structure 2726 is configured to carry vertical loads 2756 extending through plurality of load paths 2758. Vertical loads 2756 may be comprised of at least a portion of the loads caused by number of containers 2718 held in space frame 2708 and at least a portion of the weight of fuselage structure 2702. At least a portion of the loads may be some or substantially all of the loads. Plurality of load paths 2758 includes outer load paths 2766 and number of load paths 2768. Number of load paths 2768 is located between outer load paths 2766.

Outer load paths 2766 extend through first outer planar structure 2710 and through second outer planar structure 2712. Number of load paths 2768 extends through number of planar structures 2714.

In these examples, at least a portion of plurality of load paths 2758 extends from wing 2704 through number of connection structures 2723 and through at least one of first plurality of planar structures 2713 to support structure 2726. In this manner, loads extending through wing 2704 may be reduced by support structure 2726 carrying vertical loads 2756 in plurality of load paths 2758.

In these illustrative examples, number of members 2734 is configured to support portion 2770 of vertical loads 2756 extending through number of load paths 2768. Portion 2770 of vertical loads 2756 is comprised of the vertical components of the axial loads through first outer member 2730 and second outer member 2732. In these examples, an axial load is a compression load or tension load acting along the axis through a member.

Number of members 2734 is positioned at number of angles 2735. Number of angles 2735 is selected to provide support for first outer planar structure 2710, second outer planar structure 2712, and number of planar structures 2714. Number of angles 2735 is selected to be different than the angles at which first outer member 2730 and second outer member 2732 are positioned.

Each of number of members 2734 is positioned at one of number of angles 2735 to allow number of members 2734 to support portion 2770 of vertical loads 2756. With this configuration for number of members 2734, the bending loads on wing 2704 at center portion 2725 of wing 2704 may be reduced.

As one specific example, first member 2750 is positioned at an angle that is different from the angle at which first outer member 2730 is positioned. Further, second member 2754 is positioned at an angle that is different from the angle at which second outer member 2732 is positioned. In this example, the angles at which first member 2750 and second member 2754 are positioned are substantially the same.

These differences in angles between first member 2750 and first outer member 2730 and between second member 2754 and second outer member 2732 allow first member 2750 and second member 2754 to support portion 2770 of vertical loads 2756. In other words, first member 2750 and second member 2754 support the vertical components of the axial loads in first outer member 2730 and second outer member 2732, respectively. As a result, the bending loads in center portion 2725 of wing 2704 are reduced.

The illustration of aircraft 2700 in FIG. 27 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, structure 2703, may take the form of a semi-monocoque structure. In other advantageous embodiments, aircraft 2700 may have two wings attached to fuselage structure 2702. In yet other advantageous embodiments, support structure 2726 may have additional members in addition to first outer member 2730 and second outer member 2732 attaching wing 2704 to fuselage structure 2702.

In some illustrative examples, number of members 2734 may take the form of curved member 2790. Curved member 2790 has a curved shape configured to carry portion 2770 of vertical loads 2756. In other words, the degree of curving for curved member 2790 may be selected to carry portion 2770 of vertical loads 2756 to reduce the bending loads at center portion 2725 of wing 2704.

A first end of curved member 2790 is connected to first outer member 2730 and a second end of curved member 2790 is connected to second outer member 2732. The curved shape of curved member 2790 allows the angles at the first end and second end of curved member 2790 to gradually change along the length of curved member 2790 towards the center of curved member 2790.

In yet other illustrative examples, number of members 2734 may have some other shape, form, or configuration than the ones described above.

Figure 28:
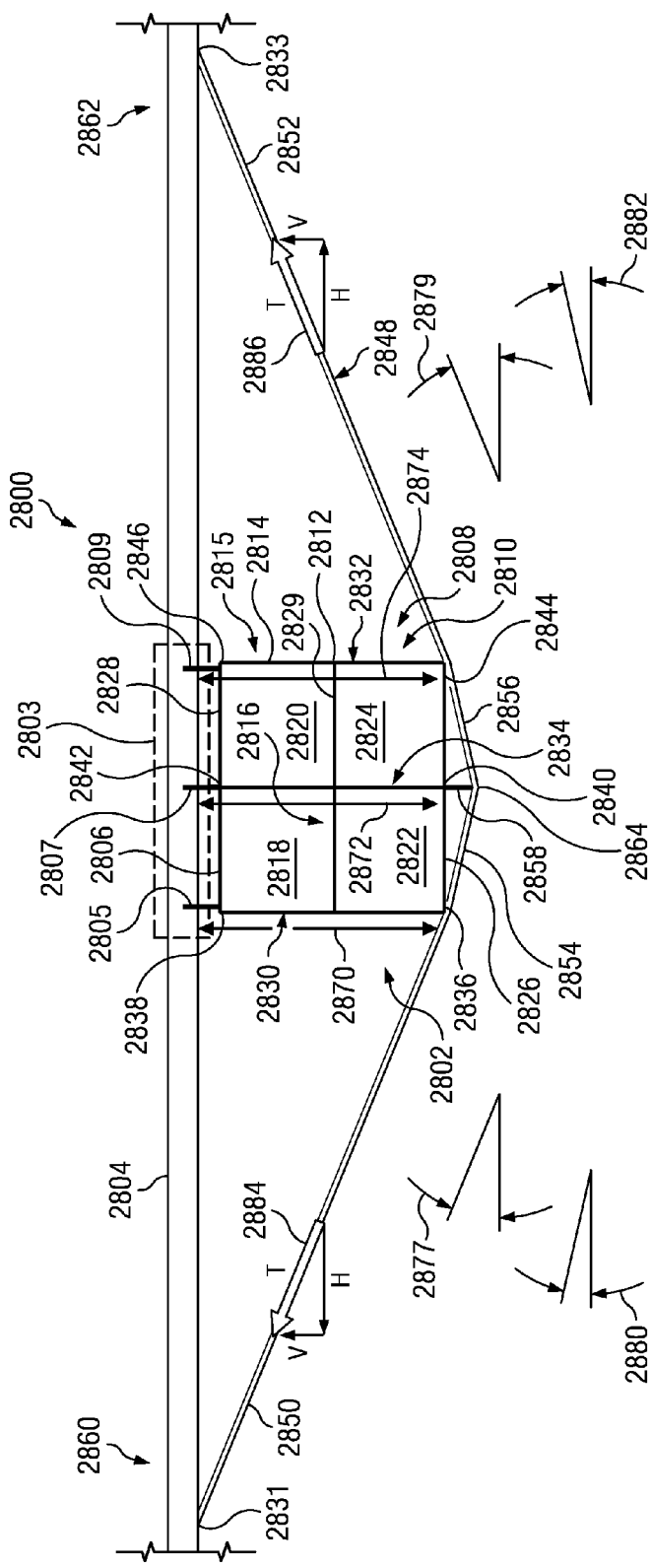
FIG. 28 is an illustration of a cross-sectional view of an aircraft in accordance with an advantageous embodiment.

With reference now to FIG. 28, an illustration of a cross-sectional view of an aircraft is depicted in accordance with an advantageous embodiment. In this illustrative example, aircraft 2800 is an example of one implementation for aircraft 101 in FIG. 1, aircraft 200 in FIG. 2, aircraft 2600 in FIG. 26, and aircraft 2700 in FIG. 27. As depicted, aircraft 2800 includes fuselage structure 2802 and wing 2804.

Wing 2804 is attached to top 2806 of fuselage structure 2802. More specifically, center portion 2803 of wing 2804 is attached to top 2806 of fuselage structure 2802. Center portion 2803 may be, for example, a wing box. Center portion 2803 of wing 2804 is attached to top 2806 of fuselage structure 2802 by connection structures 2805, 2807, and 2809.

In this illustrative example, fuselage structure 2802 includes structure 2808. Structure 2808 takes the form of space frame 2810 in these examples. Space frame 2810 is comprised of plurality of nodes 2812 and plurality of elements 2814 connecting plurality of nodes 2812. At least a portion of plurality of nodes 2812 and at least a portion of plurality of elements 2814 form first plurality of planar structures 2815 and second plurality of planar structures 2816.

First plurality of planar structures 2815 and second plurality of planar structures 2816 may take the form of trusses in these examples.

In this illustrative example, first plurality of planar structures 2815 and second plurality of planar structures 2816 are substantially perpendicular to each other. For example, first plurality of planar structures 2815 lie in vertical-longitudinal planes 2612 in FIG. 26. Second plurality of planar structures 2816 lie in horizontal-longitudinal planes 2614 in FIG. 26. First plurality of planar structures 2815 and second plurality of planar structures 2816 form bay 2818, bay 2820, bay 2822, and bay 2824.

First plurality of planar structures 2815 includes first outer planar structure 2830, second outer planar structure 2832, and planar structure 2834. First outer planar structure 2830 has bottom end 2836 and top end 2838. Second outer planar structure 2832 has bottom end 2840 and top end 2842. Planar structure 2834 has bottom end 2844 and top end 2846. Second plurality of planar structures 2816 includes bottom horizontal planar structure 2826, horizontal planar structure 2828, and horizontal planar structure 2829.

Connection structure 2805 connects first outer planar structure 2830 to center portion 2803 of wing 2804. Connection structure 2807 connects planar structure 2834 to center portion 2803 of wing 2804. Connection structure 2809 connects second outer planar structure 2832 to center portion 2803 of wing 2804.

In this depicted example, support structure 2848 connects wing 2804 to fuselage structure 2802. Support structure 2848 includes first outer member 2850, second outer member 2852, member 2854, member 2856, and component 2858. First outer member 2850 extends from bottom end 2836 of first outer planar structure 2830 to attachment point 2831 on first side 2860 of wing 2804. Second outer member 2852 extends from bottom end 2840 of second outer planar structure 2832 to attachment point 2833 on second side 2862 of wing 2804.

Member 2854 is connected to bottom end 2836 of first outer planar structure 2830 and first outer member 2850. Member 2856 is connected to bottom end 2840 of second outer planar structure 2832 and second outer member 2852. Further, member 2854 and member 2856 are connected to each other at node 2864. Component 2858 connects node 2864 to bottom end 2844 of planar structure 2834.

The configuration of support structure 2848 allows support structure 2848 to carry vertical loads in load paths 2870, 2872, and 2874 formed in space frame 2810.

First outer member 2850 and second outer member 2852 are positioned at angle 2877 and angle 2879, respectively. Angle 2877 and angle 2879 are substantially the same in this illustrative example. Member 2854 and member 2856 are positioned at angle 2880 and angle 2882, respectively. Angle 2880 and angle 2882 are substantially the same in this illustrative example. Further, angle 2880 is different from angle 2877, and angle 2882 is different from angle 2879. Angle 2880 and angle 2882 are selected to allow support structure 2848 to reduce bending loads at center portion 2803 of wing 2804.

The differences in the angles at which first outer member 2850 and member 2854 are positioned and at which second outer member 2852 and member 2856 are positioned are selected to allow member 2854 and member 2856 to support the vertical components of the axial loads through first outer member 2850 and second outer member 2852. These axial loads are tension load 2884 and tension load 2886. Tension load 2884 is carried in first outer member 2850, and tension load 2886 is carried in second outer member 2852.

In these illustrative examples, load path 2870 extends from center portion 2803 of wing 2804 through connection structure 2805, through first outer planar structure 2830, and to support structure 2848. Load path 2872 extends from center portion 2803 of wing 2804 through connection structure 2807, through planar structure 2834, through component 2858, and to support structure 2848. Load path 2874 extends from center portion 2803 of wing 2804 through connection structure 2809, through second outer planar structure 2832, and to support structure 2848.

As one illustrative example, angle 2882 may be calculated using the following equations:

$$w_N = 1000$$
$$2w_1 = 2000$$
$$\theta_N = 15°$$
$$w_1 = \frac{(2w_1)}{2} = \frac{2000}{2} = 1000$$
$$H = \frac{w_1 + w_N}{\tan\theta_N} = \frac{1000 + 1000}{\tan 15°} = \frac{2000}{0.2679} = 7464.1$$
$$\theta_1 = \tan^{-1}\left(\frac{w_1}{H}\right) = \tan^{-1}\left(\frac{1000}{7464.1}\right) = 7.63°.$$

where $w_N$ is the vertical load at bottom end 2844, $2w_1$ is the vertical load at node 2864, $\theta_N$ is angle 2879, $\theta_1$ is angle 2882, and H is a horizontal component of tension load 2886 carried in second outer member 2852. The vertical load at bottom end 2844 and the vertical load at node 2864 may be due to the presence of containers in fuselage structure 2802.

In this illustrative example, first outer planar structure 2830, planar structure 2834, and second outer planar structure 2832 are spaced substantially equally apart. Further, the weight of containers that may be in each of bays 2818, 2820, 2822, and 2824 is substantially the same. In this situation, the ratio between the vertical load at node 2864 and the vertical load at bottom end 2844 is about two to one. Bottom end 2844 experiences vertical loading from bay 2820 and bay 2824. Node 2864 experiences vertical loading from bays 2818, 2820, 2822, and 2824. Thus, node 2864 experiences about two times the vertical load as compared to bottom end 2844.

In other illustrative examples, first outer planar structure 2830, planar structure 2834, and second outer planar structure 2832 may not be spaced substantially equally apart. In yet other illustrative examples, the weight of containers in each of bays 2818, 2820, 2822, and 2824 may not be substantially the same. In these types of situations, the ratio between the vertical load at node 2864 and the vertical load at bottom end 2844 may be different than two to one.

Figure 29:
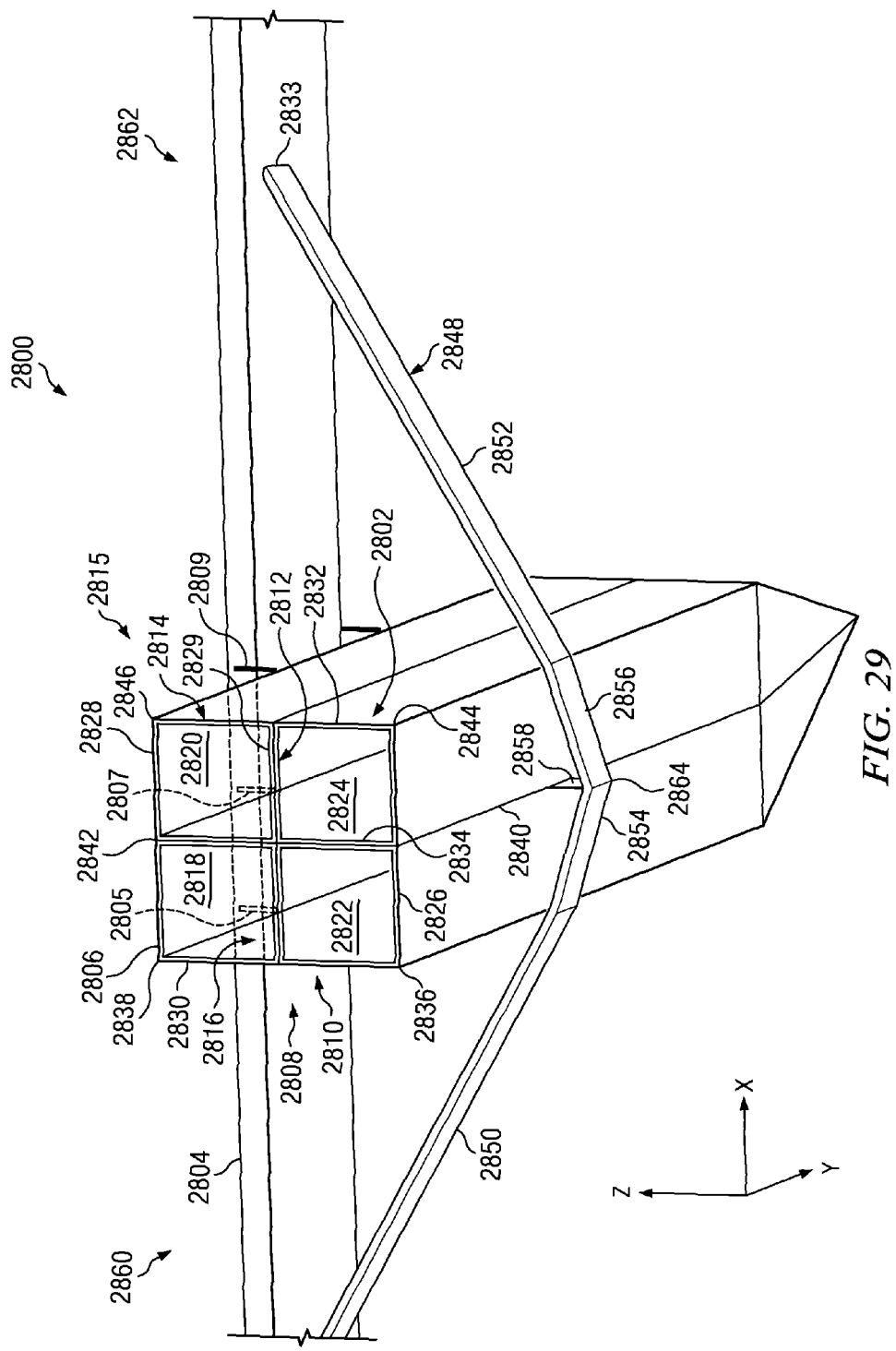
FIG. 29 is an illustration of a bottom perspective view of an aircraft in accordance with an advantageous embodiment.

With reference now to FIG. 29, an illustration of a bottom perspective view of an aircraft is depicted in accordance with an advantageous embodiment. In this illustrative example, aircraft 2800 is depicted with the configuration for space frame 2808 and support structure 2848 shown in FIG. 28. As depicted, support structure 2848 forms a "sling"-type structure to reduce bending loads in center portion 2803 of wing 2804 in FIG. 28.

Figure 30:
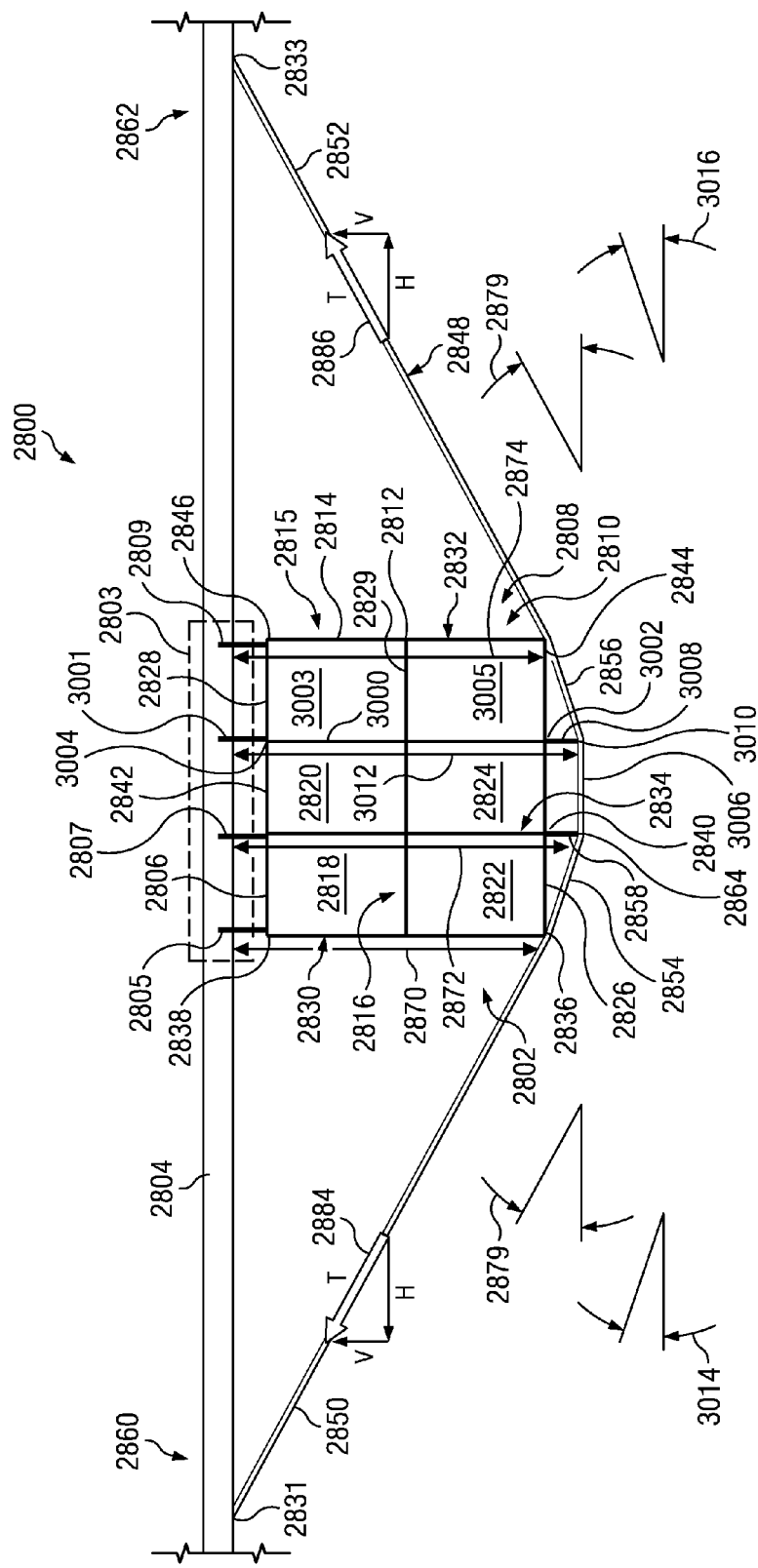
FIG. 30 is an illustration of a cross-sectional view of an aircraft in accordance with an advantageous embodiment.

With reference now to FIG. 30, an illustration of a cross-sectional view of an aircraft is depicted in accordance with an advantageous embodiment. In this illustrative example, aircraft 2800 is shown with a different configuration for space frame 2808 and support structure 2848 in FIG. 30 as compared to FIG. 28.

As depicted in this example, space frame 2810 includes planar structure 3000. Planar structure 3000 has bottom end 3002 and top end 3004. The addition of planar structure 3000 in between planar structure 2834 and second outer planar structure 2832 in space frame 2810 forms bay 3003 and bay 3005 in addition to bays 2818, 2820, 2822, and 2824. Further, connection structure 3001 is added to connect planar structure 2800 to wing 2804.

Further, in this illustrative example, support structure 2848 also includes horizontal member 3006 and component 3008. Horizontal member 3006 is positioned between member 2854 and member 2856. Component 2858 connects horizontal member 3006 and member 2854 to bottom end 2840 of planar structure 2834. Component 3008 connects horizontal member 3006 and member 2856 to bottom end 3002 of planar structure 3000.

Horizontal member 3006 connects to member 2854 and component 2858 at node 2864. Horizontal member 3006 connects to member 2856 and component 3008 at node 3010. Horizontal member 3006 provides additional support for vertical loads in load path 2874 and load path 3012. Load path 3012 extends from wing 2804, through connection structure 3001, through planar structure 3000, through component 3008, and to support structure 2848.

In this illustrative example, member 2854 and member 2856 are positioned at angle 3014 and angle 3016, respectively. Angle 3014 and angle 3016 are different from angle 2880 and angle 2882, respectively. Angle 3014 and angle 3016 are selected to take into account the additional vertical loads in fuselage structure 2802 with the additions of bay 3003 and bay 3005.

As one illustrative example, angle 3016 may be calculated using the following equations:

$$w_1 = 2000$$
$$w_N = 1000$$
$$\theta_N = 50°$$
$$H = \frac{w_1 + w_N}{\tan\theta_N} = \frac{2000 + 1000}{\tan 15°} = \frac{3000}{0.2679} = 11{,}196$$
$$\theta_1 = \tan^{-1}\left(\frac{w_1}{4}\right) = \tan^{-1}\left(\frac{2000}{11{,}196}\right) = 10.13°.$$

Figure 31:
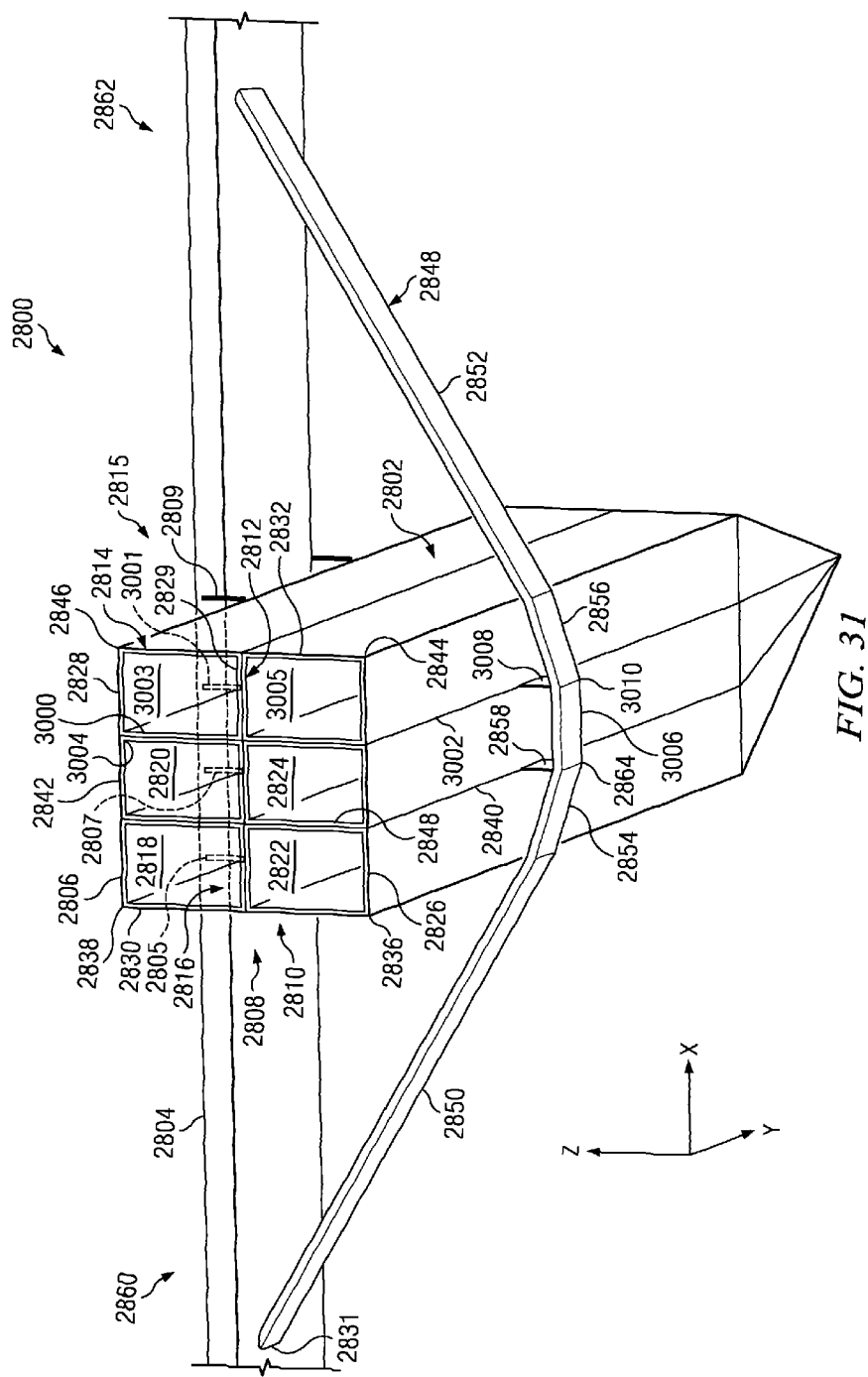
FIG. 31 is an illustration of a bottom perspective view of an aircraft in accordance with an advantageous embodiment.

With reference now to FIG. 31, an illustration of a bottom perspective view of an aircraft is depicted in accordance with an advantageous embodiment. In this illustrative example, aircraft 2800 is depicted with the configuration for space frame 2808 and support structure 2848 shown in FIG. 30.

Figure 32:
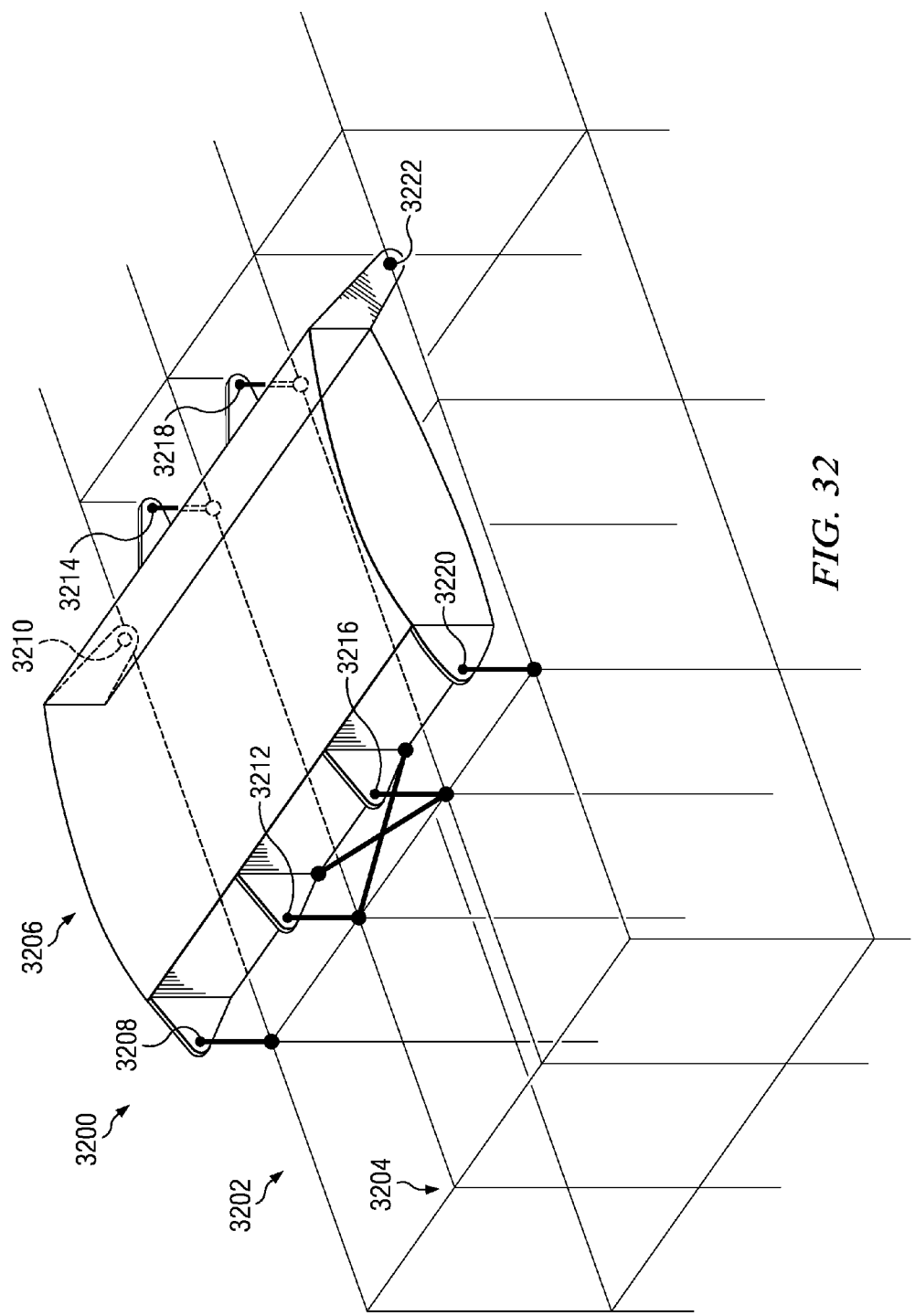
FIG. 32 is an illustration of a portion of a fuselage structure in accordance with an advantageous embodiment.

With reference now to FIG. 32, an illustration of a portion of a fuselage structure is depicted in accordance with an advantageous embodiment. In this illustrative example, fuselage structure 3200 is an example of one implementation for fuselage structure 2702 in FIG. 27 and fuselage structure 2802 in FIG. 30. Fuselage structure 3200 includes space frame 3202. As depicted, space frame 3202 is comprised of plurality of trusses 3204.

In this illustrative example, fuselage structure 3200 is associated with connection system 3206. Connection system 3206 is used to connect a wing, such as wing 2704 in FIG. 27 and wing 2804 in FIG. 30, to fuselage structure 3200.

Connection system 3206 includes connection structures 3208, 3210, 3212, 3214, 3216, 3218, 3220, and 3222 in these illustrative examples. However, in other examples, different numbers of connection structures may be included in connection system 3206. For example, the number of connection structures may be reduced or increased, depending on the implementation.

Figure 33:
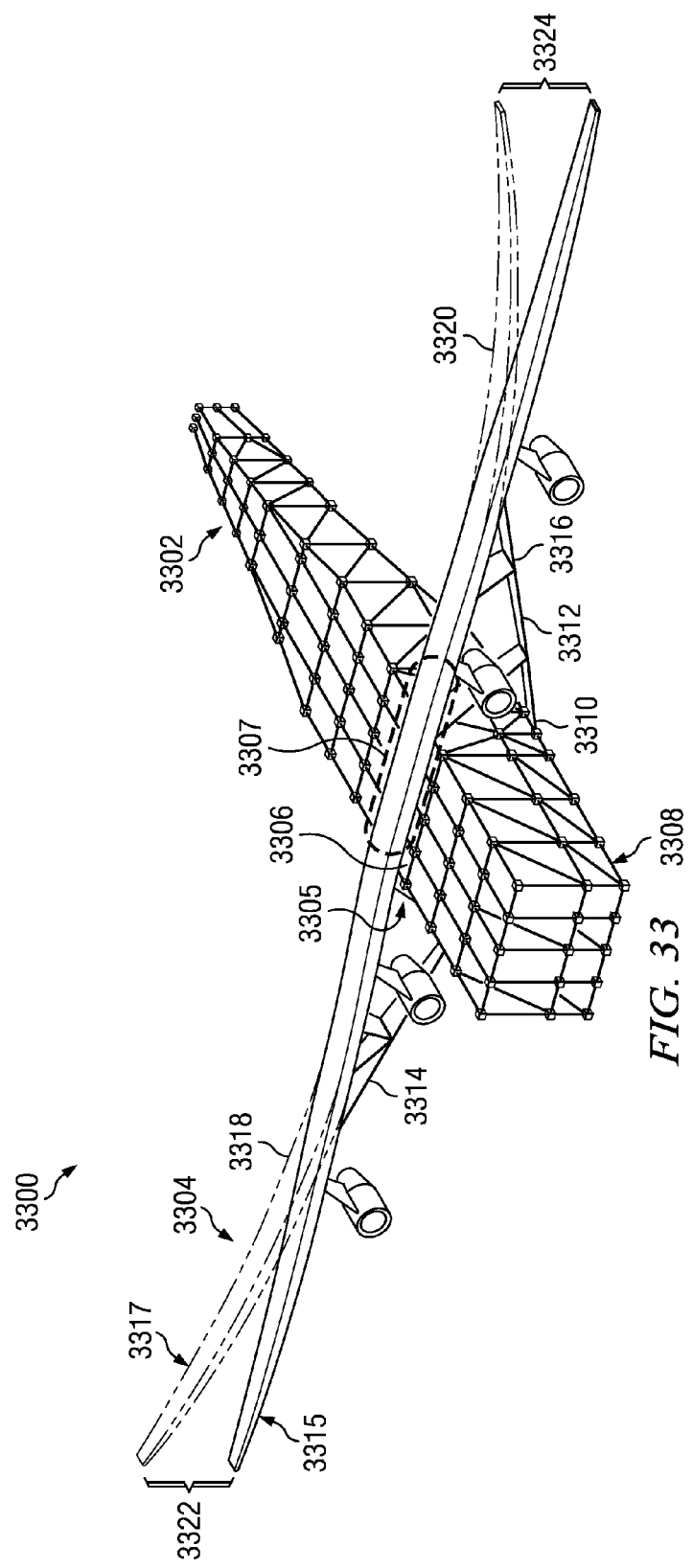
FIG. 33 is an illustration of an aircraft in accordance with an advantageous embodiment.

With reference now to FIG. 33, an illustration of an aircraft is depicted in accordance with an advantageous embodiment. In this illustrative example, aircraft 3300 is an example of one implementation for aircraft 101 in FIG. 1. Aircraft 3300 has fuselage structure 3302 and wing 3304.

In this illustrative example, wing 3304 is attached to top 3306 of fuselage structure 3302. Further, wing 3304 is attached to fuselage structure 3302 using connection system 3305. Connection system 3305 connects fuselage structure 3302 to center portion 3307 of wing 3304. Connection system 3305, in this example, is implemented using connection system 3206 and connection structures 3208, 3210, 3212, 3214, 3216, 3218, 3220, and 3222 in FIG. 32.

As depicted, fuselage structure 3302 includes space frame 3308. Space frame 3308 is configured to receive a number of containers, such as intermodal containers 118 in FIG. 1 and number of containers 2718 in FIG. 27. Wing 3304 is connected to bottom 3310 of space frame 3308 using support structure 3312.

Support structure 3312 is an example of one implementation for support structure 2726 in FIG. 27 without number of members 2734 in FIG. 27. In other words, support structure 3312 has outer member 3314 and outer member 3316 connected to bottom 3310 of space frame 3308 without being connected to each other by other components outside of space frame 3308.

In this illustrative example, wing 3304 has position 3315 when unstressed and position 3317 when stressed. Wing 3304 may be stressed by loading. Loading is caused by containers being held in space frame 3308. This loading causes bending loads in wing 3304. For example, wing 3304 deflects from position 3315 to position 3317 when stressed from loading by containers. More specifically, this loading causes first side 3318 of wing 3304 and second side 3320 of wing 3304 to deflect upwards by distance 3322 and distance 3324, respectively. Distance 3322 and distance 3324 are substantially the same in this depicted example.

Figure 34:
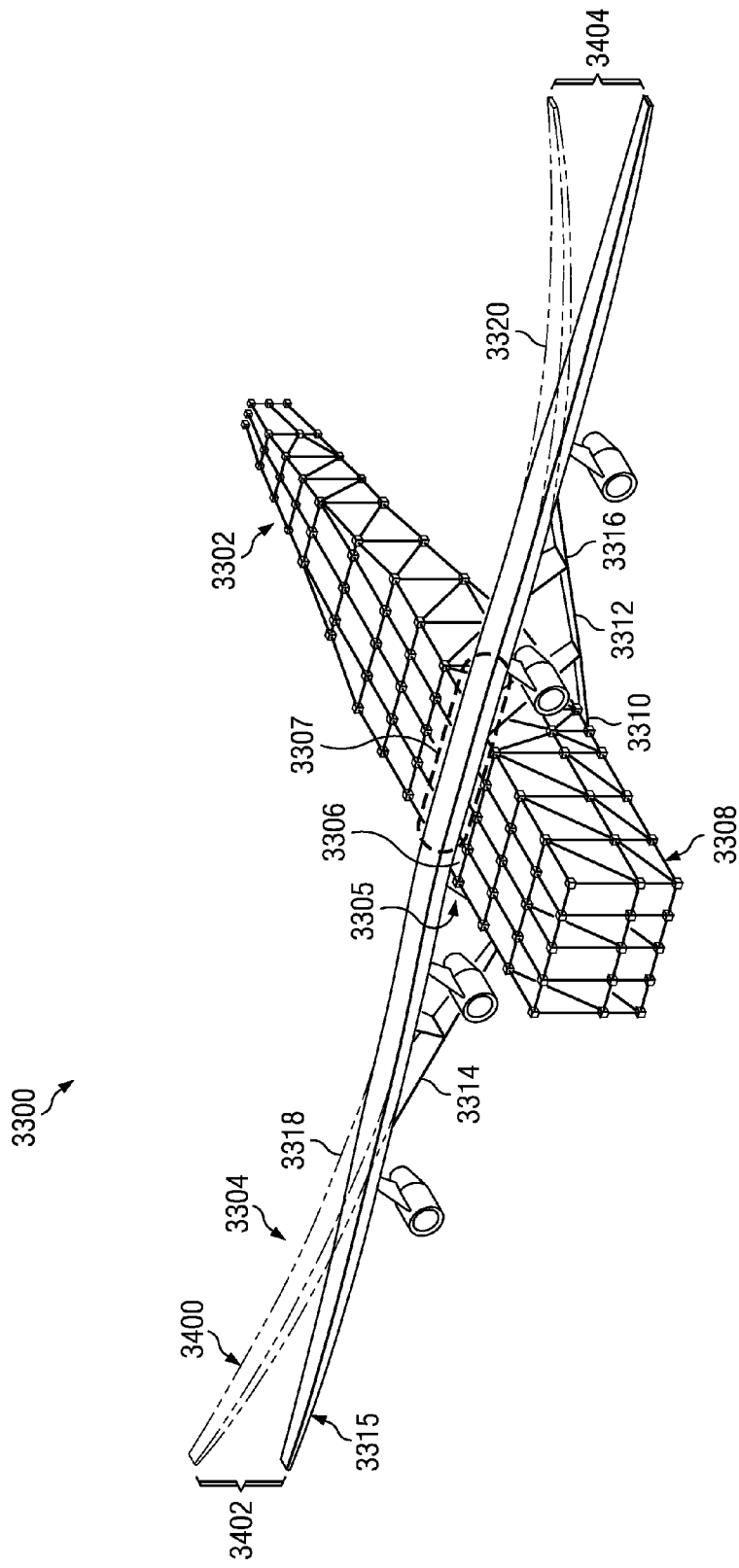
FIG. 34 is an illustration of an aircraft in accordance with an advantageous embodiment.

With reference now to FIG. 34, an illustration of an aircraft is depicted in accordance with an advantageous embodiment. In this illustrative example, support structure 3312 for aircraft 3300 in FIG. 34 has a different configuration than support structure 3312 in FIG. 33.

In this illustrative example, support structure 3312 includes a number of members that connect to each other and to outer member 3314 and outer member 3316. These members reduce the deflection of wing 3304 caused by loading by containers held in space frame 3308.

For example, as depicted, loading by containers held in space frame 3308 causes wing 3304 to deflect from position 3315 to position 3400. More specifically, first side 3318 of wing 3304 and second side 3320 of wing 3304 deflect upwards by distance 3402 and distance 3404, respectively. Distance 3402 and distance 3404 are substantially the same in this illustrative example. Further, distance 3402 and distance 3404 are smaller than distance 3322 and distance 3324 in FIG. 33.

Figure 35:
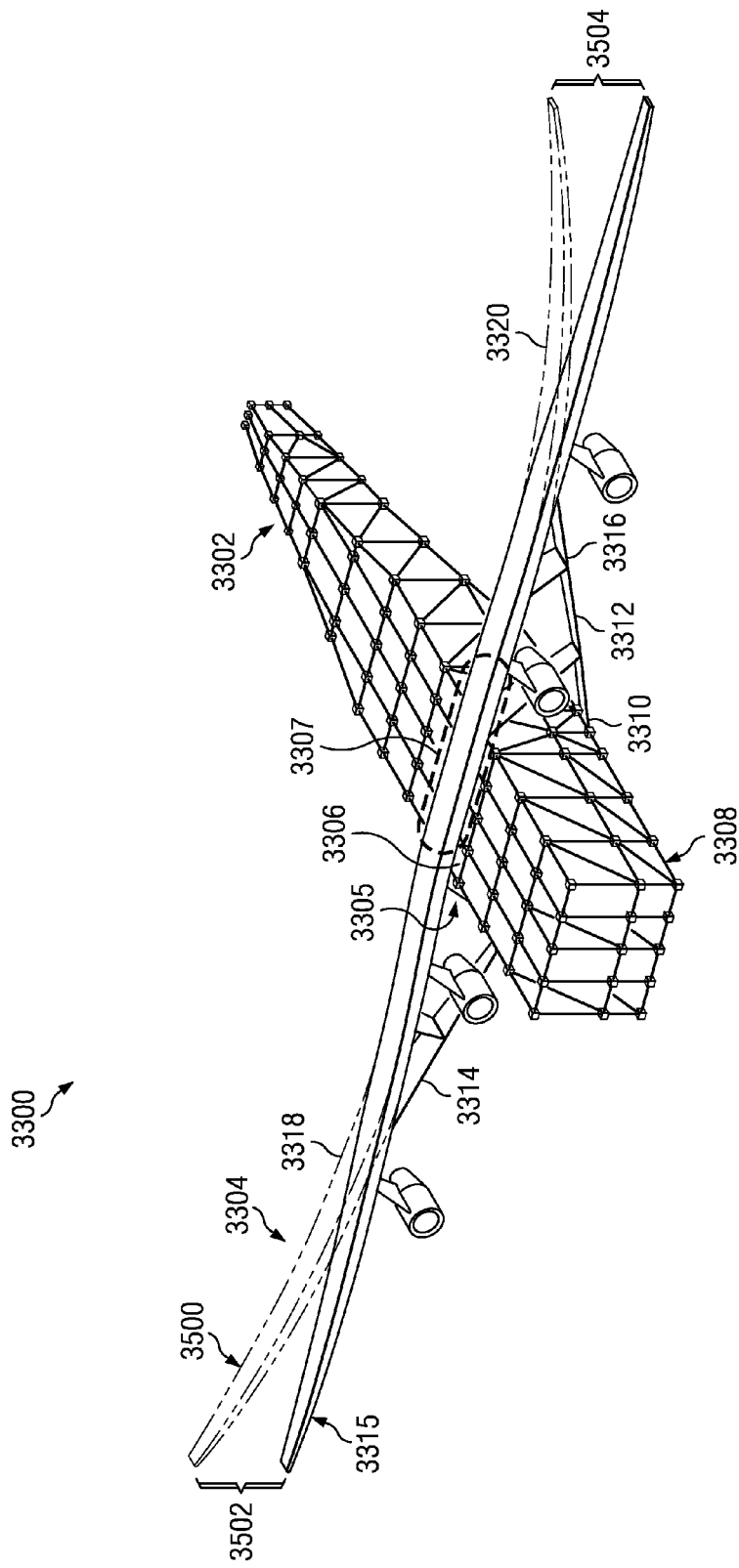
FIG. 35 is an illustration of an aircraft in accordance with an advantageous embodiment.

With reference now to FIG. 35, an illustration of an aircraft is depicted in accordance with an advantageous embodiment. In this illustrative example, support structure 3312 in FIG. 35 has the same configuration as support structure 3312 in FIG. 34. However, wing 3304 is connected to fuselage structure 3302 with a different configuration for connection system 3305.

In this illustrative example, connection system 3305 has a fewer number of connection structures connecting wing 3304 to fuselage structure 3302 as compared to connection system 3305 in FIG. 33 and FIG. 34. When implemented with connection system 3206 in FIG. 32, connection system 3305 has connection structures 3212, 3214, 3216, and 3218 removed.

As depicted, loading by containers held in space frame 3308 causes wing 3304 to deflect from position 3315 to position 3500. More specifically, first side 3318 of wing 3304 and second side 3320 of wing 3304 deflect upwards by distance 3502 and distance 3504, respectively. Distance 3502 and distance 3504 are substantially the same in this depicted example. Further, distance 3502 and distance 3504 are smaller than distance 3322 and distance 3324 in FIG. 33.

Figure 36:
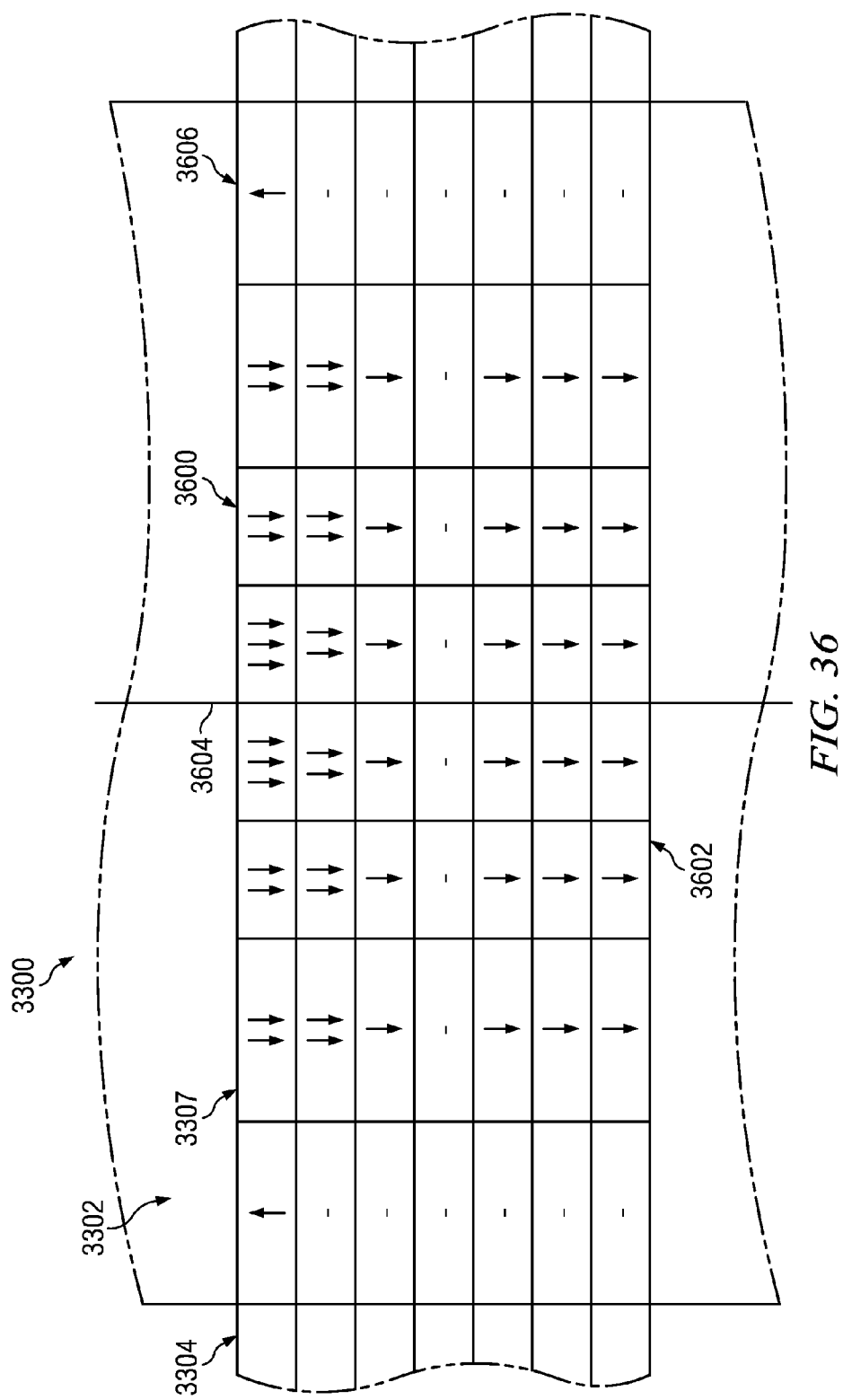
FIG. 36 is an illustration of stresses in a portion of a cross section of a wing in accordance with an advantageous embodiment.
Figure 37:
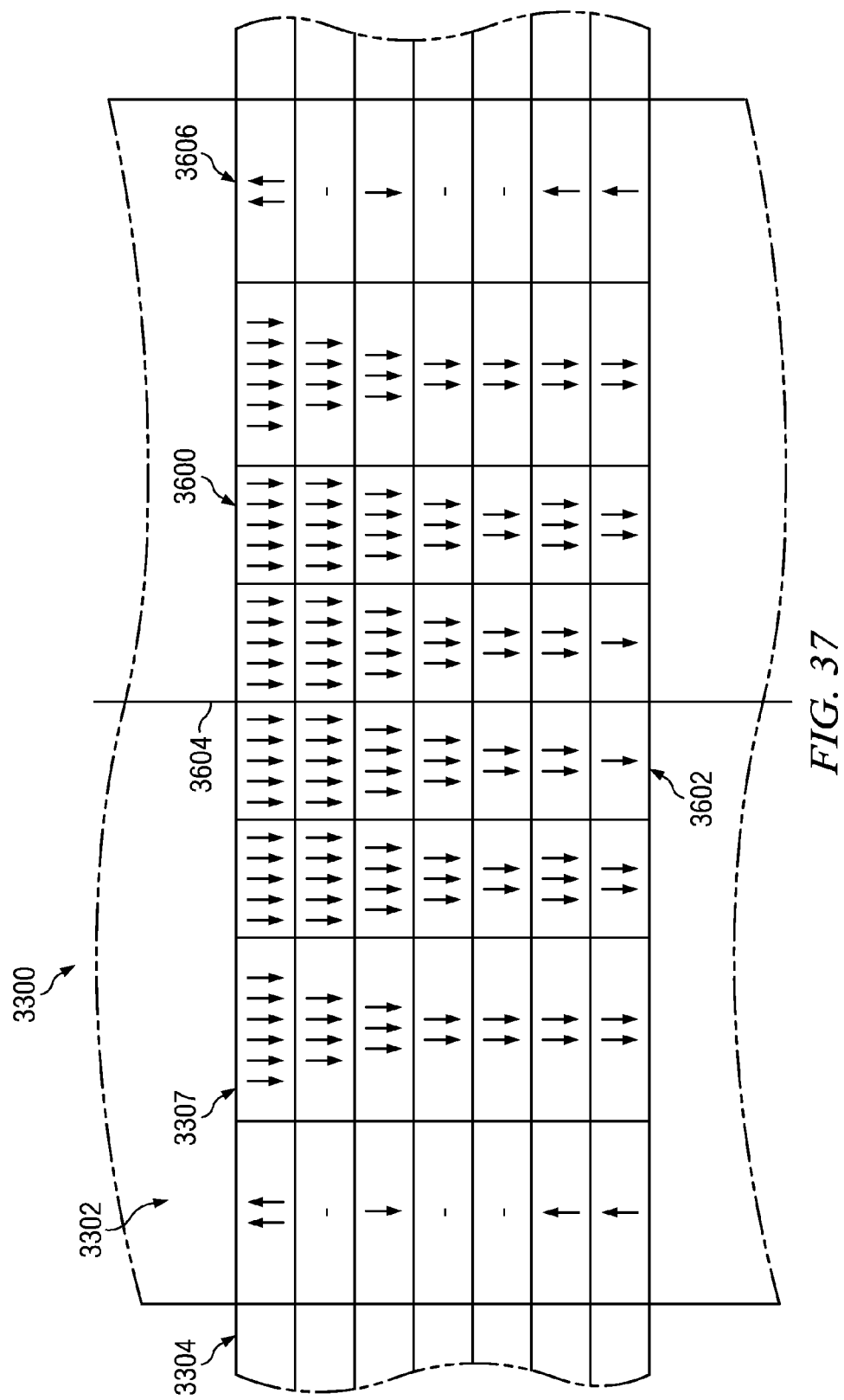
FIG. 37 is an illustration of a cross-sectional view of stresses for a portion of a wing in accordance with an advantageous embodiment.
Figure 38:
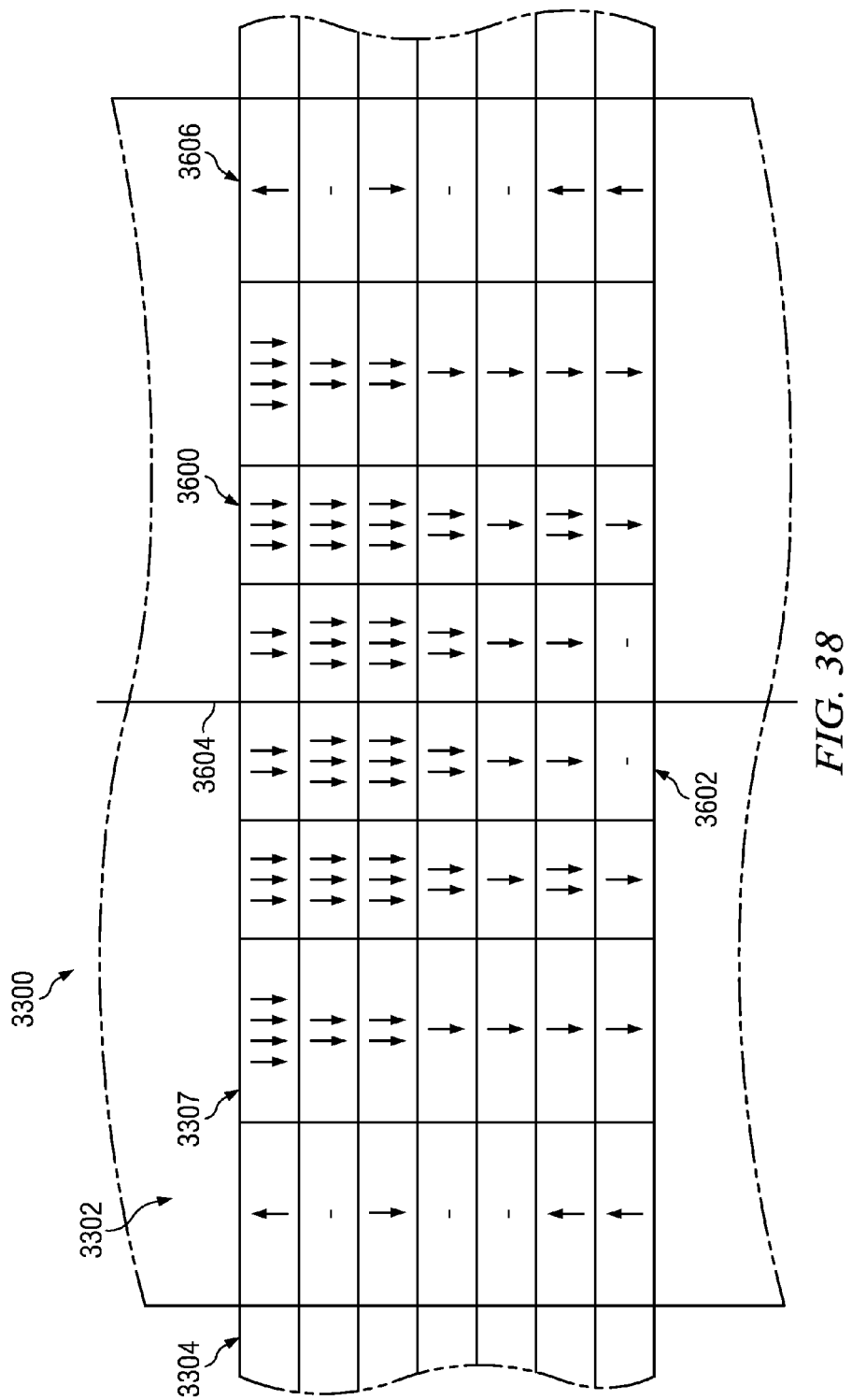
FIG. 38 is an illustration of a cross-sectional view of stresses for a portion of a wing in accordance with an advantageous embodiment.

With reference now to FIGS. 36-38, illustrations of changes in stresses on a center portion of a wing of an aircraft are depicted in accordance with an advantageous embodiment. In these illustrative examples, these changes in stress are for an upper surface of center portion 3307 of wing 3304 in FIGS. 34 and 35. Further, these changes in stress are related to changes in bending loads on the wing. The changes in stress are caused by changes in the configuration of at least one of connection system 3206 and support structure 3312 for the aircraft.

With reference now to FIG. 36, an illustration of a top view of center portion 3307 of wing 3304 is depicted in accordance with an advantageous embodiment. In this illustrative example, side 3600 of center portion 3307 is towards the forward portion of aircraft 3300, and side 3602 of center portion 3307 is towards the aft portion of aircraft 3300.

In this example, line 3604 is through a center plane of wing 3304 and of fuselage structure 3302 of aircraft 3300 in FIGS. 33, 34, and 35. This center plane may be, for example, center plane 2772 in FIG. 27.

Boxes 3606 represent different portions of center portion 3307 of aircraft 3300. Each box in boxes 3606 has an indication of a change in stress for a portion of center portion 3307 of wing 3304. In this illustrative example, the changes in stress indicated in boxes 3606 are caused by a change in the configuration of aircraft 3300 from the configuration for aircraft 3300 presented in FIG. 33 to the configuration for aircraft 3300 presented in FIG. 34. In particular, the configuration of support structure 3312 is changed.

In this illustrative example, an arrow pointing upwards indicates an increase in stress. An arrow pointing downwards indicates a decrease in stress. The number of arrows in a box indicates the degree of increase or decrease in stress. In other words, the more arrows that are present in a box, the greater the change in stress for that portion of center portion 3307 of wing 3304.

With reference now to FIG. 37, an illustration of a top view of center portion 3307 of wing 3304 is depicted in accordance with an advantageous embodiment. In this illustrative example, the changes in stress indicated in boxes 3606 in FIG. 37 are caused by a change in the configuration of aircraft 3300 from the configuration for aircraft 3300 presented in FIG. 33 to the configuration for aircraft 3300 presented in FIG. 35. In particular, the configuration of connection system 3305 is changed.

With reference now to FIG. 38, an illustration of a top view of center portion 3307 of wing 3304 is depicted in accordance with an advantageous embodiment. In this illustrative example, the changes in stress indicated in boxes 3606 in FIG. 38 are caused by a change in the configuration of aircraft 3300 from the configuration for aircraft 3300 presented in FIG. 34 to the configuration for aircraft 3300 presented in FIG. 35.

Figure 39:
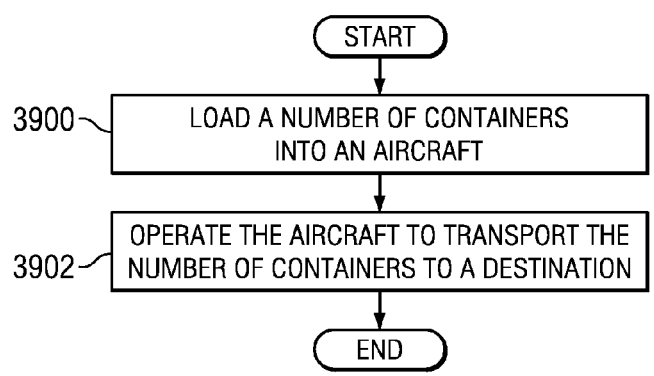
FIG. 39 is an illustration of a flowchart of a process for transporting containers in an aircraft in accordance with an advantageous embodiment.

With reference now to FIG. 39, an illustration of a flowchart of a process for transporting containers in an aircraft is depicted in accordance with an advantageous embodiment. The process illustrated in FIG. 39 may be implemented using an aircraft, such as aircraft 2700 in FIG. 27.

The process begins by loading a number of containers into an aircraft (operation 3900). The aircraft is comprised of a first outer planar structure, a second outer planar structure, a number of planar structures located between the first outer planar structure and the second outer planar structure, a wing, and a support structure. The first outer planar structure, the second outer planar structure, and the number of planar structures are substantially parallel to each other, are coupled to each other to form a fuselage structure for the aircraft, and are configured to receive a number of containers.

The support structure connects the wing to a first bottom end of the first outer planar structure, a second bottom end of the second outer planar structure, and a number of bottom ends of the number of planar structures. The support structure is configured to carry vertical loads extending through load paths in the space frame.

Thereafter, the process operates the aircraft to transport the number of containers to a destination (operation 3902), with the process terminating thereafter.

The flowcharts and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An aircraft comprising:
    a first outer planar structure;
    a second outer planar structure;
    wherein the first outer planar structure and the second outer planar structure each comprise a truss;
    a number of planar structures located between the first outer planar structure and the second outer planar structure, wherein the first outer planar structure, the second outer planar structure, and the number of planar structures are substantially parallel to each other, are coupled to each other to form a fuselage structure, and are configured to receive a number of containers;
    a second plurality of planar structures connected to the first outer planar structure, the second outer planar structure, and the number of planar structures, wherein the second plurality of planar structures is substantially parallel to each other and wherein the first plurality of planar structures and the second plurality of planar structures form a plurality of bays in the fuselage structure, wherein the plurality of bays is configured to receive the number of containers, and wherein the first outer planar structure, the second outer planar structure, the number of planar structures, and the second plurality of planar structures are each comprised of a plurality of nodes and a plurality of elements connecting the plurality of nodes;
    a wing; and
    a support structure connecting the wing to a first bottom end of the first outer planar structure, a second bottom end of the second outer planar structure, and a number of bottom ends of the number of planar structures.

2. The aircraft of claim 1, wherein the support structure comprises:
    a first outer member extending from a first side of the wing to the first bottom end of the first outer planar structure;
    a second outer member extending from a second side of the wing to the second bottom end of the second outer planar structure;
    a number of members connected to the number of bottom ends of the number of planar structures and associated with the first outer member and the second outer member.

3. The aircraft of claim 2, wherein the number of members are positioned at a number of angles to provide support for the first outer planar structure, the second outer planar structure, and the number of planar structures, wherein the number of angles are different than angles at which the first outer member and the second outer member are positioned.

4. The aircraft of claim 1, wherein the support structure carries vertical loads extending through load paths through the first outer planar structure, the second outer planar structure, and the number of planar structures.

5. The aircraft of claim 4, wherein at least a portion of the load paths extend from the wing through at least one of the first outer planar structure, the second outer planar structure, and the number of planar structures to the support structure.

6. The aircraft of claim 4, wherein a portion of a load path extending from the wing through one of the number of planar structures to the support structure is through a component in a number of components connecting the number of bottom ends of the number of planar structures to a number of members in the support structure.

7. The aircraft of claim 1, wherein the wing is associated with a top of the fuselage structure.

8. The aircraft of claim 1 further comprising:
    a plurality of bays formed between the first outer planar structure, the second outer planar structure, and the number of planar structures, wherein the plurality of bays is configured to receive the number of containers.

9. The aircraft of claim 1, wherein the first plurality of planar structures lies in a substantially vertical-longitudinal plane, and wherein the second plurality of planar structures lies in a substantially horizontal-longitudinal plane.

10. The aircraft of claim 1, wherein the first outer planar structure, the second outer planar structure, the number of planar structures, and the plurality of second planar structures comprise a plurality of trusses.

11. The aircraft of claim 1, wherein the first outer planar structure, the second outer planar structure, and the number of planar structures form one of a space frame and a semi-monocoque structure.

12. A method for transporting containers in an aircraft, the method comprising:
loading a number of containers into the aircraft, wherein the aircraft is comprised of a first outer planar structure; a second outer planar structure; wherein the first outer planar structure and the second outer planar structure each comprise a truss; a number of planar structures located between the first outer planar structure and the second outer planar structure, wherein the first outer planar structure, the second outer planar structure, and the number of planar structures are substantially parallel to each other, are coupled to each other to form a fuselage structure, and are configured to receive the number of containers; a wing, wherein the first outer planar structure, the second outer planar structure, and the number of planar structures are a first plurality of planar structures; a support structure connecting the wing to a first bottom end of the first outer planar structure, a second bottom end of the second outer planar structure, and a number of bottom ends of the number of planar structures; a second plurality of planar structures connected to the first outer planar structure, the second outer planar structure, and the number of planar structures, wherein the second plurality of planar structures is substantially parallel to each other and wherein the first plurality of planar structures and the second plurality of planar structures form a plurality of bays in the fuselage structure, wherein the plurality of bays is configured to receive the number of containers, and wherein the first outer planar structure, the second outer planar structure, the number of planar structures, and the second plurality of planar structures are each comprised of a plurality of nodes and a plurality of elements connecting the plurality of nodes; and
operating the aircraft to transport the number of containers to a destination.

13. The method of claim 12, wherein the support structure comprises:
a first outer member extending from a first side of the wing to the first bottom end of the first outer planar structure;
a second outer member extending from a second side of the wing to the second bottom end of the second outer planar structure; and
a number of members connected to the number of bottom ends of the number of planar structures and associated with the first outer member and the second outer member.

14. The method of claim 12, wherein the support structure carries vertical loads extending through load paths through the first outer planar structure, the second outer planar structure, and the number of planar structures.

15. The method of claim 14, wherein at least a portion of the load paths extend from the wing through at least one of the first outer planar structure, the second outer planar structure, and the number of planar structures to the support structure.

16. The method of claim 14, wherein a portion of a load path extending from the wing through one of the number of planar structures to the support structure is through a component in a number of components connecting the number of bottom ends of the number of planar structures to a number of members in the support structure.

17. The method of claim 12, wherein the wing is associated with a top of the fuselage structure.

18. The method of claim 12 further comprising:
a plurality of bays formed between the first outer planar structure, the second outer planar structure, and the number of planar structures, wherein the plurality of bays is configured to receive the number of containers.

19. The method of claim 12, wherein the first plurality of planar structures lies in a substantially vertical-longitudinal plane, and wherein the second plurality of planar structures lies in a substantially horizontal-longitudinal plane.

20. The method of claim 12, wherein the first outer planar structure, the second outer planar structure, the number of planar structures, and the second plurality of planar structures comprise a plurality of trusses.

21. The method of claim 12, wherein the first outer planar structure, the second outer planar structure, and the number of planar structures form one of a space frame and a semi-monocoque structure.

* * * * *